(12) United States Patent  
Lawler et al.

(10) Patent No.: US 12,466,334 B2
(45) Date of Patent: Nov. 11, 2025

(54) CAMERA ARRAY SYSTEMS AND DEVICES, INCLUDING FLOATING PLATE CONFIGURATIONS AND SPLIT PLATE CONFIGURATIONS

(71) Applicant: Drivingplates.com LLC, Yelm, WA (US)

(72) Inventors: Michael Shawn Lawler, Yelm, WA (US); Ian Sharples, Epsom (GB)

( * ) Notice: Subject to any disclaimer, the term of this patent is extended or adjusted under 35 U.S.C. 154(b) by 9 days.

(21) Appl. No.: 18/668,605

(22) Filed: May 20, 2024

(65) Prior Publication Data

US 2024/0409041 A1    Dec. 12, 2024

Related U.S. Application Data

(63) Continuation-in-part of application No. 18/207,876, filed on Jun. 9, 2023, now Pat. No. 12,010,439.

(51) Int. Cl.
| | |
|---|---|
| B60R 11/04 | (2006.01) |
| G03B 37/04 | (2021.01) |
| H04N 23/90 | (2023.01) |
| B60R 11/00 | (2006.01) |

(52) U.S. Cl.
CPC .............. *B60R 11/04* (2013.01); *G03B 37/04* (2013.01); *H04N 23/90* (2023.01); *B60R 2011/004* (2013.01); *B60R 2011/0066* (2013.01)

(58) Field of Classification Search
None
See application file for complete search history.

(56) References Cited

U.S. PATENT DOCUMENTS

| | | | |
|---|---|---|---|
| 8,811,812 B1* | 8/2014 | Lawler | G03B 17/561 396/419 |
| 8,994,822 B2* | 3/2015 | Smitherman | G01C 11/025 348/144 |
| 2014/0334809 A1* | 11/2014 | Chapman | F16F 15/04 396/55 |
| 2016/0112619 A1* | 4/2016 | Mohr | H04N 23/50 348/208.7 |
| 2017/0168375 A1* | 6/2017 | Lajoie | F16F 1/373 |

* cited by examiner

*Primary Examiner* — James M Anderson, II

(57) ABSTRACT

A camera array system featuring a plurality of camera clusters attached to a plurality of multi-prong stabilized mounting plates arranged in a split-rig configuration, with the mounting plates configured for mounting the camera clusters onto a moving vehicle.

20 Claims, 53 Drawing Sheets

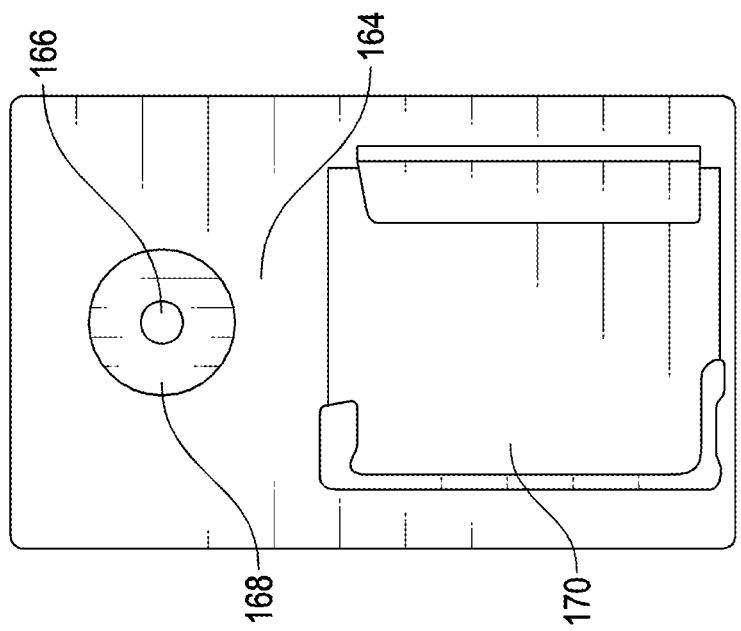
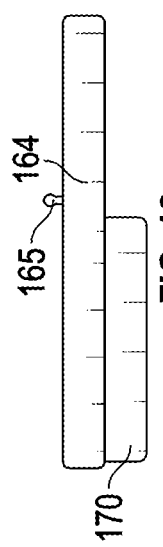
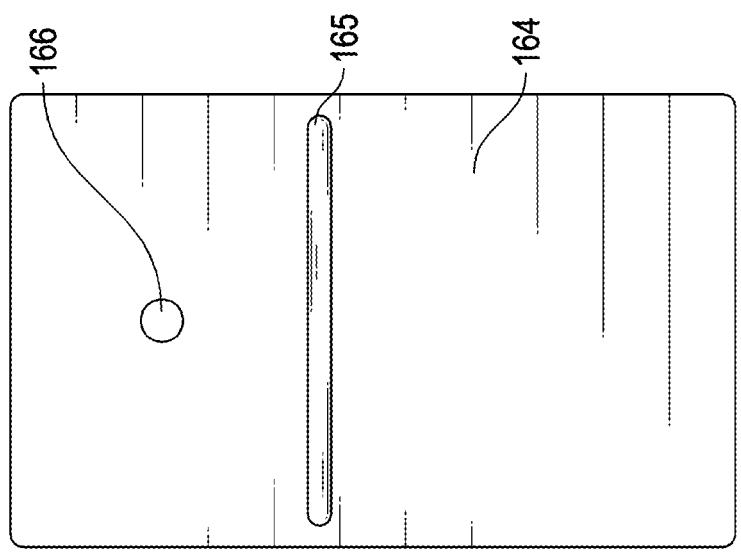

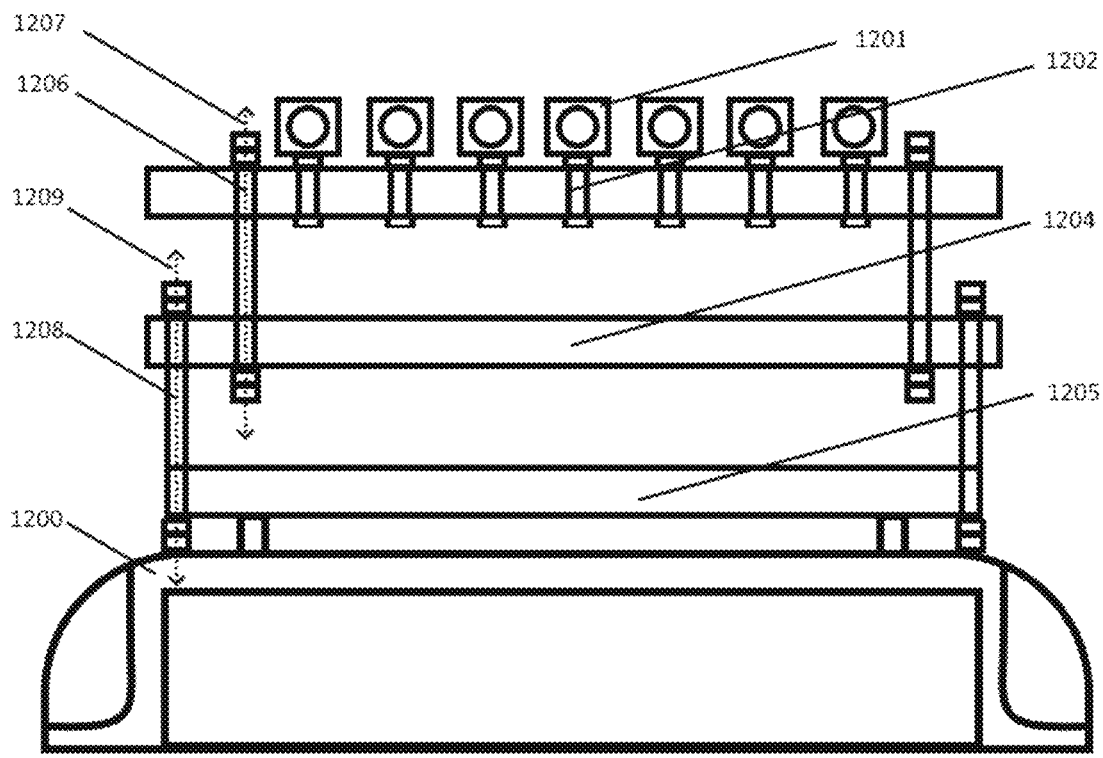
Fig. 103
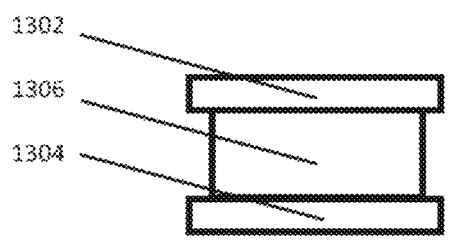
Fig. 104
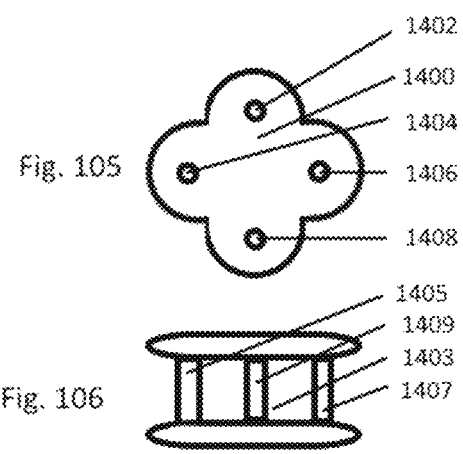
Fig. 105
Fig. 106

CAMERA ARRAY SYSTEMS AND DEVICES, INCLUDING FLOATING PLATE CONFIGURATIONS AND SPLIT PLATE CONFIGURATIONS

PRIORITY CLAIM

This continuation-in-part application claims the benefit of and priority to U.S. Provisional Application Ser. No. 63/050,365, filed Jul. 10, 2020, U.S. Provisional Application Ser. No. 63/382,373, filed Nov. 4, 2022, U.S. Provisional Application Ser. No. 63/386,161, filed Dec. 5, 2022, U.S. Non-Provisional application Ser. No. 17/373,721, filed Jul. 12, 2021, U.S. Non-Provisional application Ser. No. 17/835,903, filed Jun. 8, 2022, U.S. Non-Provisional application Ser. No. 18/149,051, filed Dec. 30, 2022, and U.S. Non-Provisional application Ser. No. 18/207,876, filed Jun. 9, 2023. The above referenced applications are incorporated in their entirety as if restated in full.

BACKGROUND

Currently there are a number of solutions for providing a camera array that captures multiple directions simultaneously. Some of these solutions arrange the cameras in a "rosette formation" and some utilize a camera overlap formation. The "rosette formation" is by far the most utilized, but it fails to meet the standards of the industry because there is considerably less overlap and increased parallax. With all cameras facing out and away from each other, those formations will inherently result in less favorable results.

Parallax is an optical displacement of an apparent position that occurs when an object is seen from more than one position. Each position reveals a distinct "face" or angle of the object as well as different contextual facts, i.e., the object's position vis-à-vis other objects. The different views are utilized in stereopsis, a mental process in which an observer judges object distance, but the difference creates a parallax error in photography. A parallax error may occur with respect to a single camera shot if the lens viewer differs in position from the capture lens, although here the error is merely that the view seen through the viewer is not the view that is actually captured via the lens. This kind of parallax error is relatively trivial, and can be overcome by merging the viewer with the lens.

A more significant kind of parallax error occurs if an object or view is captured via multiple shots, since the shots cannot simply be stitched together to produce a single natural image. In particular, the views will not align since any particular object in each of the shots will be seen from a different perspective and therefore reveal a face that is not duplicated across the shots. Even if the faces are stitched together at their seams to create a single object, that single object may look unnatural, depending on the displacement of positions. But more importantly, that object will not have the same position with respect to other objects in the shots, and it may be impossible to stitch together multiple objects due to occlusion configurations. Occlusion configurations occur as the line of a sight of a particular view converges with the line on which the objects are both positioned, with complete occlusion occurring when the line of sight is the same as the positional line.

At the same time, it is desirably to exploit this kind of parallax error in the sense that the multiple faces captured provide additional information in that the objects may be seen more completely.

Compounding the parallax error described above is the natural warping effect of a camera lens. Multiple shots, made by cameras directed at adjacent areas, will produce a reoccurring warping pattern—specifically, a radial Moiré pattern. If the shots are stitched together, a pattern of central (i.e., magnified) to peripheral warping will repeat across the panorama.

Another kind of parallax error occurs if there is insufficient overlap between the camera views. Objects that are positioned at an angle between the views of each camera may be entirely absent from the shots. This problem is more likely to occur the closer the objects are to the cameras and the further the cameras are from one another. Because of the material depth of the devices themselves, multiple cameras cannot originate at a common "origin", even if the angle of their views intersect at such an origin. Therefore, although such object omissions may be mitigated by placing the cameras closer together, there is a limit to this solution imposed by the material depth of the devices themselves.

In cinematography, filming using a moving camera inherently introduces a plurality of views, but this does not produce a parallax error because the plurality of views is displayed over time rather than simultaneously. No stitching is necessary, and therefore no alignment problems arise. However, if multiple cameras are used, then the parallax errors discussed above occur and for the same reasons.

Some solutions to parallax error utilize a camera overlap formation, including a traditional two image overlap and a three image overlap. The two image formation uses a timing algorithm in order to reduce errors. However, mere timing algorithms only assist in obtaining shots that are likely to overlay in a less problematic fashion.

What is needed is a camera device and configuration, specifically a placement and orientation of cameras, that reduces these parallax errors and which does not rely heavily on algorithmic assistance and/or manual correction.

SUMMARY

It is desirable to have a system that can capture multiple directions simultaneously while reducing optical errors which result in parallax. Furthermore, it is desirable to have a system that arranges all of the cameras close to each other on a common plate. Still, further, it is desirable to have multiple nodal formations nested together on the common plate. The disclosed system advantageously fills these needs and addresses the aforementioned deficiencies by providing camera configurations that result in images at substantially overlapping angles in every direction.

Disclosed is a camera array system comprising a plurality of outward-facing camera clusters mounted on a plate structure and surrounding an upward-facing camera. The disclosed system is unique when compared with other known systems and solutions in that it provides camera configurations that result in images at substantially overlapping angles in every direction. The nodal formations of outward-facing camera clusters are arranged every 90 degrees around a center of the plate and provide superior coverage and less distortion compared to similar systems. A key feature of the nodal formations is the intersecting of the angles of view, which provide not only more complete coverage of the objects which are closest to a given nodal formation, but also ensure an overlap of coverage, specifically a panoramic overlap, with the footage captured by adjacent nodal formations. The system can provide image data, quality and stability that is necessary for utilization in modern visual effects and software environments.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Camera Array may, however, be embodied in many different forms and should not be construed as being limited to the embodiments set forth herein; rather, these embodiments are provided by way of illustration only and so that this disclosure will be thorough, complete and fully convey understanding to those skilled in the art.

BRIEF DESCRIPTION OF THE DRAWINGS

FIG. 10 shows a top view of the anti-drift camera mounting plate.

FIG. 11 shows a bottom view of the anti-drift camera mounting plate.

FIG. 12 shows a side view of the anti-drift camera mounting plate.

FIG. 103 shows an exemplary floating plate design, comprising an upper mounting plate, a lower mounting plate, an array of cameras mounted to the upper mounting plate, and connectors between the cameras and the upper mounting plate, between the upper and lower mounting plates, and between the lower mounting plates and the vehicle.

FIG. 104 shows an exemplary stabilizer comprising a top, base, and an intermediary.

FIG. 105 shows a top view of an exemplary multi-prong stabilizer.

FIG. 106 shows a side view of an exemplary multi-prong stabilizer.

DETAILED DESCRIPTION

Figure 1:
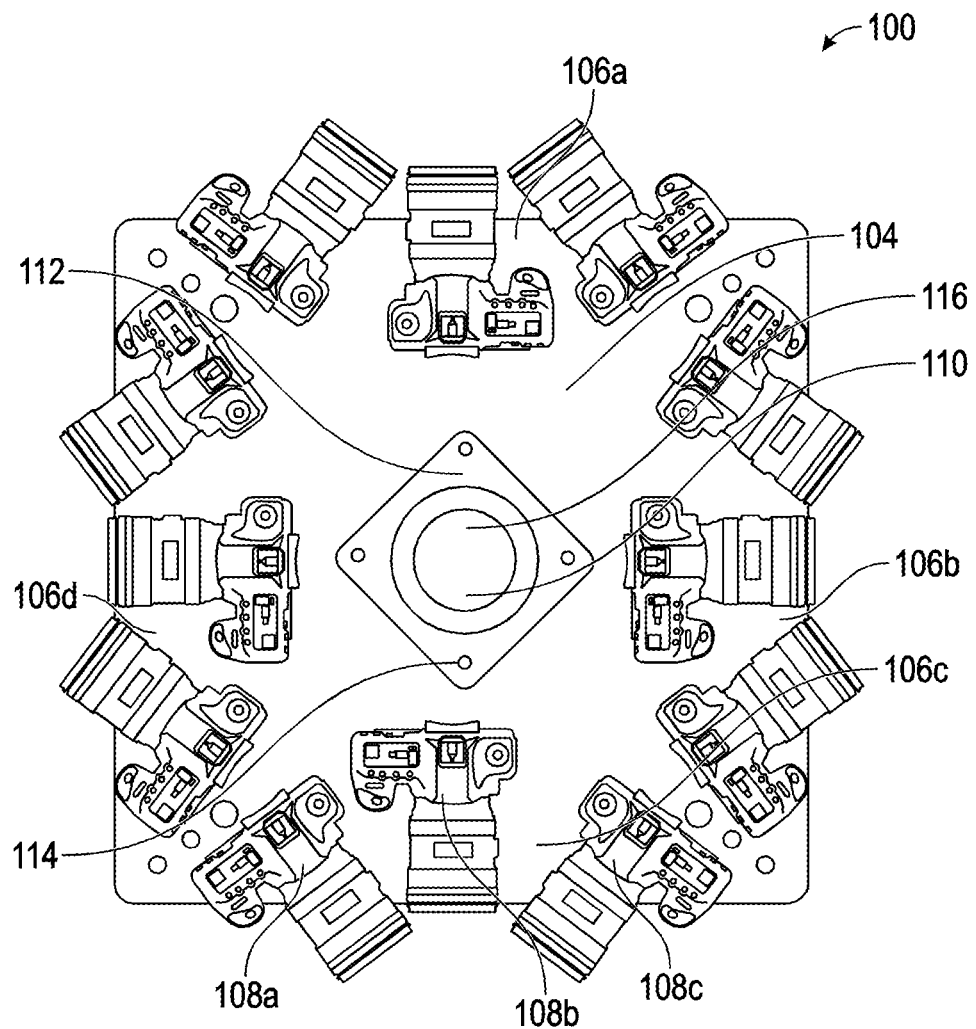
FIG. 1 shows a top view of the system without the video converter boxes connected to the cameras.

The present invention is directed to a system featuring an array of camera arrays configured to capture at least 360 degrees of views from a moving vehicle.

In its most complete version, the system is made up of the following components: a plurality of cameras arranged on each side of a plate structure and connected to a common trigger box and viewing monitor, levelling screws to facilitate the leveling of the plate structure, cut-out features that provide access to the battery of each camera, a lidar and a method of capturing lidar information in conjunction with camera images, and rigid mounts for each camera. These components are combined together to create an architecture for the system that has the ability to capture images at an increased reduction of parallax while providing for a stable image. It should further be noted that the electronic trigger, monitor, leveling screws, battery slots and anti-drift mounts will provide ease of use for the operator and the lidar data will help augment the spatial relation of each image to the others. The spatial relations of the images assist in stitching them together, when necessary.

The cameras will be mounted in four clusters of three along each side of the plate. Thus, each cluster may have a left camera, a middle camera, and a right camera. The four clusters in their nodal formation provide for substantial overlap of the images on each side, thereby reducing parallax. Indeed, the cameras that form each cluster, placed closely and adjacently to each other, are directed toward a point of intersection such that the direction and view of the left camera and right camera cross the direction and view of the middle camera-thus, the angles of views, which are conceptual lines that are positioned and oriented in the very center of views, intersect. Also, the plurality of clusters enables at least a partial overlap of view, not only within each cluster, but between clusters as well. This is because cameras in adjacent clusters may have parallel angles of views.

The plate itself, which via mounting places the cameras on the same horizontal plane, yields two types of overlaps—the first being an overlap of view between one camera with another camera in an adjacent cluster (parallel angles of view), and the second being an overlap of view—but not of angles—between cameras within a cluster. In the latter type of overlap, the angles of view intersect. The common and stable horizontal plane promotes improved outcomes when the images are used to construct 3d and virtual reality spatial environments. In order to supplement the various overlaps in view of the camera array, another camera is placed at the center of the plate and elevated above the plate (and the camera clusters). This camera is directed upward, thereby providing a sky-view to complement the lateral views of the outward-facing camera clusters. Thus, the camera array may feature four outward-facing camera clusters and one upward-facing camera cluster.

Increasing the overlap is possible by increasing the number of clusters or increasing the number of cameras within each cluster. However, doing so will result in increased material and process costs as well as an increased complexity in processing the captured images. Conversely, the number of clusters or the number of cameras within each cluster may be decreased to reduce the aforementioned costs, although this may occur at the expense of the quality of the footage and an increase in parallax errors. It is crucial that the camera views overlap between clusters in order to obtain panoramic coverage from cameras having a common directional view, and that the angles of view intersect within each cluster in order to obtain complete visual information regarding the objects before it. At the same time, the intersection of the angles of view is what enables the overlap between adjacent clusters.

Therefore, in a camera array system of four clusters of three cameras each, the camera angles of view (which may also be understood as the "directions" which the cameras face) of cameras within each cluster should diverge at least fifteen degrees between adjacent cameras, with the "wing" cameras, which are disposed on either side of the "middle" camera, diverging at least thirty degrees. It is preferred for each wing camera to diverge around forty-five degrees from the middle camera so as to diverge ninety degrees from each other. By diverging ninety degrees from each other, a wing camera will maintain the same angle of view as another wing camera in the cluster ninety degrees from its own cluster. Thus, a sufficient degree of divergence guarantees that a wing camera in one cluster will not only overlap in view with a wing camera in an adjacent cluster, but also have common (i.e., parallel) angles of view.

A camera array system of four clusters of four cameras each is similar, except that divergence of angles of view between adjacent cameras may be less while still maintaining the features described above. Thus, the divergence may be as low as ten degrees, but is preferably 22.5. Conversely, a camera array system of four clusters of two cameras may feature a divergence of seventy degrees, although preferably the divergence is ninety degrees.

An electronic trigger relay may be coupled to each camera to provide a simultaneous signal to start or stop capturing footage. The control switch for the electronic trigger relay will be of a length sufficient to permit the operator to control the cameras without having to reach far. Indeed, the control switch for the electronic trigger may be situated remotely, on a central controller, and the central controller may be shaped ergonomically. The electronic trigger relays may be physically mounted to each camera and in instructional communication with the central controller, or the electronic relays may be incorporated into the central controller and in wireless instructional communication with the cameras.

A central monitor system may comprise relay boxes mounted above the cameras and configured to transmit signals from each camera to a common receiver, with the common receiver configured to collate the signals into an image. The central monitor system may include a display screen configured to display the image in real-time. Thus, the central monitor system may permit an operator to view all camera images at once without needing to be at camera level, thereby providing ease of use when the system is mounted high above the operator's head.

The central monitor system may isolate and group sets of cameras within the clusters, such that the footage from a camera within a first cluster will be grouped with the footage from a camera within a second cluster. In particular, footage captured from cameras having the same angle of view may be grouped together in order to obtain overlapping coverage.

The plate structure, i.e., the double plate design consisting of a top and bottom plate, may be advantaged by the inclusion of leveling screws installed at the corners of and between the plates. The levelling screws enable fine adjustments to the horizontal level once all the cameras are mounted on the plate. The levelling screws may comprise a set of rotatable discs threadedly fitted to screws, enabling a change in height via rotation. Three screws within a leveling screw unit enable a planar tilt. Slots may be cut out of the top plate allowing for access to the battery compartment of each camera once mounted. This configuration enables the operator to access the camera battery compartment while ensuring that the camera position does not change once it is mounted to the plate.

While the plate structure, including the top and bottom plates, may be square to better fit a camera array of four clusters, other shapes may provide certain advantages to other array sets. Other conceivable shapes include a circle, a triangle, or other polygons, with the number of sides being equal to the number of clusters.

In one version, 1 to 3-axis gimbals may be mounted at the corners, along the periphery, and/or within the periphery under the bottom plate and provide additional stability to the cameras when the system is in motion, thereby ensuring that a clean image will be captured without aberrations or distorted images. In another version, lens stabilizers are utilized to maintain image clarity and the gimbals are omitted. In a third version, lens stabilizers and gimbals may be used in conjunction.

A large central cut out on the bottom plate will provide access to the top plate for access to the battery compartments and also for the addition of pins which will be used to attach stabilization rods.

A lidar unit will mount in the center of the system and will sit above the cameras. The lidar data will assist with spatial construction of the captured camera images in 3d software suites. The lidar may communicate distance-related data to the central controller for further processing.

FIG. 1 is a top view of the system 100 with the 13 cameras mounted to the top plate 104 in their respective positions. There are four clusters 106a, 106b, 106c, 106d of three cameras 108a, 108b, 108c arranged in a nodal formation and mounted on the plate every 90 degrees. The center 110 of the plate has a hole through which wires can be connected and through which additional mounting brackets can be placed from underneath. Above the hole is mounted a platform 112 supported by four pins 114 upon which sits a lidar and the 13th camera 116, with the 13th camera mounted to the platform via an L-bracket, with the L-bracket in turn mounted on top of the lidar. The 13th camera is configured to capture the overhead imagery when the system is in use.

Figure 2:
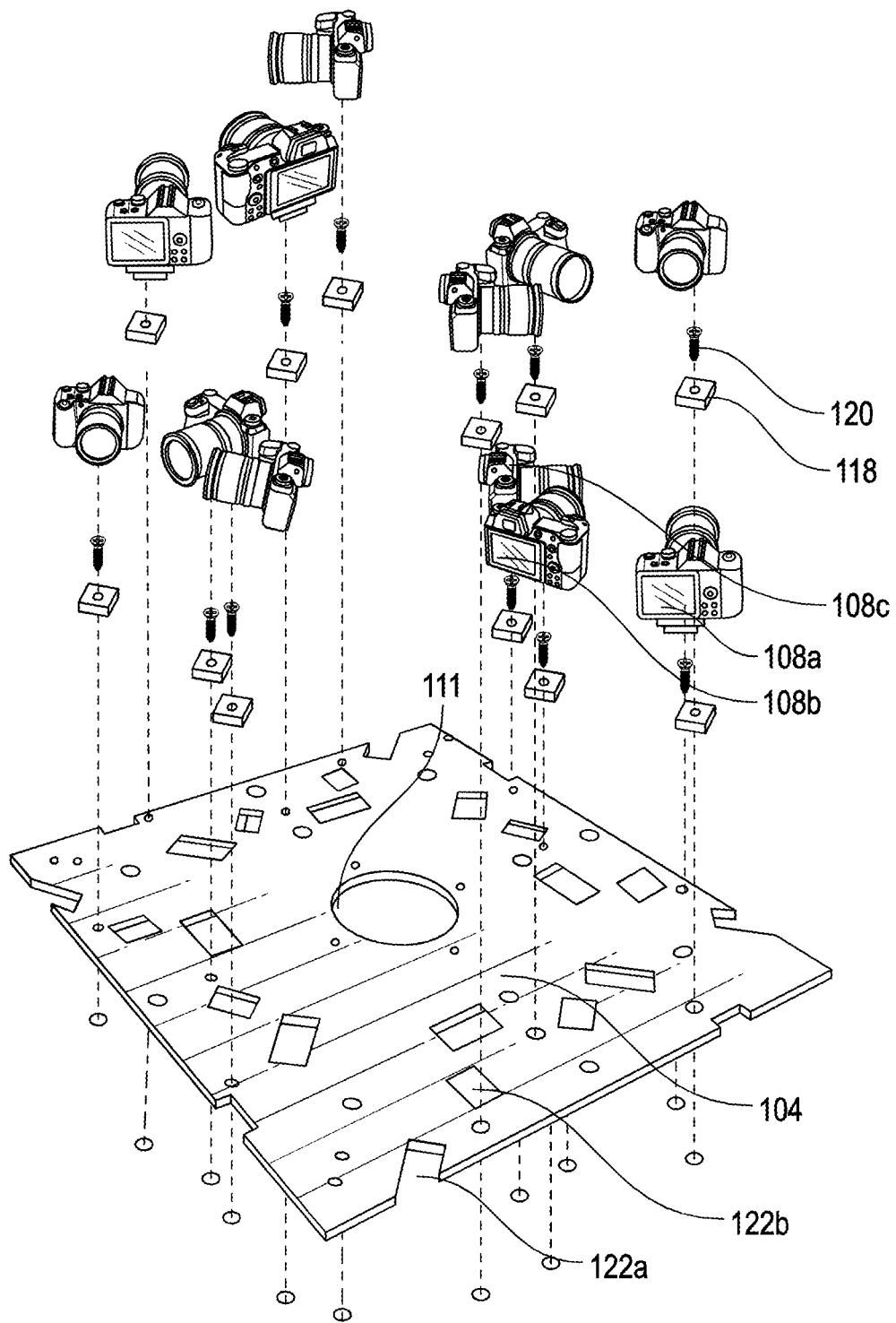
FIG. 2 shows an exploded view of the system with the nodal formation cameras and their respective mounts.

FIG. 2 is an exploded view of the top plate 104 along with the connections needed in order to mount the cameras 108a, 108b, 108c onto the top plate Various rectangular cutouts 122a in the plate are used for access to the battery compartment of each camera after each camera is mounted into position. In one version, each camera has a quick release mount 118 that is connected to the top plate via a bolt 120. An anti-drift plate is mounted to the underside of each of the 12 horizontal cameras and the anti-drift plate is then connected to the quick release plate. Additional slots 122b are also cut into the surface of the plate in order to accommodate a safety lever on the quick release plate. However, in a preferred version, the camera is mounted directly to the top plate and the safety lever and its corresponding slot are omitted.

The hole in the center 111 may be seen when the platform is not attached to the top plate.

Figure 3:
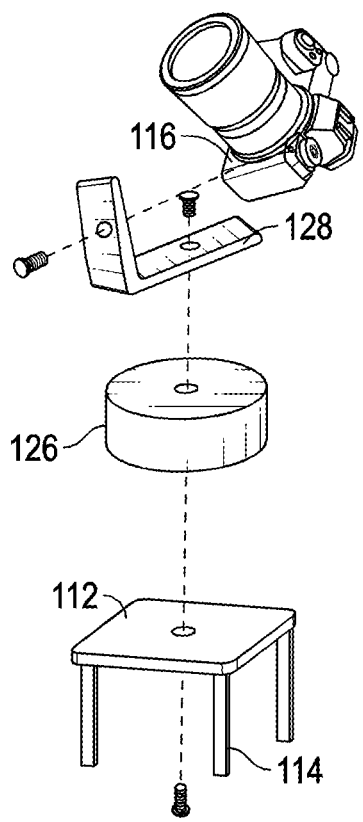
FIG. 3 shows an exploded view of the platform that connects to the top plate and which supports the lidar and overhead camera.

FIG. 3 shows an exploded view of the platform 112 along with the lidar 126 and the 13th camera 116. The lidar is mounted to the platform via a bolt. An L-bracket 128 is then mounted on top of the lidar. Lastly, the camera is mounted onto the L-bracket so that it can be oriented upward. The pins 114 of the platform 112 can be adjusted in order for the lidar to clear the height of the surrounding cameras that are mounted on the perimeter of the platform.

Figure 4:
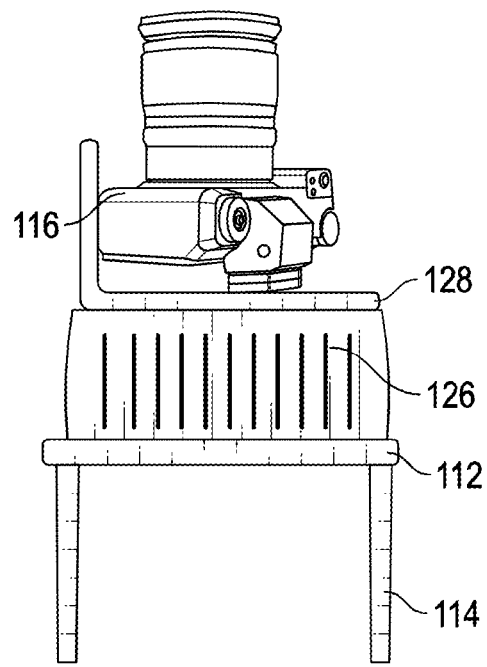
FIG. 4 shows a side view of the platform that connects to the top plate and which supports the lidar and overhead camera.

FIG. 4 shows the configured view from the side of the platform 112 with the lidar 126 and camera 116 mounted. The pins 114 of the platform provide space that allows the cords running from the cameras to the operator to pass. The lidar sits above the platform so that it can capture data in 360 degrees while the system is in use. The camera is mounted via an L bracket 128 to the top of the lidar.

Figure 5:
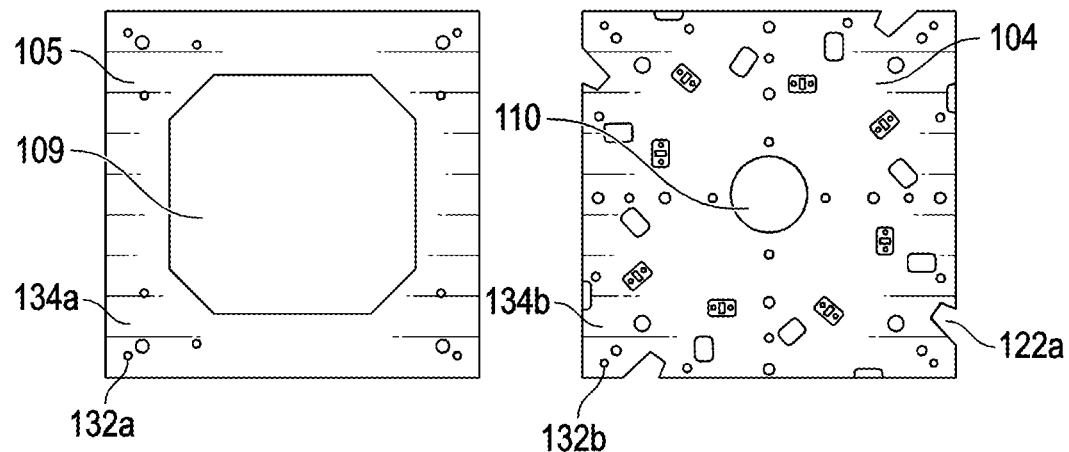
FIG. 5 shows a top view of both the bottom plate (right) and the top plate (left).

FIG. 5 is a top view of the bottom plate (left) 105 and the top plate (right) 104 of the system. The bottom plate features a large cutout 122c in order to provide access to the underside of the top plate. Holes 132a, 132b are placed at the corners 134a, 134b of both the top and bottom plate which provide mounting points for the adjustment screws that are mounted between the plates. The bottom plate also provides holes 109 in order to mount a stabilization gimbal at each corner or in order to attach the bottom plate to a vehicular mount. The top plate 104 is configured to mount the 12 horizontal cameras in nodal formation on each side. The plate provides cutouts 122a in order for the operator to access the battery compartment of each camera while mounted. There is a center hole 110 in the top plate through which cables can be connected to remote units and holes are provided through the plate in order to mount the leveling screws and platform.

Figure 6:
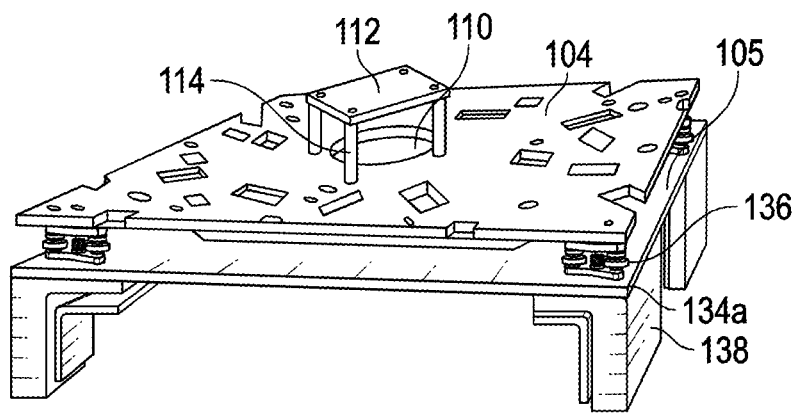
FIG. 6 shows a perspective view of the mounting plates without the cameras.

FIG. 6 is a perspective view of the assembly of the top plate 104, bottom plate 105, leveling screw 136, stabilizing gimbals 138 and platform 112. The stabilizing gimbals are positioned at the corners 134b of the bottom plate in order to provide the most stability possible should the system be moving while in use. The leveling screws are also positioned near the corners 134a and are connected to the top plate. This allows the operator to conduct any fine leveling adjustments needed after the initial mounting of the system has been completed. In a preferred version, the gimbals may be omitted and the bottom plate may be attached directly to a vehicular mounting bracket. There is a large hole in the bottom plate and a smaller hole (the center hole) 110 in the top which provides access for cables to be passed through. The platform 112 has four pins 114 which sit higher than the surrounding cameras when they are mounted in order to capture lidar data.

Figure 7:
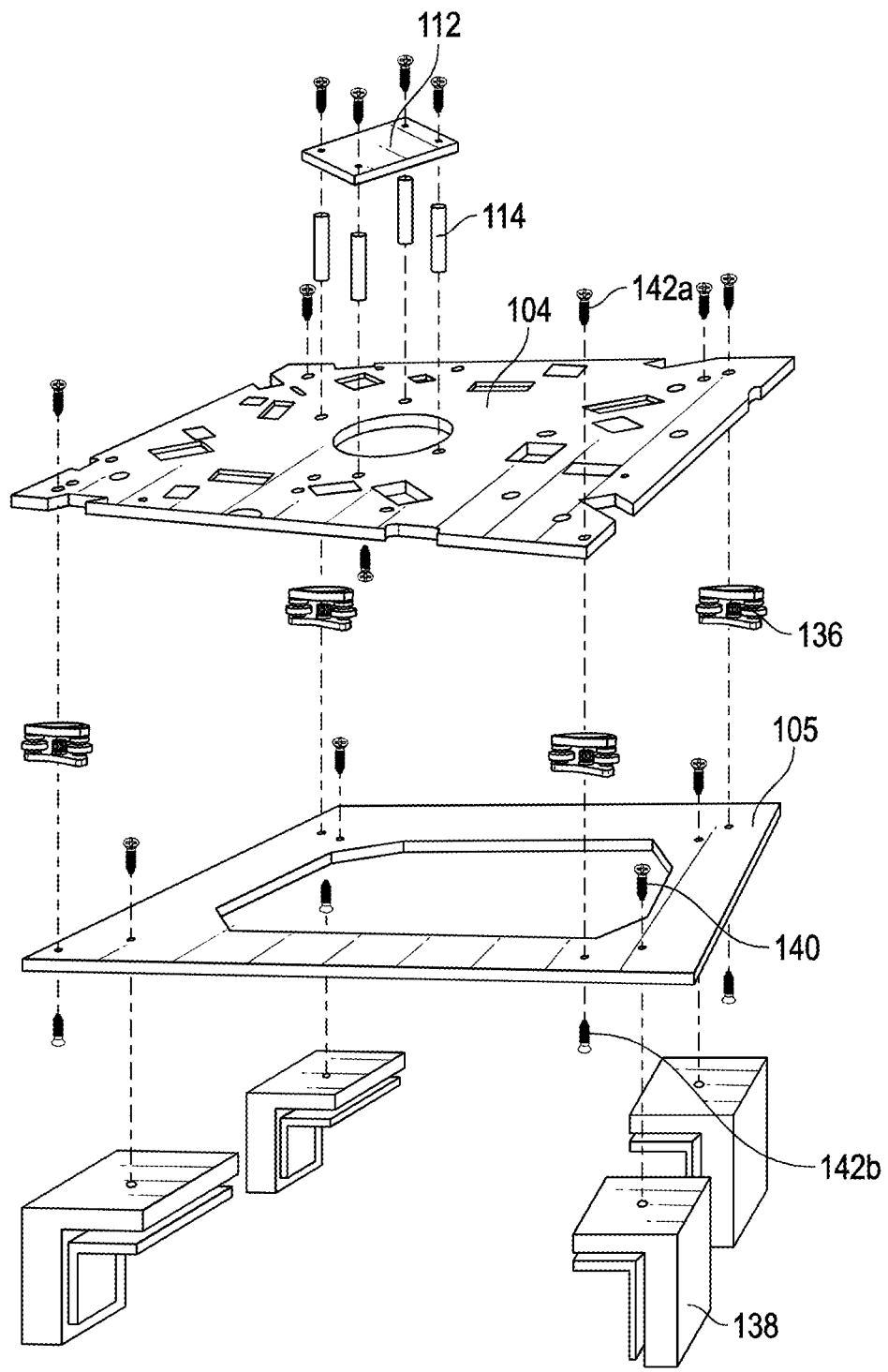
FIG. 7 shows an exploded view of the mounting plates without the cameras.

FIG. 7 is an exploded view of the assembly of the top plate 104, bottom plate 105, platform 112, leveling screws 136 and stabilizing gimbals 138. The stabilizing gimbals are connected to the underside of the bottom plate with a bolt 140. The leveling screws are connected to both the top and bottom plates with a bolt 142a, 142b on each end. Discs 144 embedded into the leveling screw rotate clockwise or counterclockwise in order to lengthen or shorten the (leveling) screw. A plurality of discs surrounds an approximate center of each leveling screw to enable a planar tilt of upper and lower levels of each levelling screw. As each levelling screw's length and planar tilt is changed the overall balance and level of the top plate is assessed and adjusted. The platform 112 is mounted to the top plate with bolts connected to pins 114. Different lengths of pins can be used for the event that the height of the lidar needs to be adjusted.

Figure 8:
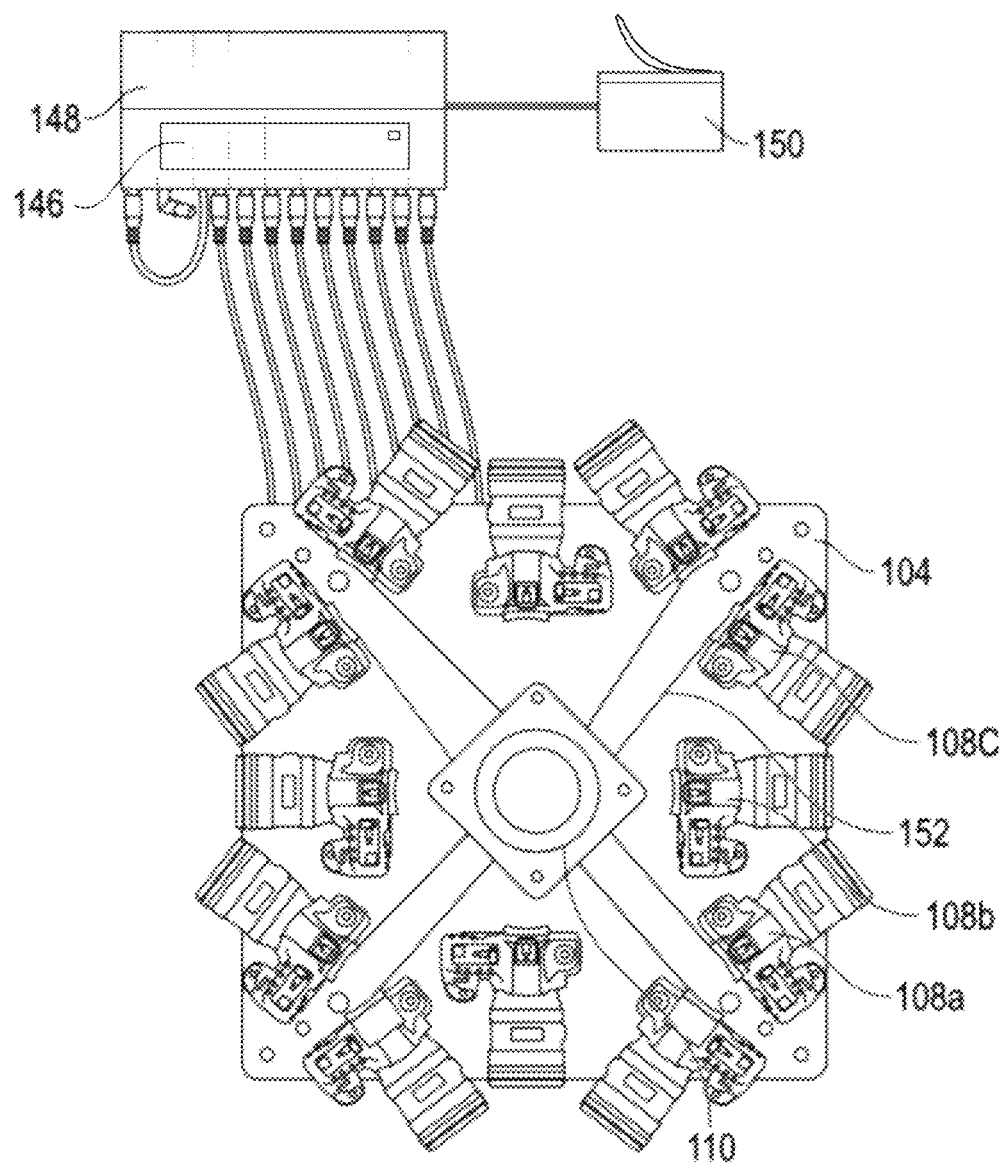
FIG. 8 shows the electronic trigger relay leading from the camera to the control box and trigger.

FIG. 8 shows the top view of the cameras 108a, 108b, 108c mounted on the top plate 104 with the electronic trigger relay 146 connected from the camera, to a central relay box 148 and then to a central trigger 150. The electronic trigger box allows simultaneous activation of the cameras from a central source so that the operator has adequate control over all the cameras at once. The figure shows a cable 152 running from each camera to the hole located at the center 110 of the plate. The cables then pass through the holes in the top and bottom plates and are connected to a common electronic relay box. The box is then connected to a single trigger that sends a signal to the cameras to begin recording all at the same time. The trigger will then send a signal when image capture is complete in order pause the cameras. The trigger may connect to the cameras via the cables, but in a preferred version, the trigger and cameras are coupled remotely and wirelessly, with the trigger wirelessly engaged to receiver boxes connected to each camera. The trigger, in turn, may be attached to otherwise incorporated into the central relay box, which may be a handheld device enabling centralized and remote control across the camera array. Accordingly, both the cables and the hole through which they pass may be omitted. The platform and pin structure may be replaced by an elevated platform of any shape.

Figure 9:
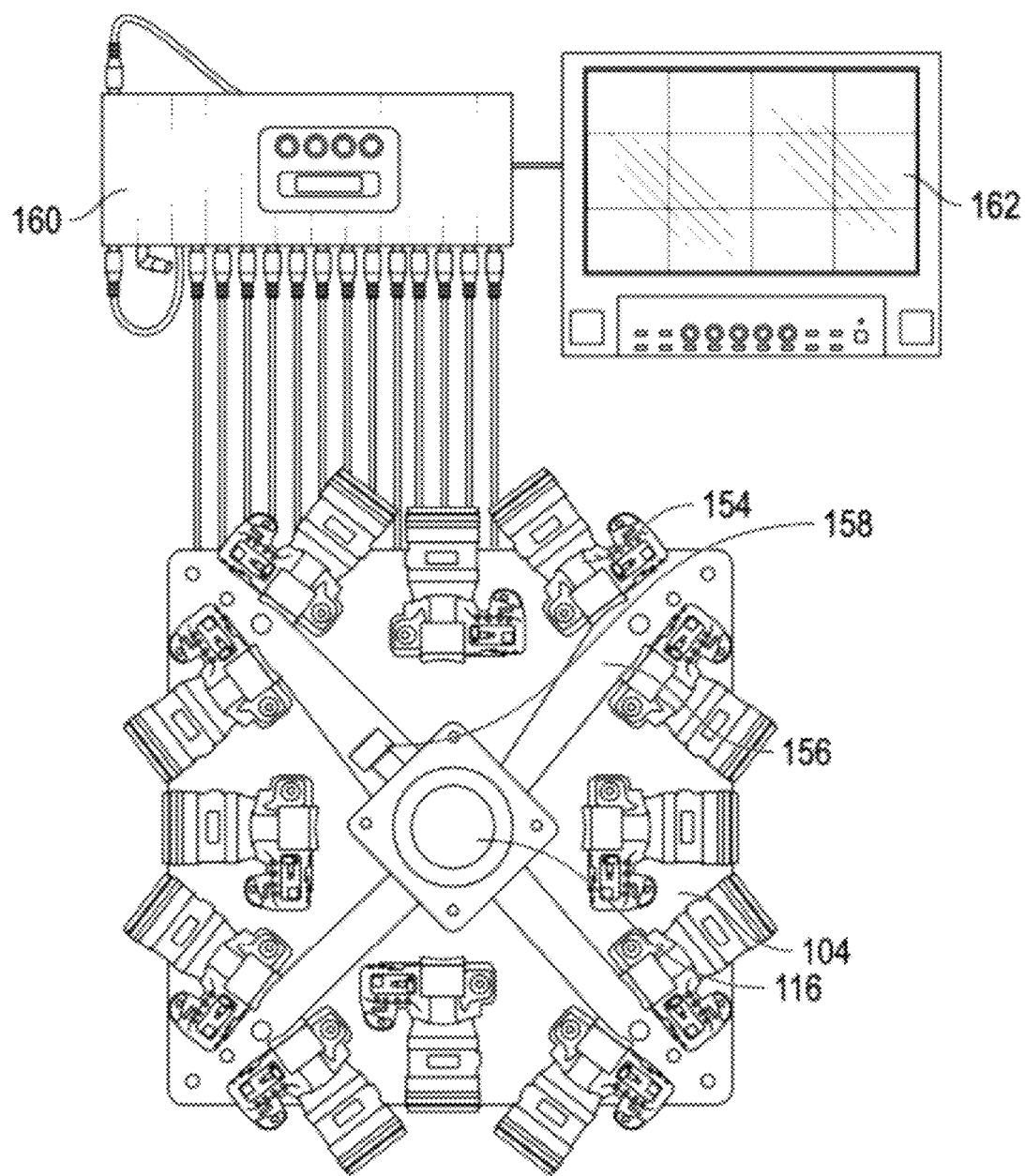
FIG. 9 shows a monitor system in which visual data is communicating from the cameras to the video converter boxes, and from the video converter boxes to the monitor.

FIG. 9 shows a top view of the cameras mounted on the top plate 104 with the video converter boxes 154 attached to the "hot shoe" mount on the top of each camera. An additional video converter box 158 is mounted to the top plate itself for the overhead camera 116. The video converter boxes connect to the cameras and send a video signal through a cable 156 to a central control box 160. The central control box then connects to a video monitor 162 which can provide images of one, some or all cameras on the same screen at the same time in order for the operator to check the status of each camera without needing to be above the top plate.

FIGS. 10-12 show components that may be omitted, depending on the stabilization methods, techniques, and components incorporated elsewhere in the system.

FIG. 10 shows a top view of the anti-drift plate 164 that connects to the bottom of each of the horizontal cameras on the top plate. This side of the plate has a hole 166 through which a bolt connects to the underside of the camera. The camera would sit on top of this plate and, after mounting the plate via the bolt through the hole, the rigid bulk of material situated across the body of the unit will keep the camera in one position. Without the material on the surface of the mount, the camera will have a tendency to rotate around the bolt hole and change position. The rigid bar 165 on the surface of the mount prevents the camera from drifting, especially when it is filming while moving on a vehicle.

FIG. 11 is the bottom view of the anti-drift plate 164. The hole 166 has a recess 168 to prevent the head of the bolt from hanging down below the underside of the plate. The lower portion of the plate, a quick release mounting surface 170 is the shape that will engage the quick release plate on the top plate of the system in order to fully mount each camera.

FIG. 12 is a side view of the anti-drift plate 164 which shows the rigid bar 165 running across the surface of the plate which prevents the camera from rotating around the mounting hole. On the underside of the plate is the mounting surface 170 which engages the quick release plate on the top plate of the system.

Figure 13:
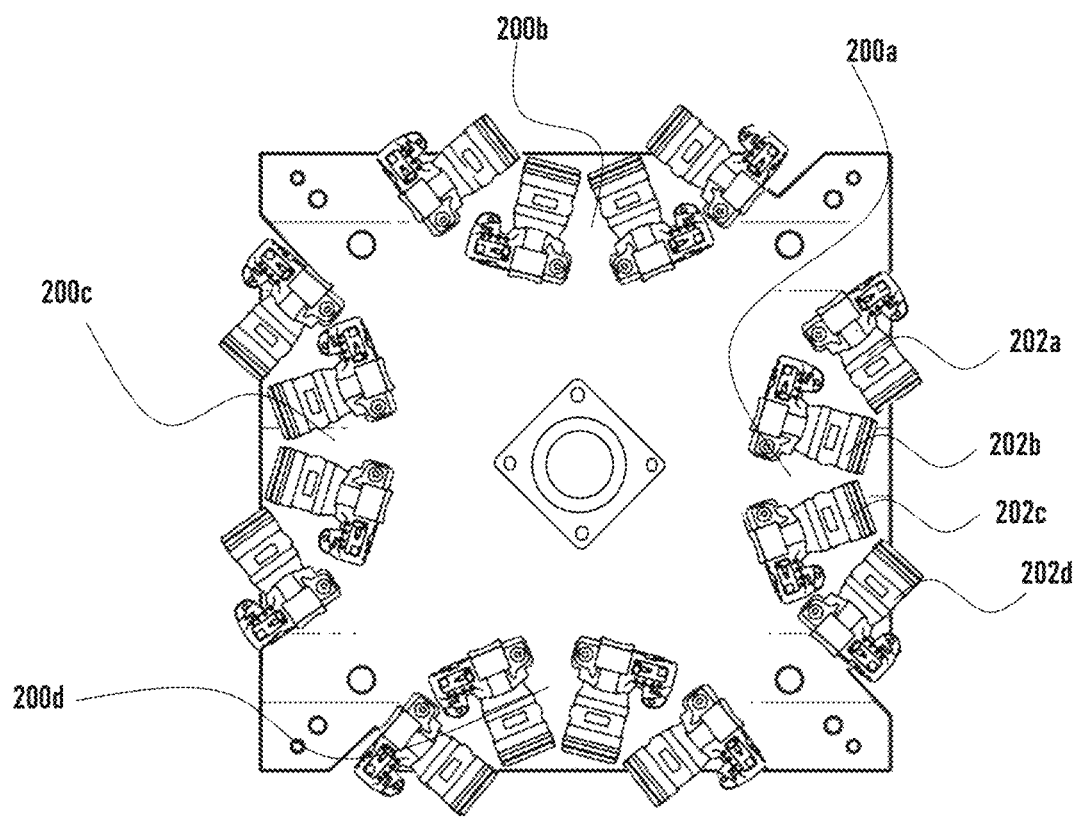
FIG. 13 shows a top view of a camera array system with four outward-facing camera clusters of four cameras each.

FIG. 13 is a top view of a camera array system with four outward-facing camera clusters 200a, 200b, 200c, 200d of four cameras 202a, 202b, 202c, 202d each.

Figure 14:
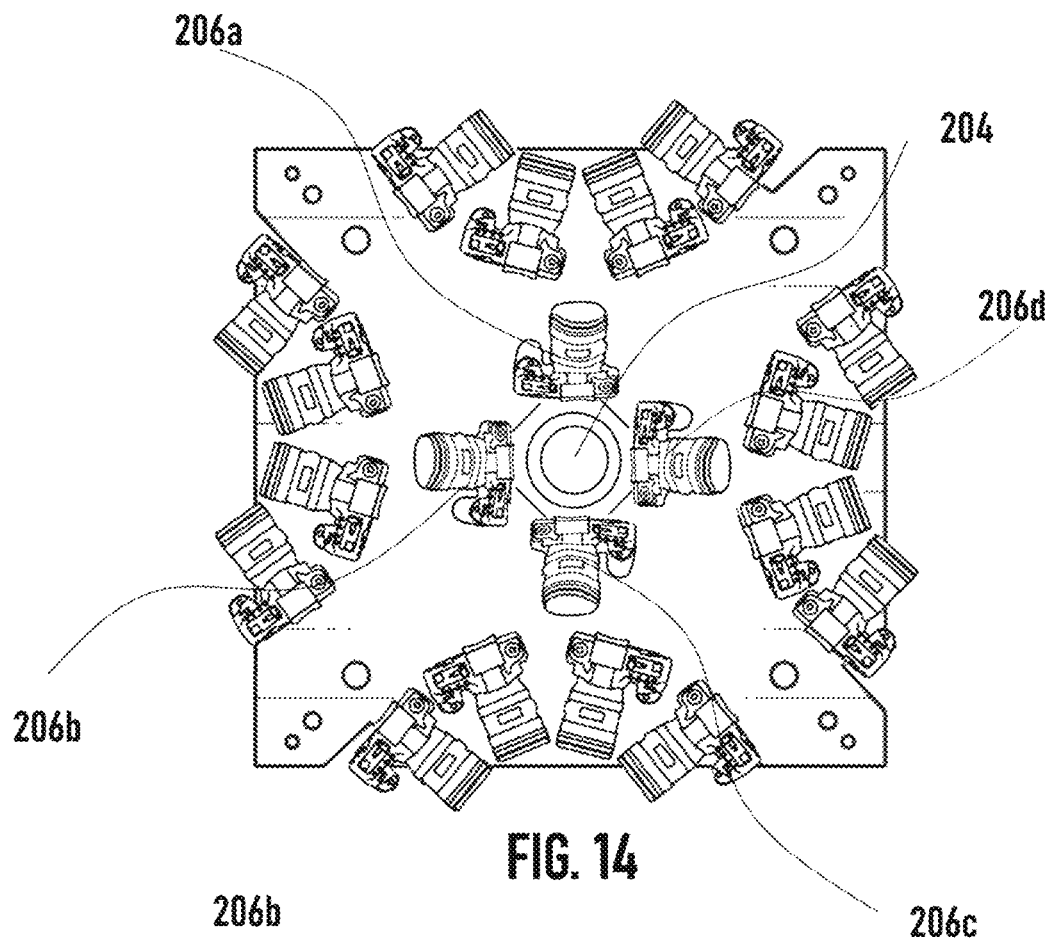
FIG. 14 shows a top view of a camera array system with an upward-facing camera cluster of five cameras.
Figure 15:
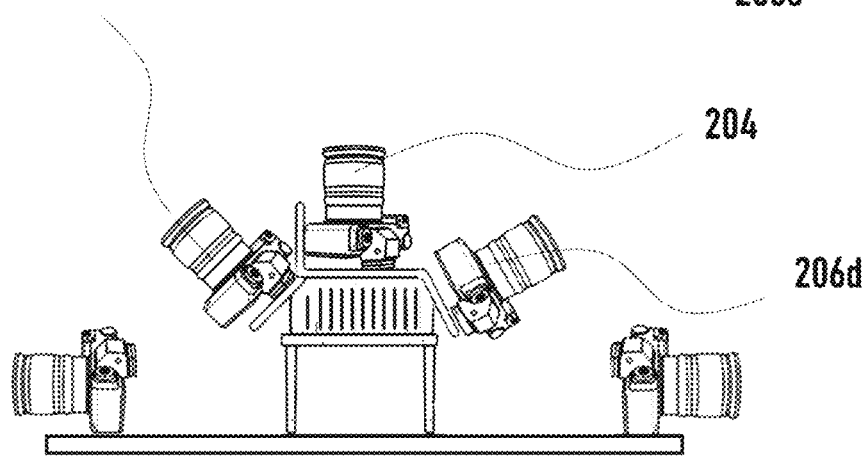
FIG. 15 shows a side view of a camera array system with an upward-facing camera cluster of five cameras.

FIG. 14-15 show a top and side view of a camera array system with an upward-facing camera cluster 204 of five cameras 206a, 206b, 206c, 206d.

Figure 16:
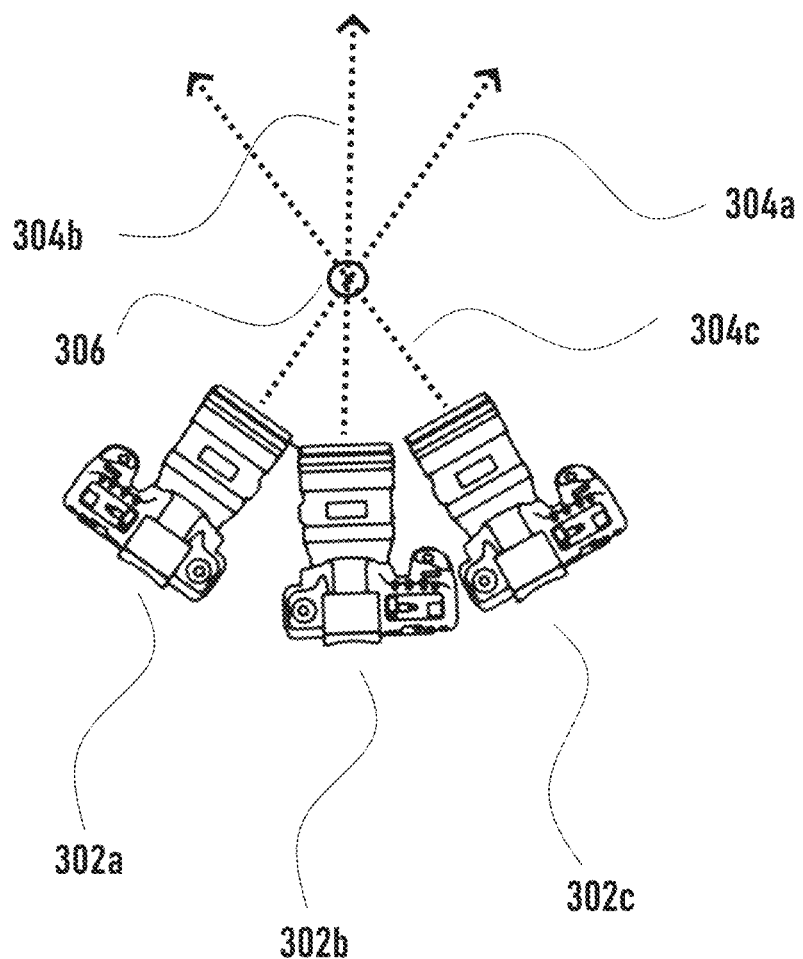
FIG. 16 shows a camera cluster with the corresponding angles of view and the point of intersection.

FIG. 16 shows a camera cluster of three cameras 302a, 302b, and 302c, with the corresponding angles of view 304a, 304b, 304c, and the point of intersection 306.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments.

It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

Figure 17A:
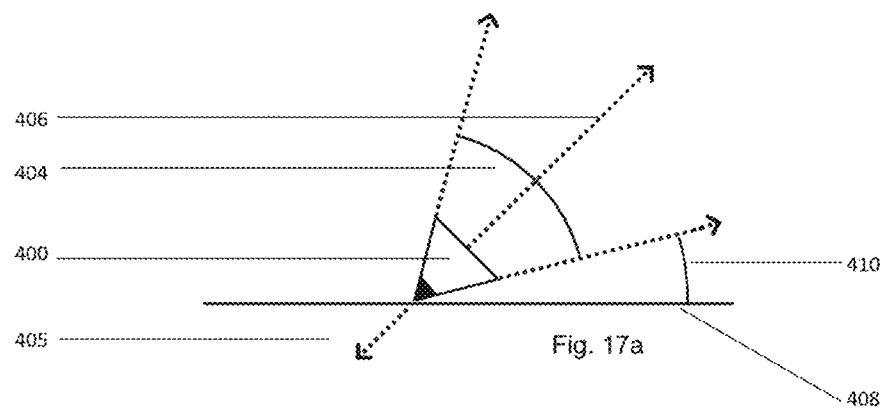
FIG. 17a is a schematic of an upward-facing camera in which the upward-facing camera has am upward direction less than 90 degrees above the plate.
Figure 17B:
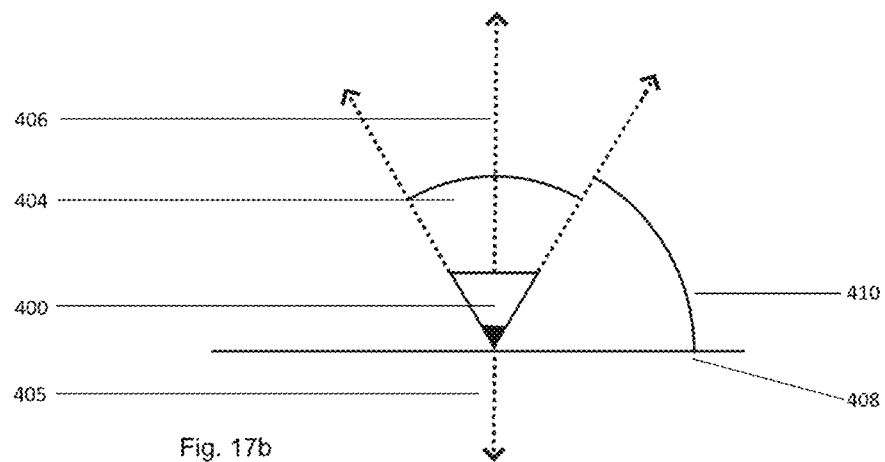
FIG. 17b is a schematic of an upward-facing camera in which the upward-facing camera has an upward direction approximately 90 degrees above the plate.

As shown in FIG. 17a-b, the camera array system may comprise upward facing cameras 400. The cameras have fields of view 404 and optical axes 406 which pass orthogonally through centers of the fields of view. The field of view is an extent of the world visible at any moment by the camera, and the optical axis comprises a line passing from a center of the camera lens through the very center of the field of view. An optical axis may be referred to, colloquially, as the camera's "direction". However, the optical axis extends both forwards, as would be consistent with the "direction", as well as backwards, passing through the lens and extending behind the lens. Thus, an optical axis may comprise both a forward direction as well as a backward direction 405, with the forward direction and the backward direction both occupying the same optical axis but facing opposite ends of the optical axis.

Upward facing cameras may be directed upward from the plate 408 at an angle 410 between 0-90 degrees. The cameras may be fixedly or adjustably directed upward from the plate, to which it may be attached directly or indirectly via one or more mechanical intermediaries. Such intermediaries may include platforms, stages, or other props to stabilize and connect the cameras.

There camera array system may provide for a series of sets of upward facing cameras, with each set being at a different angle. In one variation, a first set of upward facing cameras are directed approximately 90 degrees from the plate, a second set are directed upward between approximately 75 and 90 degrees, a third set are directed upward between approximately 60 and 75 degrees, a fourth set are directed upward approximately 60 degrees, a fifth set are directed upward between approximately 45 and 60 degrees, a sixth set are directed upward between approximately 30 and 45 degrees, a seventh set are directed upward between approximately 15 and 30 degrees, and an eight set are directed upward between approximately 0 and 15 degrees. The upward facing cameras may be used in conjunction with sets of outward facing cameras, as described previously, which may be angled at approximately 0 degrees from the plate. Unless mentioned otherwise, it can be assumed that any of the upward facing cameras described below are angled less than 90 degrees upward from the plate, and therefore are capable of having (forward or backward) directions with common points of intersection, as will be described.

Figure 18:
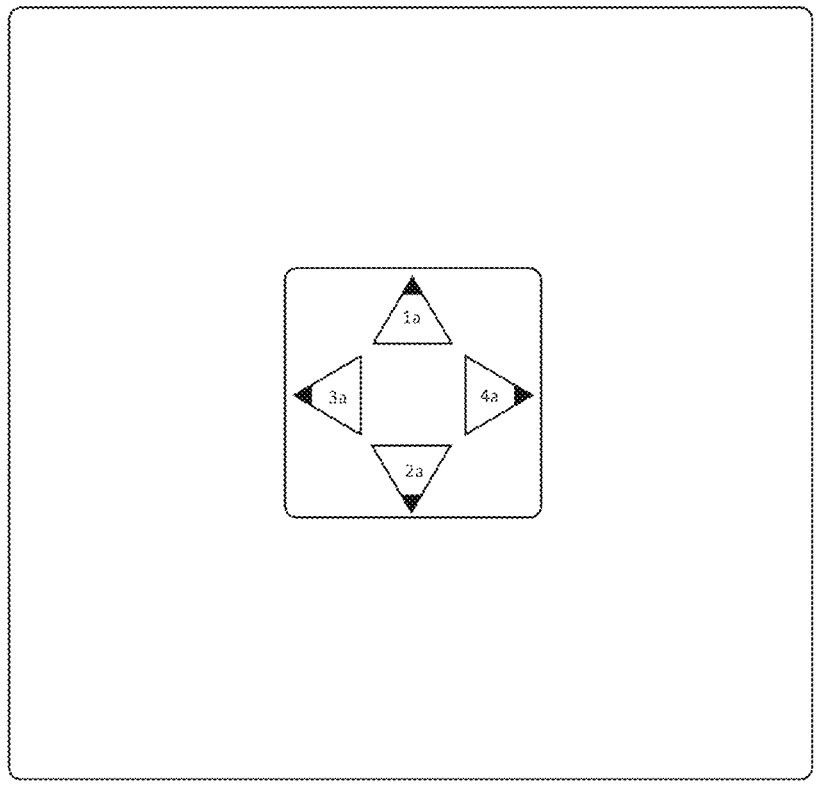
FIG. 18 is a schematic of a camera array system featuring a cluster of four cameras.

As shown in FIG. 18, the camera array system may feature a cluster of four upward facing cameras (1a, 2a, 3a, and 4a), with the upward facing cameras targeting a common point in space. Therefore, the directions of the cameras may have a common point of intersection. This common point of intersection will be above the cameras at a distance corresponding to the distance between the cameras. The cameras may be spaced approximately equidistantly around a center point, such that a first camera is disposed at approximately 0 degrees, a second at approximately 90 degrees, a third at 180 degrees, and a fourth at 270 degrees. The center between the cameras may align with the central axis of the car and therefore substantially in line with the direction of the moving vehicle. In one variation, the center is to the left of the central axis of the car. In another variation, the center is to the right of the central axis.

In one variation, the cameras are positioned with respect to the direction or path of the moving vehicle onto which the plate is mounted such that the first camera is directed toward, although above, the direction of the moving vehicle. The second camera is directed opposite, although above, the direction of the moving vehicle. The third camera is directed perpendicular to, although above, and to the right of the direction of the moving vehicle. The fourth camera is directed perpendicular to, although above, and to the left the direction of the moving vehicle. In another variation, the first camera is directed approximately 45 degrees to the left of the forward direction, in addition to designated degrees above it. The second camera is directed approximately 45 degrees to the right of the forward direction, in addition to designated degrees above it. The third camera is directed approximately 135 degrees to the left of the forward direction, in addition to designated degrees above it. The fourth camera is directed approximately 135 degrees to the right of the forward direction, in addition to designated degrees above it.

Figure 19:
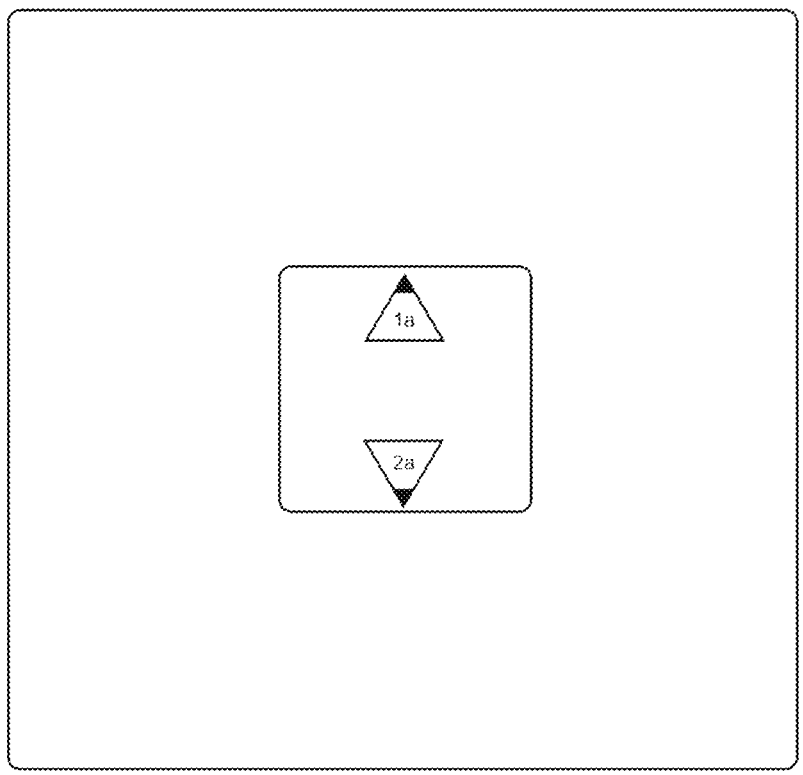
FIG. 19 is a schematic of a camera array system featuring a cluster of two upward-facing cameras.

As shown in FIG. 19, the camera array system may feature a cluster of two upward facing cameras (1a, 2a), with the upward facing cameras targeting a common point in space. As before, the directions of the cameras may have a common point of intersection. The cameras may be spaced approximately equidistantly around a center point, such that the first camera is disposed at approximately 0 degrees and the second camera is disposed at approximately 180 degrees. The center between the cameras may align with the central axis of the car and therefore substantially in line with the direction of the moving vehicle. In one variation, the center is to the left of the central axis of the car. In another variation, the center is to the right of the central axis.

In one variation, the cameras are positioned with respect to the direction or path of the moving vehicle such that a first camera is directed toward, although above the direction of the moving vehicle, and the second camera is directed opposite, although above, the direction of the moving vehicle. In another variation, the first camera is directed perpendicular to, although above, and to the right of the direction and the second camera is directed perpendicular to, although above, and to the left of the direction of the moving vehicle. The center between the cameras may align with the central axis of the car and therefore substantially in line with the direction of the moving vehicle.

Figure 20:
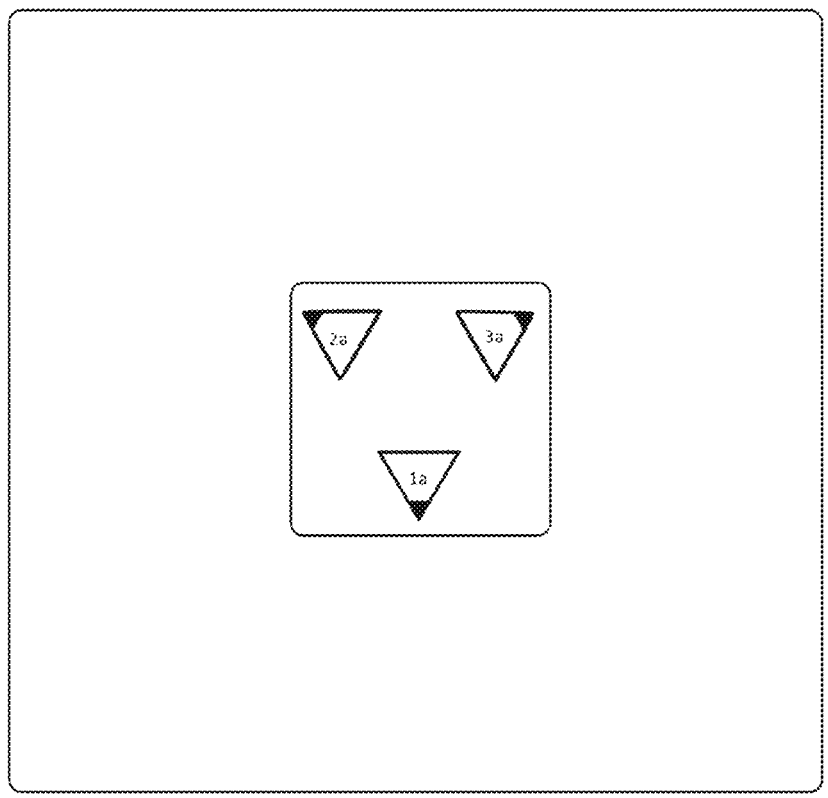
FIG. 20 is a schematic of a camera array system featuring a cluster of three upward-facing cameras.

As shown in FIG. 20, the camera array system may feature a cluster of three upward facing cameras (1a, 2a, and 3a), with the upward facing cameras targeting a common point in space. As before the directions of the cameras may have a common point of intersection. The cameras may be spaced approximately equidistantly around a center point, such that the first camera is disposed at approximately 0 degrees, the second camera is disposed at approximately 120 degrees, and the third camera is disposed at approximately 240 degrees. The center between the cameras may align with the central axis of the car and therefore substantially in line with the direction of the moving vehicle. In one variation, the center is to the left of the central axis of the car. In another variation, the center is to the right of the central axis.

In one variation, the cameras are positioned with respect to the direction or path of the moving vehicle such that a first camera is directed toward, although above the direction of the moving vehicle. The second camera is directed approximately 120 degrees to the left of, in addition to designated degrees above, the direction of the moving vehicle. The third camera is directed approximately 120 degrees to the right of, in addition to designated degrees above, the direction of the moving vehicle. In another variation, the first camera is directed 180 degrees from, in addition to designated degrees above, the direction of the moving vehicle. The second camera is directed 60 degrees to the left of, in addition to designated degrees above, the direction of the moving vehicle. The third camera is directed 60 degrees to the right of, in addition to designated degrees above, the direction of the moving vehicle.

Figure 21:
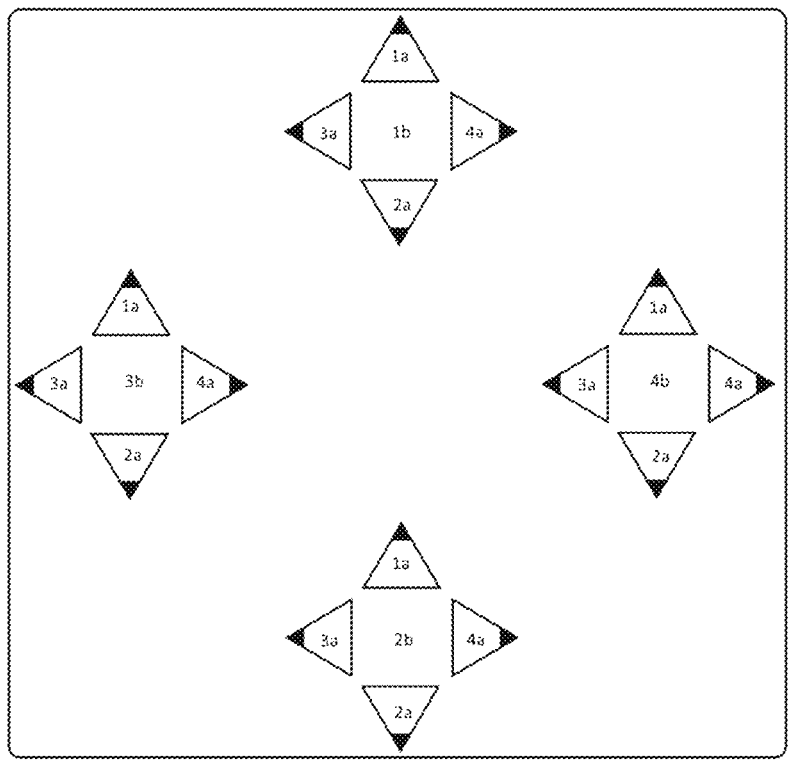
FIG. 21 is a schematic of a camera array system featuring four clusters of four upward-facing cameras.

As shown in FIG. 21, the camera array system may feature four clusters (1b, 2b, 3b, and 4b) of the type shown in FIG. 18. The camera clusters may be spaced approximately equidistantly around a center point, such that the first camera cluster is disposed at approximately 0 degrees, the second at approximately 180 degrees, the third at 270 degrees, and the fourth at 90 degrees. This camera array system enables a combination of parallel directions and intersecting forward directions between cameras of different clusters having intersecting points. Intersecting forward directions occur between, first, camera 1a of cluster 1b and camera 2a of cluster 2b, and second, camera 3a of cluster 3b and camera 4a of cluster 4b. Parallel directions occur amongst, first, cameras 1a of each cluster, second, cameras 2a of each cluster, third, cameras 3a of each cluster, and fourth cameras 4a of each cluster. The combination of intersecting forward directions and parallel directions enable superior stitching of footage. In general, and throughout, cameras must have the same angle upward from the plate in order for parallel directions to be possible.

Figure 22:
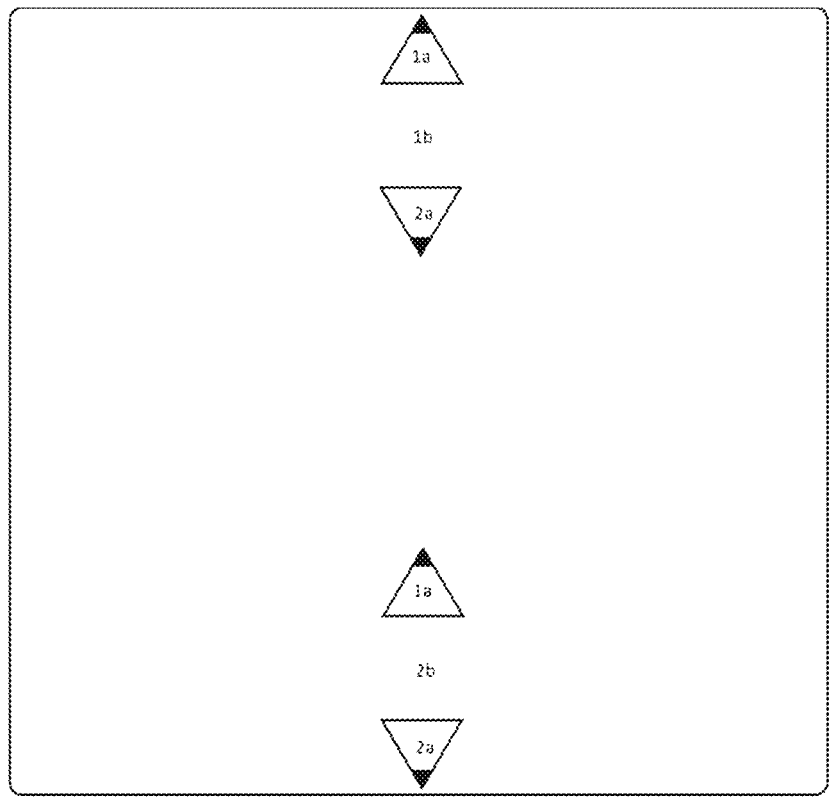
FIG. 22 is a schematic of a camera array system featuring two clusters of two upward-facing cameras.

As shown in FIG. 22, the camera array system may feature two clusters (1a and 1b) of the type shown in FIG. 19. The camera clusters may be spaced approximately equidistantly around a center point, such that the first camera cluster is disposed at approximately 0 degrees and the second is disposed at approximately 180 degrees. Intersecting forward directions occur between camera 1a of cluster 1b and camera 2a of cluster 2b. Parallel directions occur amongst, first, camera 1a of cluster 1b and camera 1a of cluster 2b, and second, camera 2a of cluster 1b and camera 2a of cluster 2b.

Figure 23:
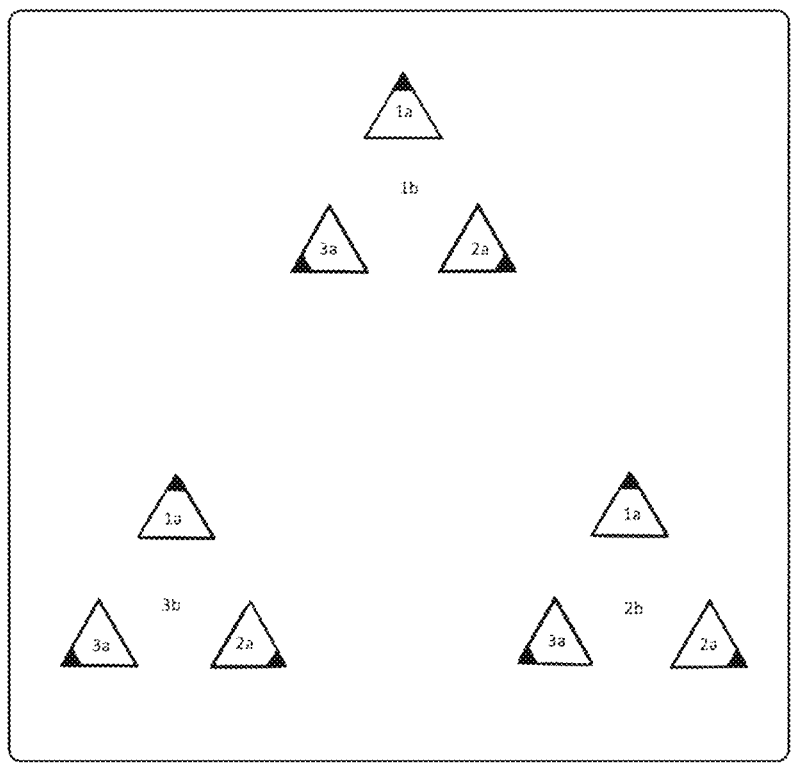
FIG. 23 is a schematic of a camera array system featuring three clusters of three upward-facing cameras.

As shown in FIG. 23, the camera array system may feature three clusters of the type shown in FIG. 20. The camera clusters may be spaced approximately equidistantly around a center point, such that the first camera cluster is disposed at approximately 0 degrees, the second is disposed at approximately 120 degrees, and the third is disposed at approximately 240 degrees. Intersecting forward directions occur between camera 1a of cluster 1b, camera 2a of cluster 2b, and camera 3a of cluster 3b. Parallel directions occur amongst, first, cameras 1a of each cluster, second, cameras 2a of each cluster, and third, cameras 3a of each cluster.

Figure 24:
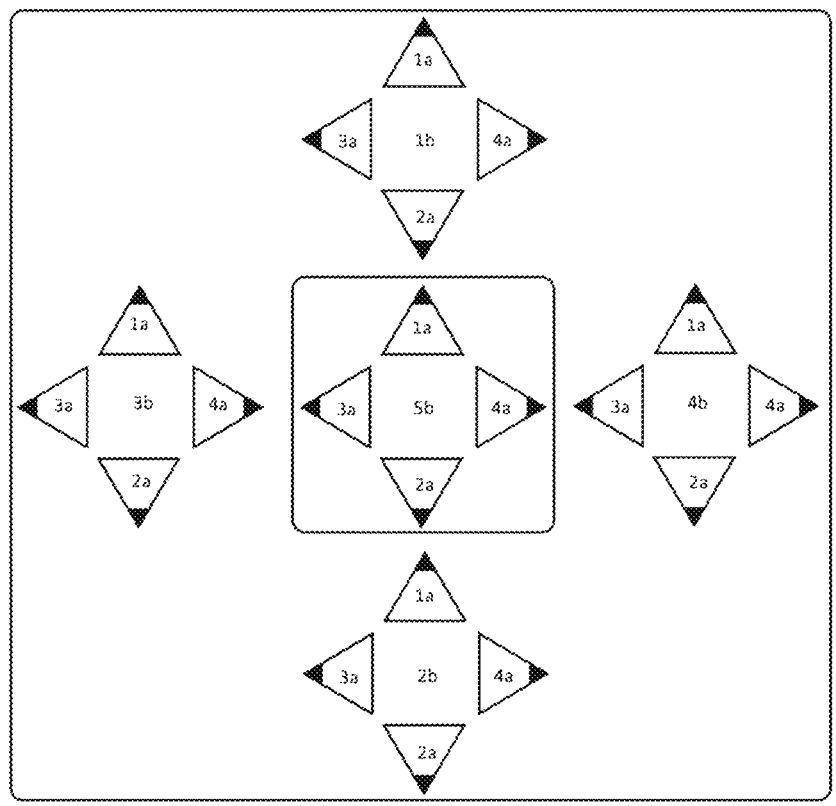
FIG. 24 is a schematic of a camera array system featuring five clusters of four upward-facing cameras.

As shown in FIG. 24, the camera array system may feature the four clusters of the type shown in FIG. 21, with an additional fifth cluster (5b) disposed in the approximate center of the four clusters. Amongst the cameras of cluster 5b, camera 1a can be included in the first parallel direction referenced for FIG. 21, camera 2a can be included in the second parallel direction, camera 3a can be included in the third parallel direction, and camera 4a can be included in the fourth parallel direction. Additional intersecting forward directions may occur between cameras 1a, 2a, 3a, and 4a of cluster 5b with, respectively, camera 2a of cluster 2b, camera 1a of cluster 1b, camera 4a of cluster 4b, and camera 3a of cluster 3b.

Figure 25:
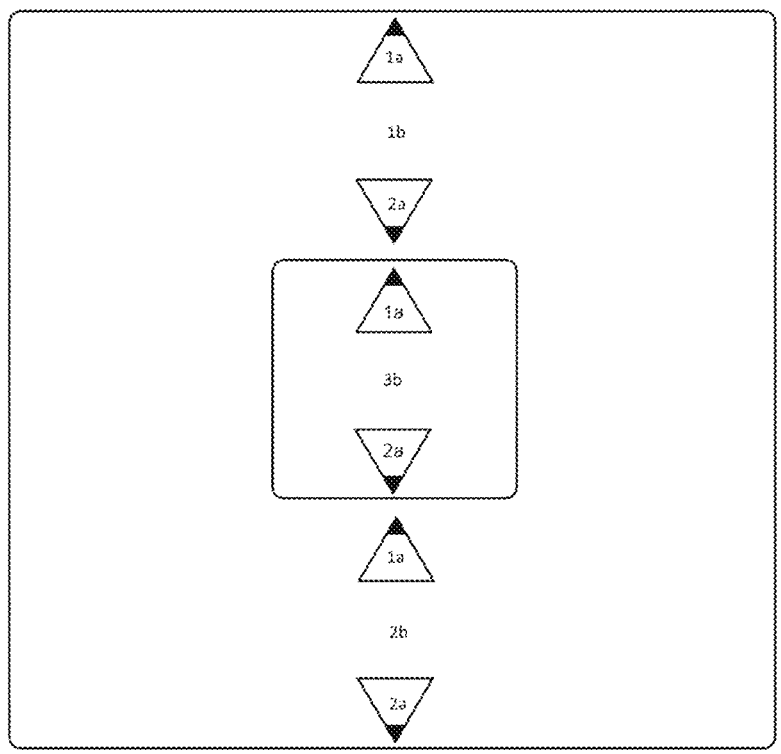
FIG. 25 is a schematic of a camera array system featuring three clusters of two upward-facing cameras.

As shown in FIG. 25, the camera array system may feature the two clusters of the type shown in FIG. 22, with an additional third cluster (3b) disposed between the two clusters. Amongst the cameras of cluster 3b, camera 1a can be included in the first parallel direction and camera 2a can be included in the second parallel direction. Additional intersecting forward directions may occur between cameras 1a and 2a of cluster 3b with, respectively, camera 2a of cluster 2b and camera 1a of cluster 1b.

Figure 26:
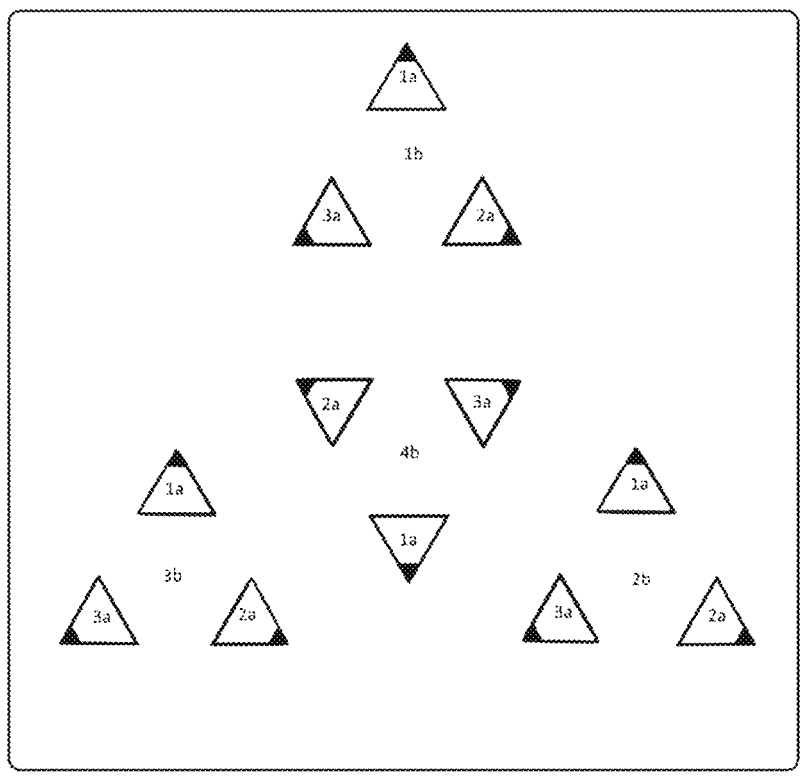
FIG. 26 is a schematic of a camera array system featuring four clusters of three upward-facing cameras.

As shown in FIG. 26, the camera array system may feature the three clusters of the type shown in FIG. 23, with an additional fourth cluster (4b) disposed in the approximate center of the three clusters. No additional parallel directions may be enabled by this configuration, but additional intersecting forward directions may occur between cameras 1a, 2a, and 2a of cluster 4b with, respectively, camera 1a of cluster 1b, camera 2a of cluster 2b, and camera 3a of cluster 3b.

Figure 27:
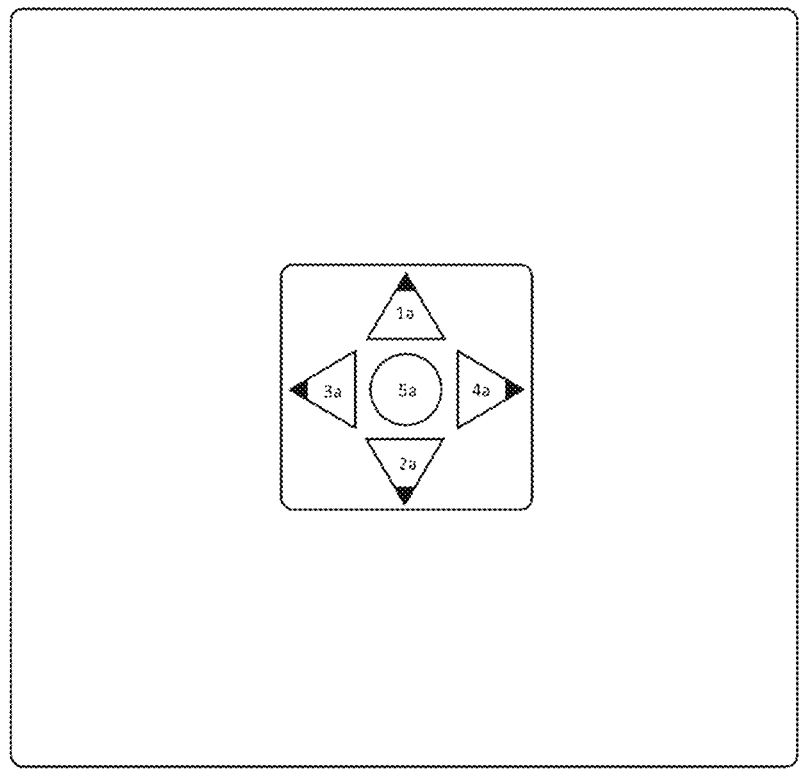
FIG. 27 is a schematic of a camera array system featuring a cluster of five upward-facing cameras.

As shown in FIG. 27, the camera array system may feature the four-camera cluster of the type shown in FIG. 18, with an additional camera 5a. Camera 5a is angled approximately 90 degrees from the plate, and therefore its forward direction intersects those of cameras 1a, 2a, 3a, and 4a.

Figure 28:
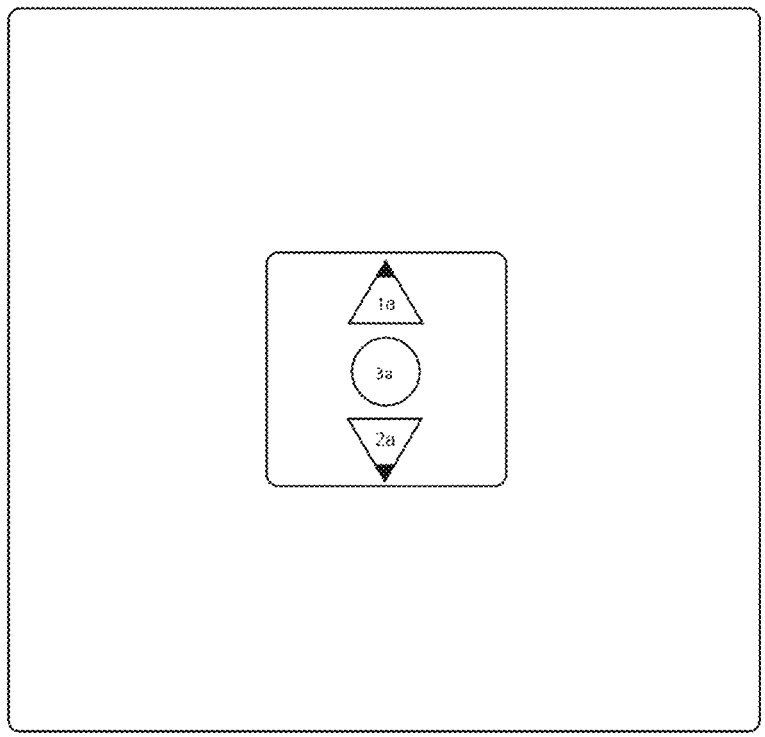
FIG. 28 is a schematic of a camera array system featuring a cluster of three upward-facing cameras.

As shown in FIG. 28, the camera array system may feature the two-camera cluster of the type shown in FIG. 19, with an additional camera 3a. Camera 3a is angled approximately 90 degrees from the plate, and therefore its forward direction intersects those of cameras 1a and 2a.

Figure 29:
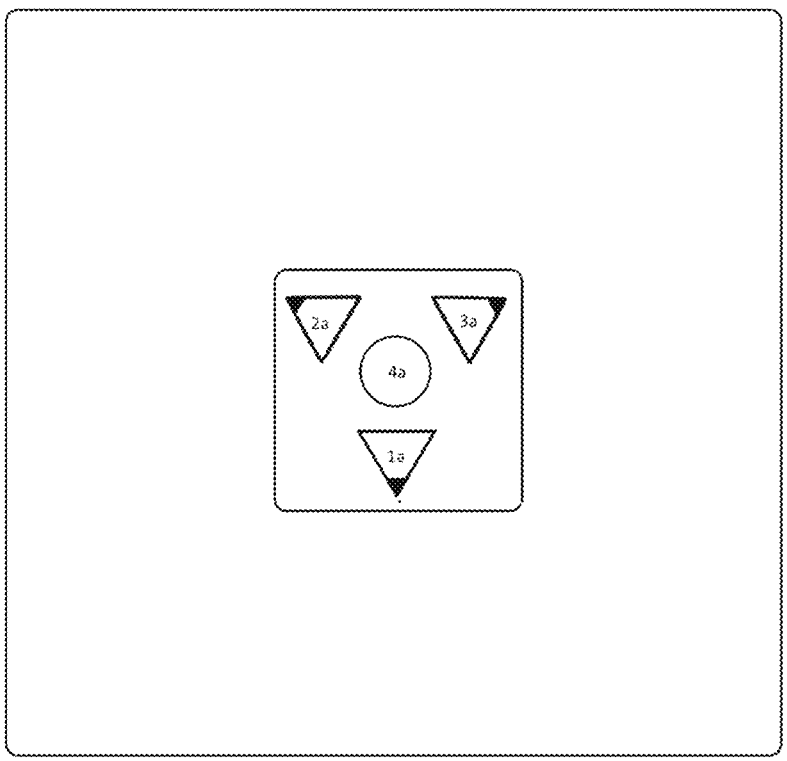
FIG. 29 is a schematic of a camera array system featuring a cluster of four upward-facing cameras.

As shown in FIG. 29, the camera array system may feature the three-camera cluster of the type shown in FIG. 20, with an additional camera 4a. Camera 4a is angled approximately 90 degrees from the plate, and therefore its forward direction intersects those of cameras 1a, 2a, and 3a.

Figure 30:
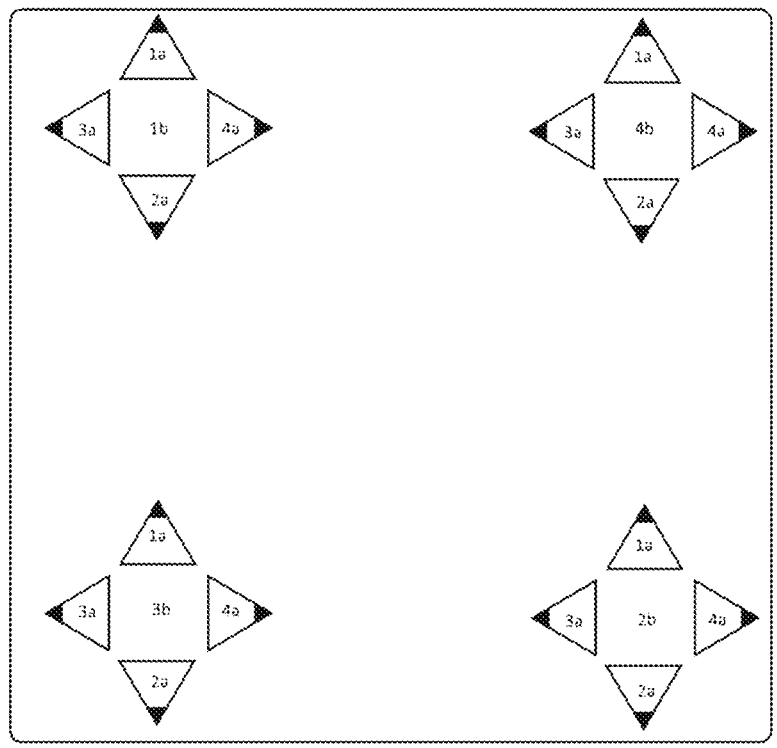
FIG. 30 is a schematic of a camera array system featuring four clusters of four upward-facing cameras.

As shown in FIG. 30, the camera array system may feature a modified version of the four-camera cluster of the type shown in FIG. 21. This configuration provides for the same parallel view engagements amongst the cameras; however, the intersecting forward directions are different: first, camera 1a of cluster 1b with camera 2a of cluster 3b, second, camera 1a of cluster 4b with camera 2a of cluster 2b, third, camera 3a of cluster 1b with camera 4a of cluster 4b, and fourth, camera 3a of cluster 3b with camera 4a of cluster 2b.

Figure 31:
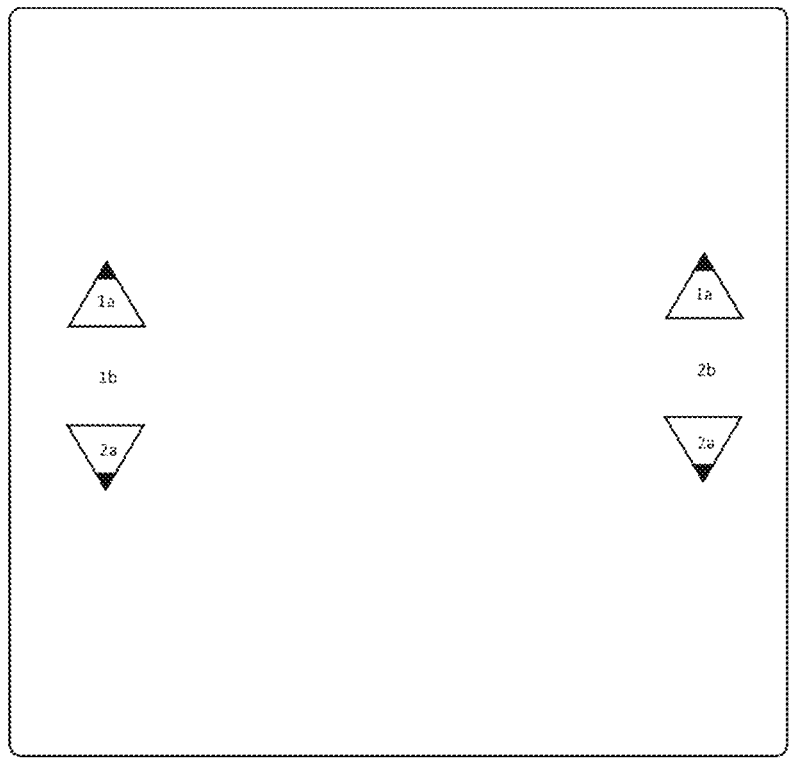
FIG. 31 is a schematic of a camera array system featuring two clusters of two upward-facing cameras.
Figure 32:
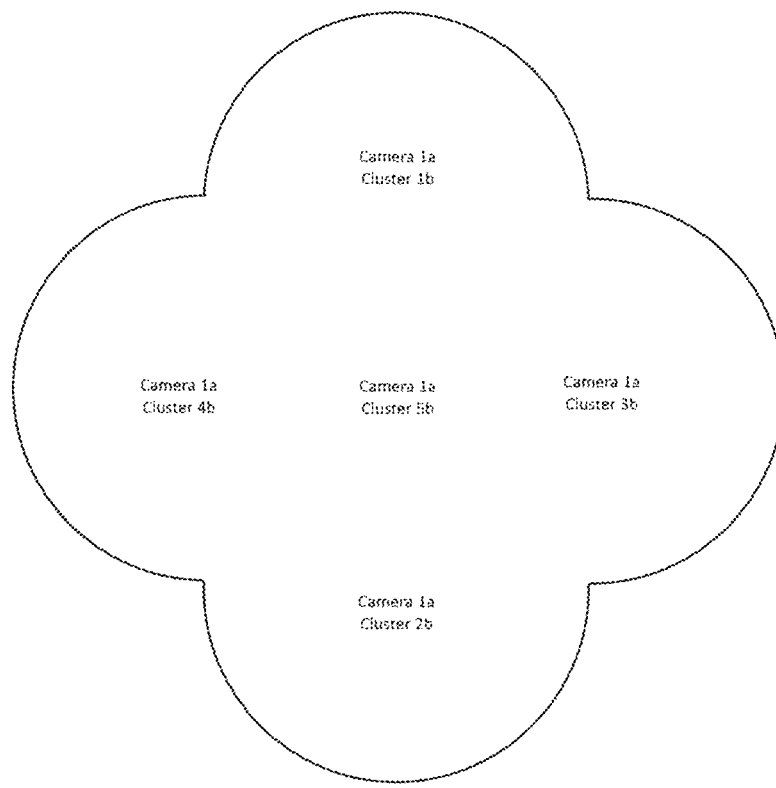
FIG. 32 is a schematic showing the relative positions of footage captured by the parallel views of the cameras in FIG. 24.
Figure 33:
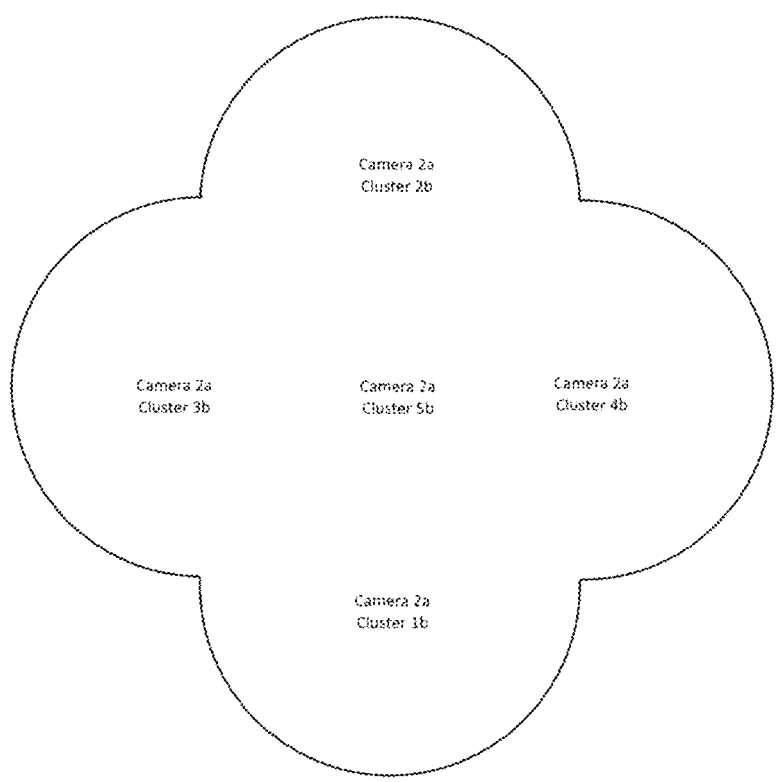
FIG. 33 is a schematic showing the relative positions of footage captured by the parallel views of the cameras in FIG. 24.
Figure 34:
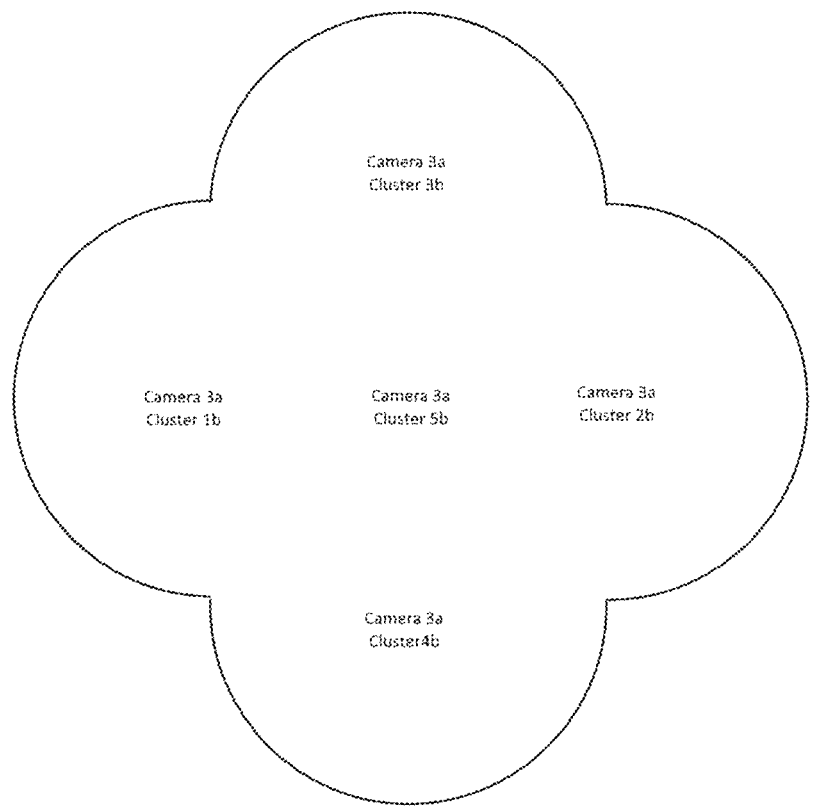
FIG. 34 is a schematic showing the relative positions of footage captured by the parallel views of the cameras in FIG. 24.
Figure 35:
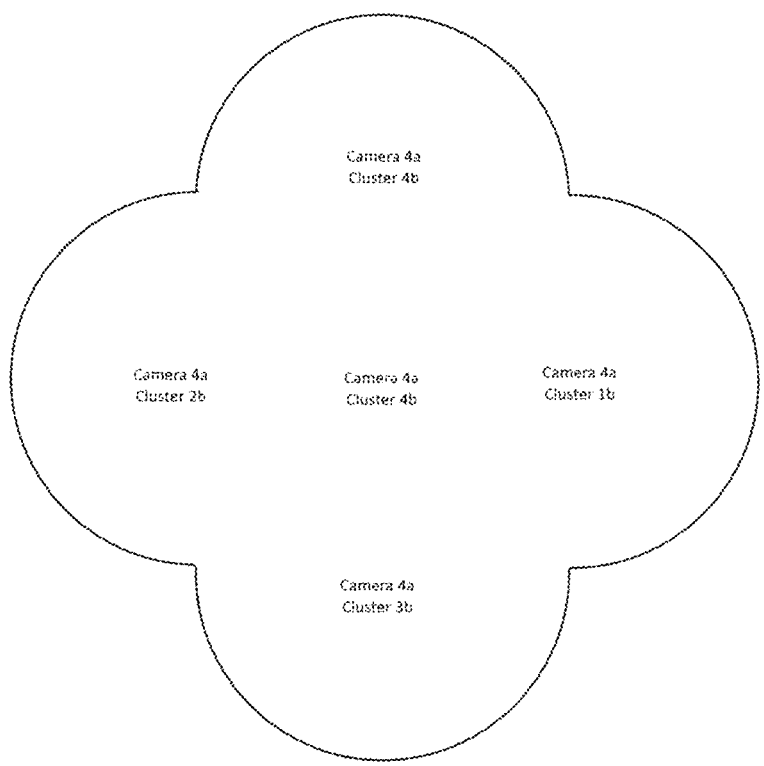
FIG. 35 is a schematic showing the relative positions of footage captured by the parallel views of the cameras in FIG. 24.

As shown in FIG. 31, the camera array system may feature a modified version of the two-camera cluster of the type shown in FIG. 22. This configuration provides for the same parallel view engagements amongst the cameras, but does not enable intersecting directions between clusters.

Figure 36:
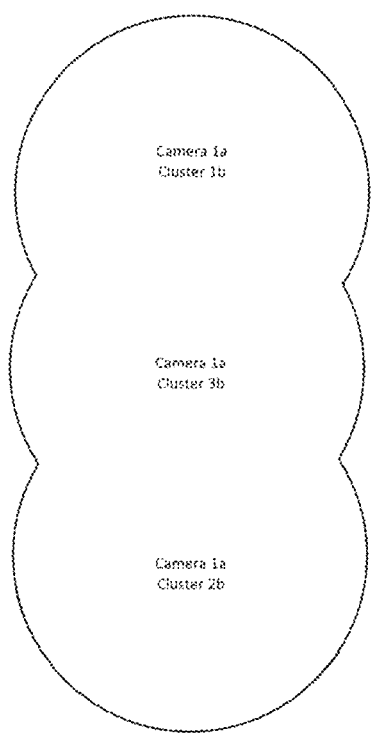
FIG. 36 is a schematic showing the relative positions of footage captured by the parallel views of the cameras in FIG. 25.
Figure 37:
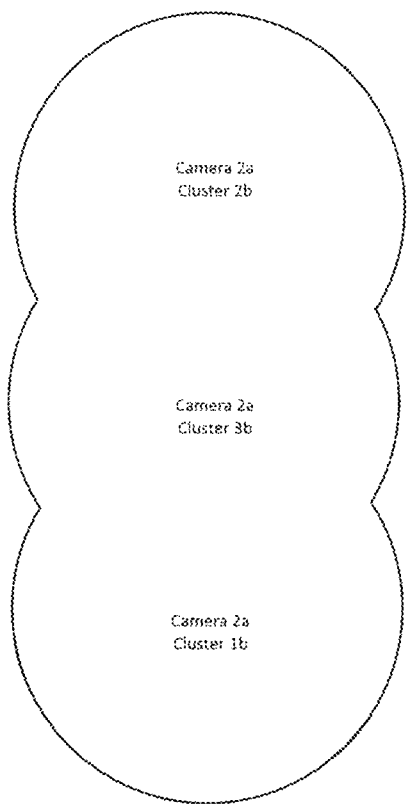
FIG. 37 is a schematic showing the relative positions of footage captured by the parallel views of the cameras in FIG. 25.
Figure 38:
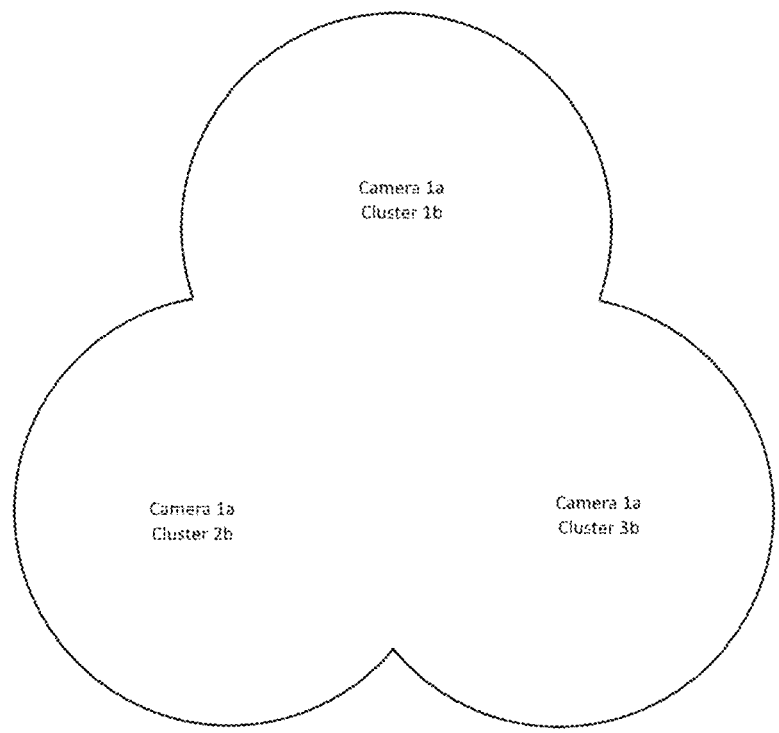
FIG. 38 is a schematic showing the relative positions of footage captured by the parallel views of the cameras in FIG. 23.
Figure 39:
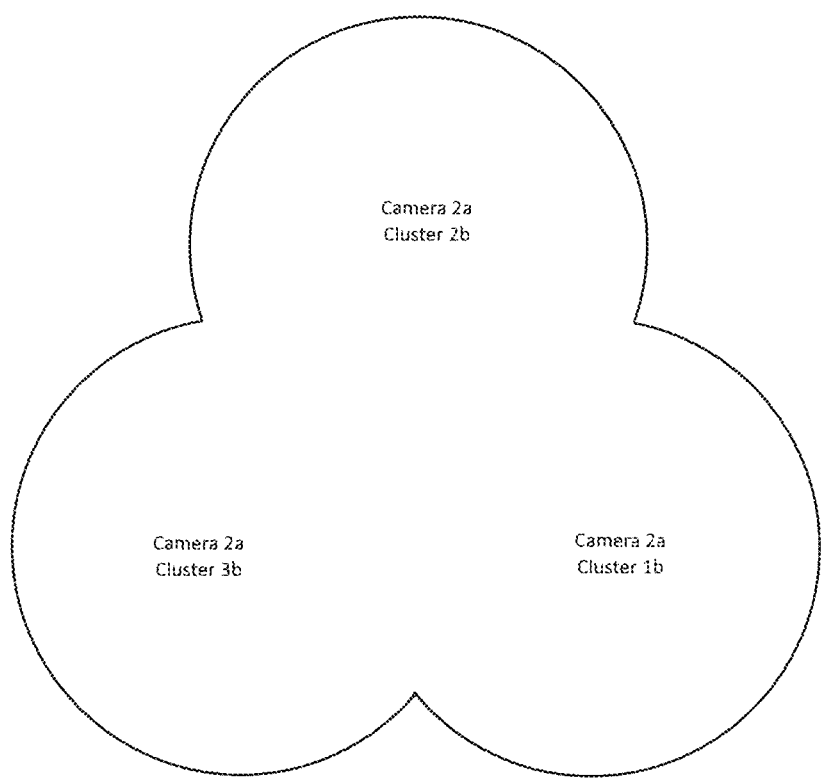
FIG. 39 is a schematic showing the relative positions of footage captured by the parallel views of the cameras in FIG. 23.
Figure 40:
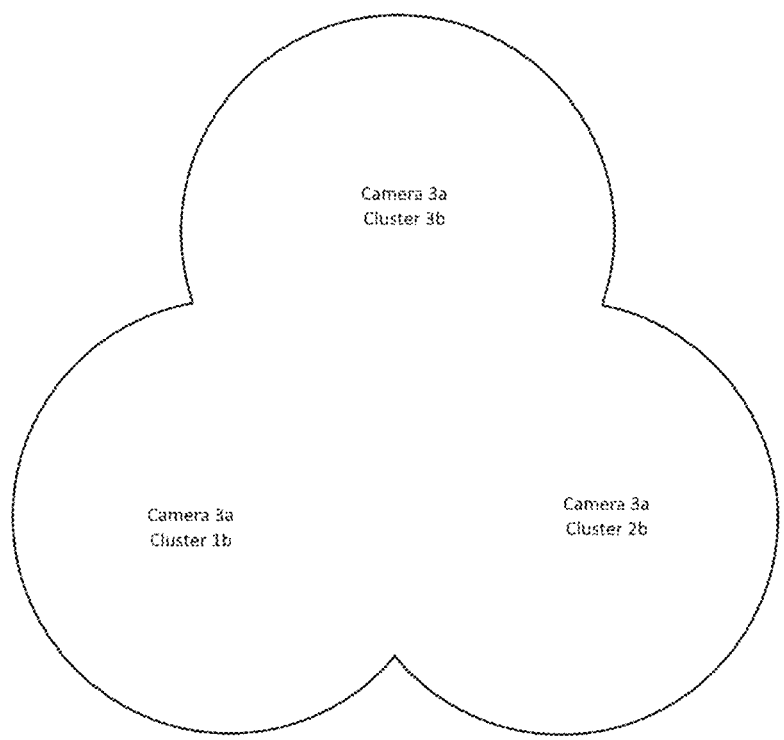
FIG. 40 is a schematic showing the relative positions of footage captured by the parallel views of the cameras in FIG. 23.

FIGS. 32-35 show the relative positions of the footage captured by the parallel views in FIG. 24. FIGS. 36-37 show the relative positions of the footage captured by the parallel views in FIG. 25. FIGS. 38-40 show the relative positions of the footage captured by the parallel views in FIG. 23.

Figure 41:
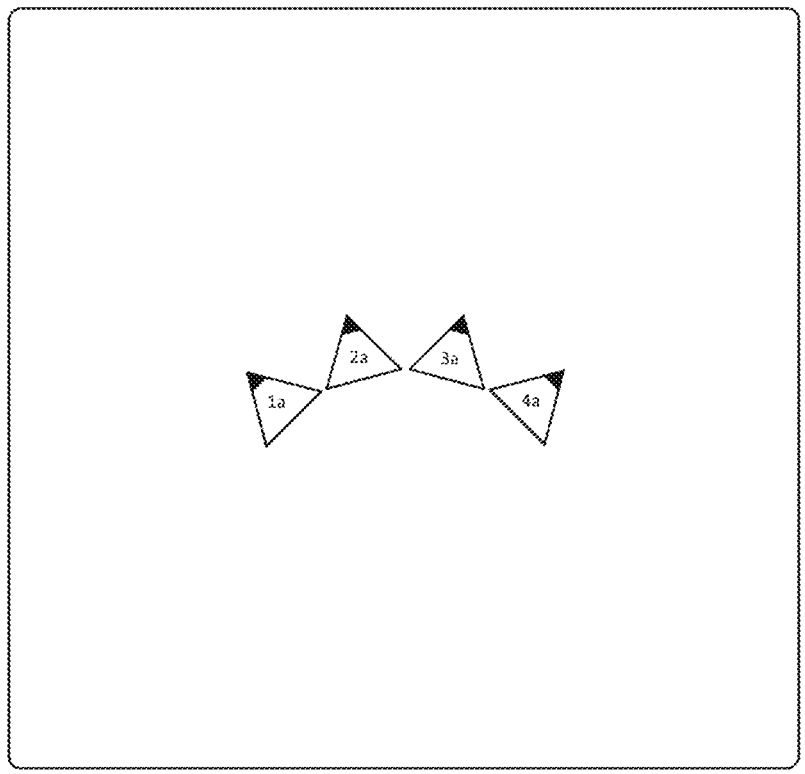
FIG. 41 is a schematic of a camera array system featuring a cluster of four upward-facing cameras.

As shown in FIG. 41, the camera array system may feature clusters of four cameras (1a, 2a, 3a, 4a) with intersecting forward directions. The cameras are spaced approximately equidistantly around a center point without fully surrounding the point. Here, each camera is positioned between 0 and 60 degrees from its neighboring camera.

Figure 42:
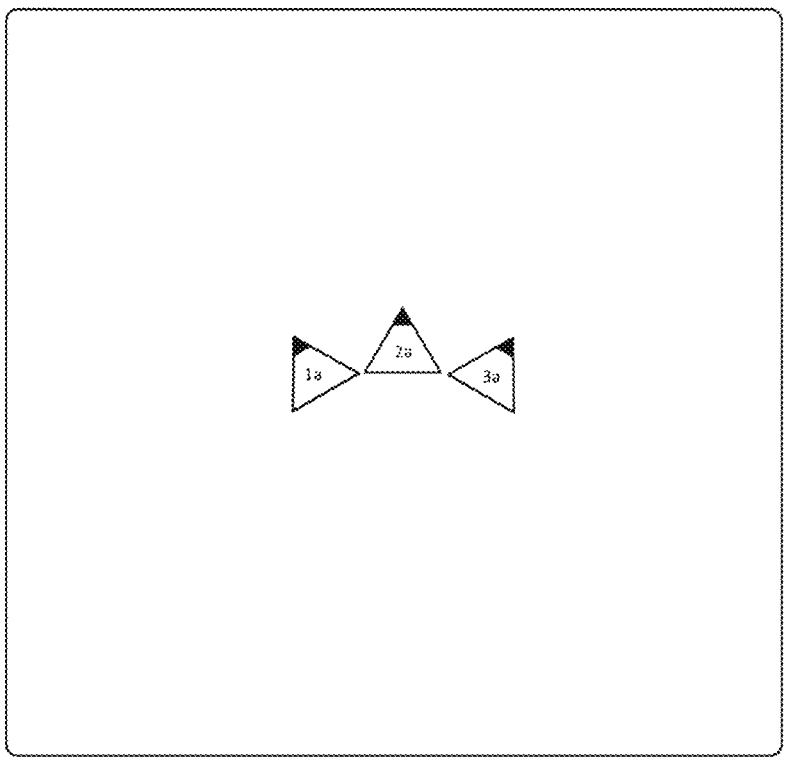
FIG. 42 is a schematic of a camera array system featuring a cluster of three upward-facing cameras.

As shown in FIG. 42, the camera array system may feature clusters of two cameras (1a and 2a) with intersecting forward directions. The cameras are spaced approximately equidistantly around a center point without fully surrounding the point. Here, each camera is positioned between 0 and 180 degrees from its neighboring camera.

Figure 43:
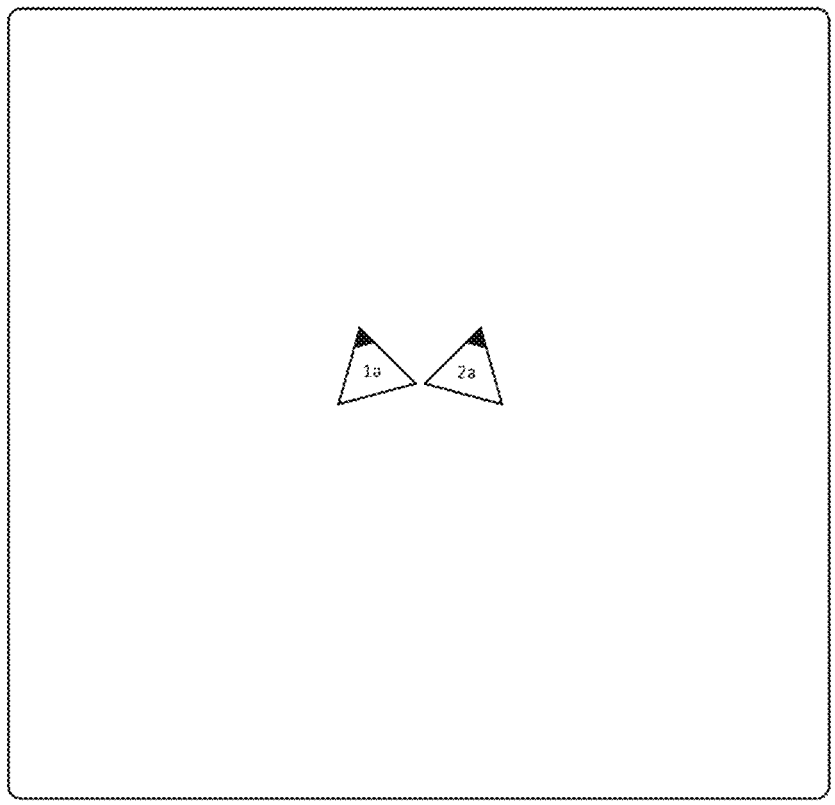
FIG. 43 is a schematic of a camera array system featuring a cluster of two upward-facing cameras.

As shown in FIG. 43, the camera array system may feature clusters of three cameras (1a, 2a, and 3a) with intersecting forward directions. The cameras are spaced approximately equidistantly around a center point without fully surrounding the point. Here, each camera is positioned between 0 and 90 degrees from its neighboring camera.

Figure 44:
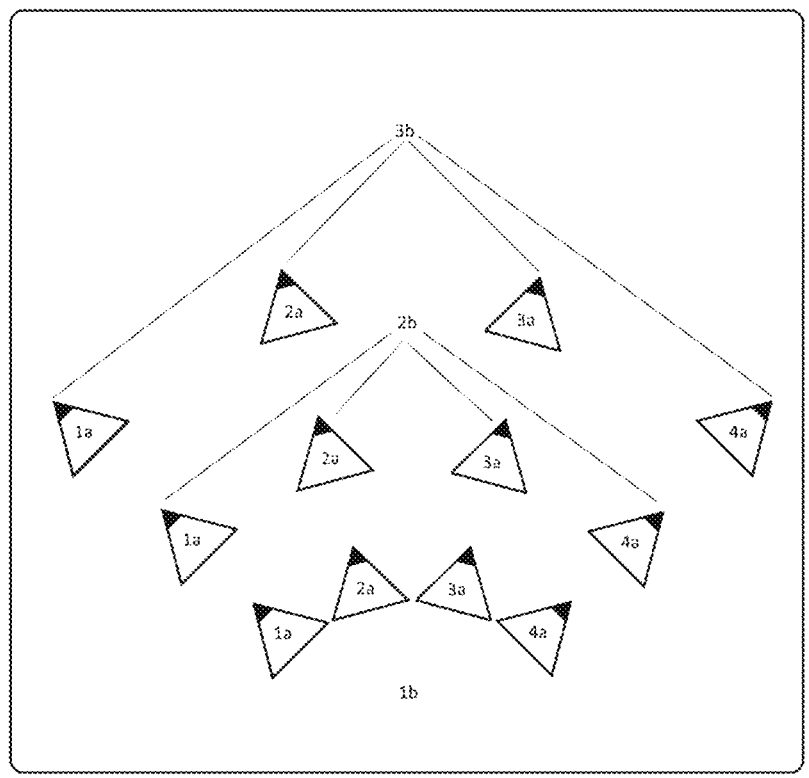
FIG. 44 is a schematic of a camera array system featuring three tiers of upward-facing cameras.

As shown in FIG. 44, the camera array system may two or more clusters of cameras, with each cluster having the same positioning with respect to its neighboring camera around the center point. However, the clusters here are arranged in tiers, with each additional tier being placed behind the preceding tier. Consequently, there is greater distance between each camera within a cluster in each succeeding tier. In one variation, cameras 1a, cameras 2a, cameras 3a, and cameras 4a have first, second, third, and fourth parallel views across clusters such that, for example, camera 1a in cluster 1b, camera 1a in cluster 2b, and camera 1a in cluster 3b have parallel views. In this variation, the cameras of all clusters have a common upward angle above the plate. In another variation, however, cameras within a cluster may have a common upward angle above the plate, but different angles may arise across clusters. Thus, cameras 1a, cameras 3a, cameras 3a, and cameras 4a across all clusters may have a common point of intersection. This is possible if clusters in succeeding tiers have lower upward angles above the plate than clusters in preceding tiers. For example, the cameras in cluster 1b may have an upward angle of 75 degrees while cameras in cluster 2b, which are positioned behind the cameras in cluster 1b, may have an upward angle of 60 degrees, and cameras in cluster 3b may have an upward angle of 45 degrees.

Figure 45:
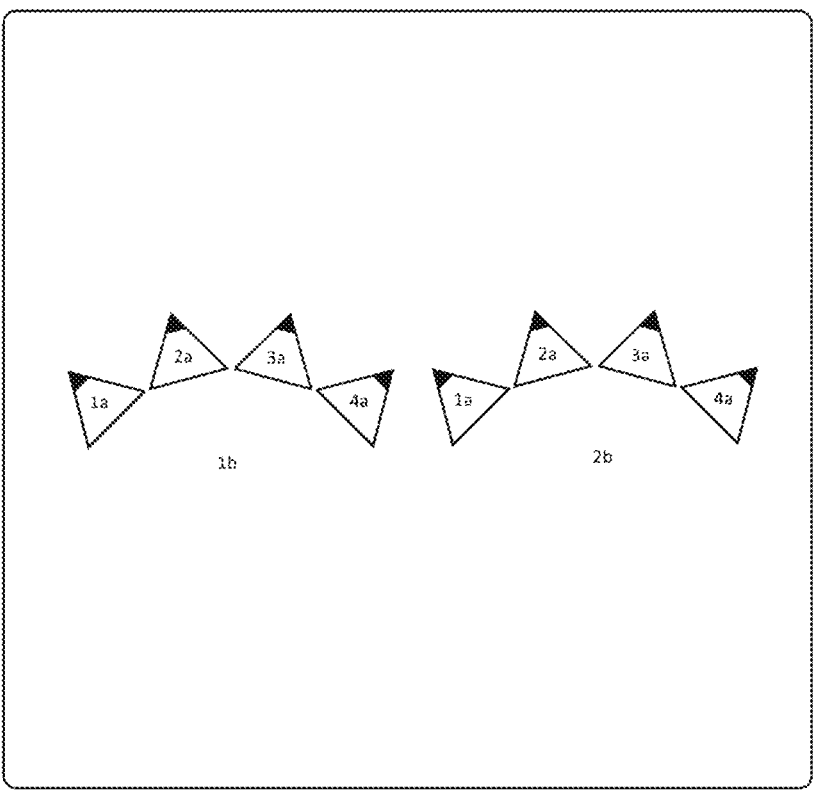
FIG. 45 is a schematic of a camera array system featuring two clusters of four upward-facing cameras.

As shown in FIG. 45, the camera array system may have two or more clusters of cameras, with each cluster having the same positioning with respect to its neighboring camera around their center points as well as each camera within a cluster being equidistant from its neighbor. This is possible if each cluster has its own center. Thus, the clusters may be placed side by side. Parallel directions occur amongst, first, cameras 1a of each cluster, second, cameras 2a of each cluster, third, cameras 3a of each cluster, and fourth cameras 4a of each cluster.

Figure 46:
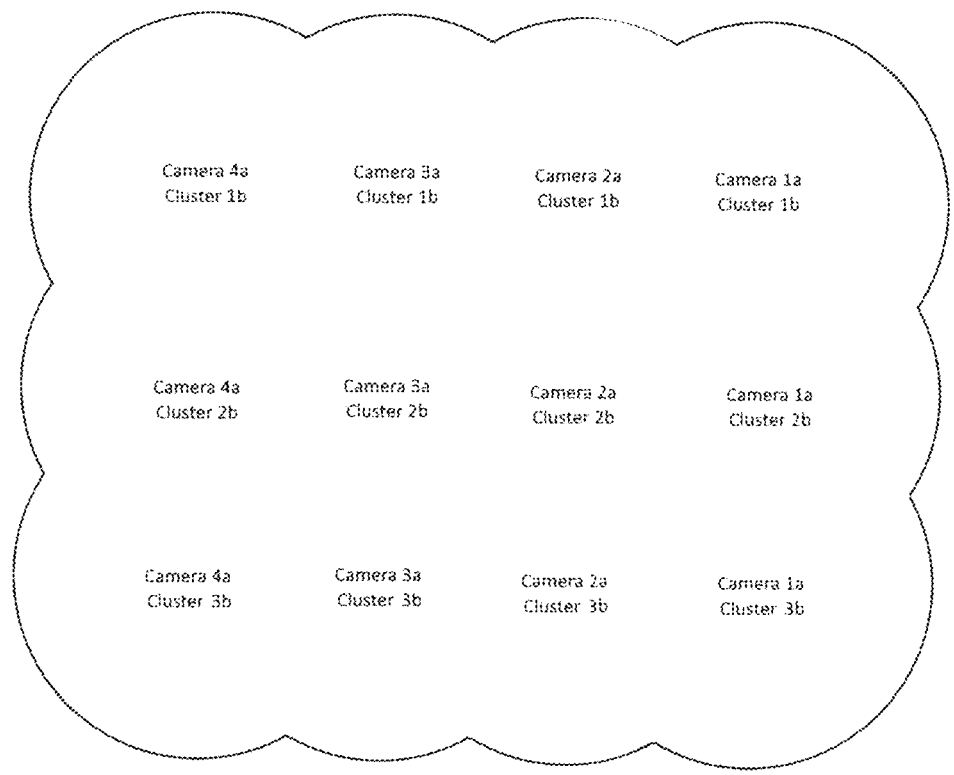
FIG. 46 is a schematic showing the relative positions of footage captured by the parallel views of the cameras in FIG. 44.

FIG. 46 shows the relative position of the footage captured by the views in FIG. 44.

Figure 47:
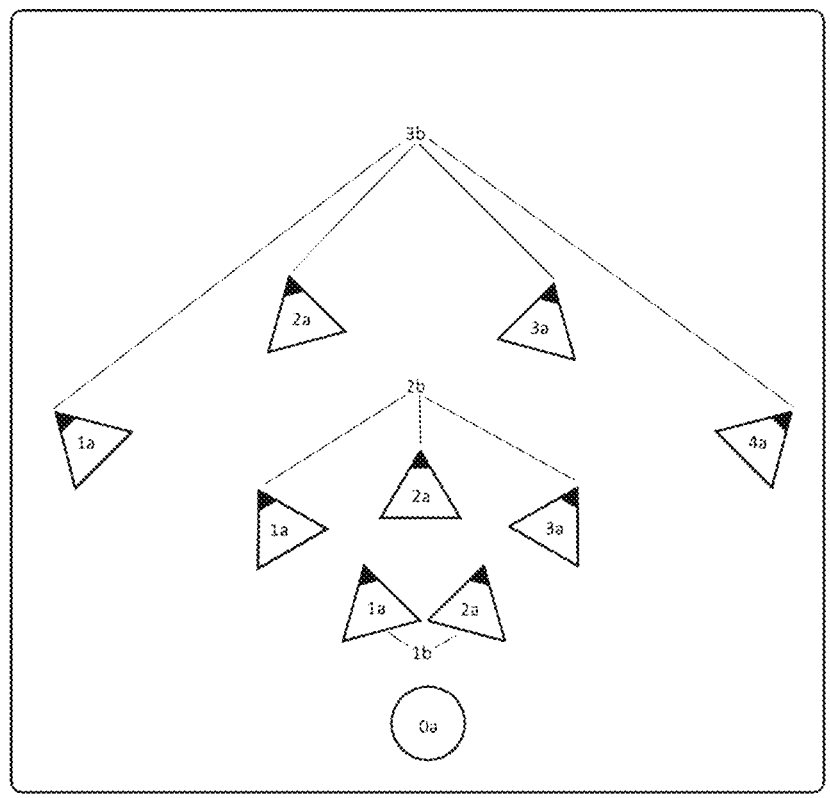
FIG. 47 is a schematic of a camera array system featuring three tiers of upward-facing cameras.

FIG. 47 is similar to FIG. 44, except that the number of cameras changes per clusters. In a preferred embodiment, each succeeding tier contains more cameras than the preceding tier. At the center may be a "zero tier" cluster (0a) of a single camera. In one variation, this single camera is directed 90 degrees from the plate.

Figure 48:
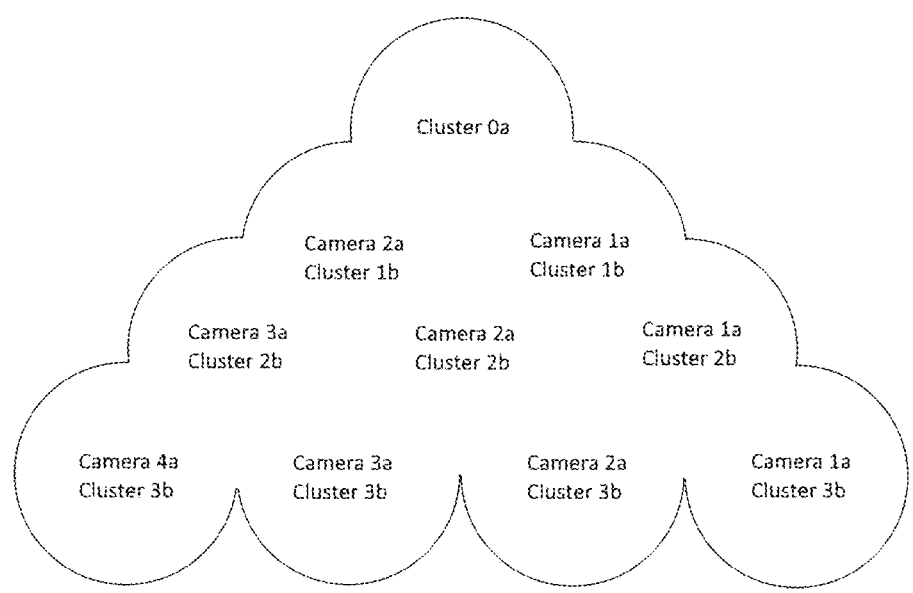
FIG. 48 is a schematic showing the relative positions of footage captured by the parallel views of the cameras in FIG. 47.

FIG. 48 shows the relative position of the footage captured by the views in FIG. 47.

Figure 49:
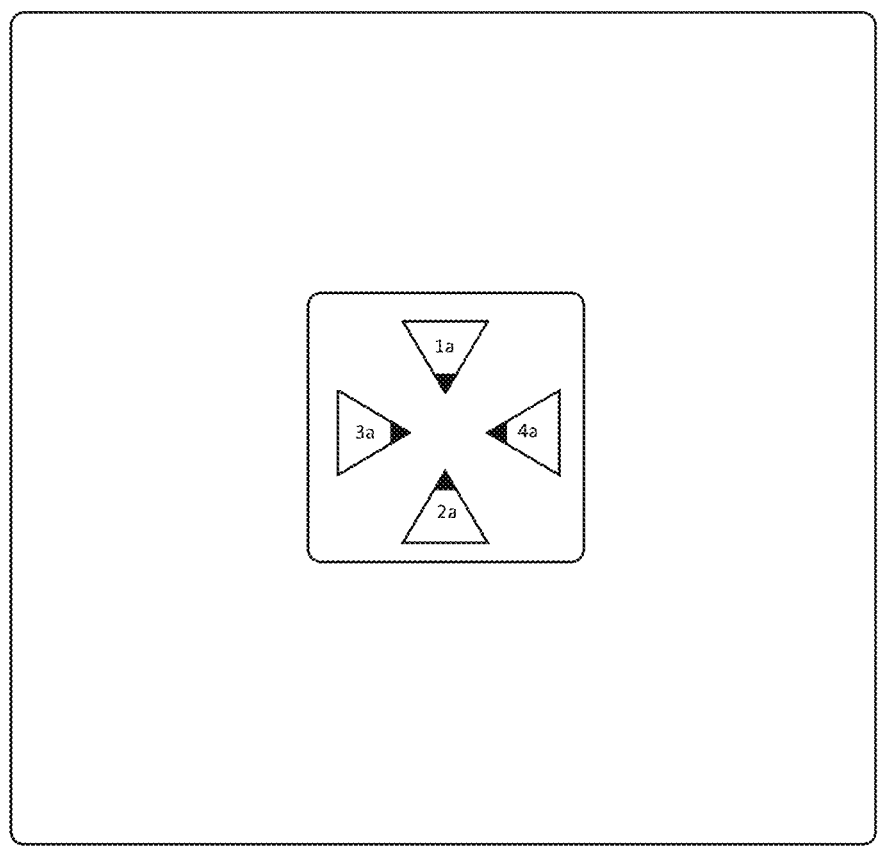
FIG. 49 is a schematic of a camera array system featuring a cluster of four cameras.

FIG. 49 is similar to FIG. 18, showing a camera array system featuring a cluster of four upward facing cameras (1a, 2a, 3a, and 4a), however the upward facing cameras are not targeting a common point in space. Although they are all facing upwards, they are facing away from each other in the horizontal plane. Crucially, however, the backwards directions of the cameras have a common point of intersection. This common point of intersection will be behind the cameras at a distance corresponding to the distance between the cameras. The cameras may be spaced approximately equidistantly around a center point, such that a first camera is disposed at approximately 0 degrees, a second at approximately 90 degrees, a third at 180 degrees, and a fourth at 270 degrees. The center between the cameras may align with the central axis of the car and therefore substantially in line with the direction of the moving vehicle. In one variation, the center is to the left of the central axis of the car. In another variation, the center is to the right of the central axis.

Figure 50:
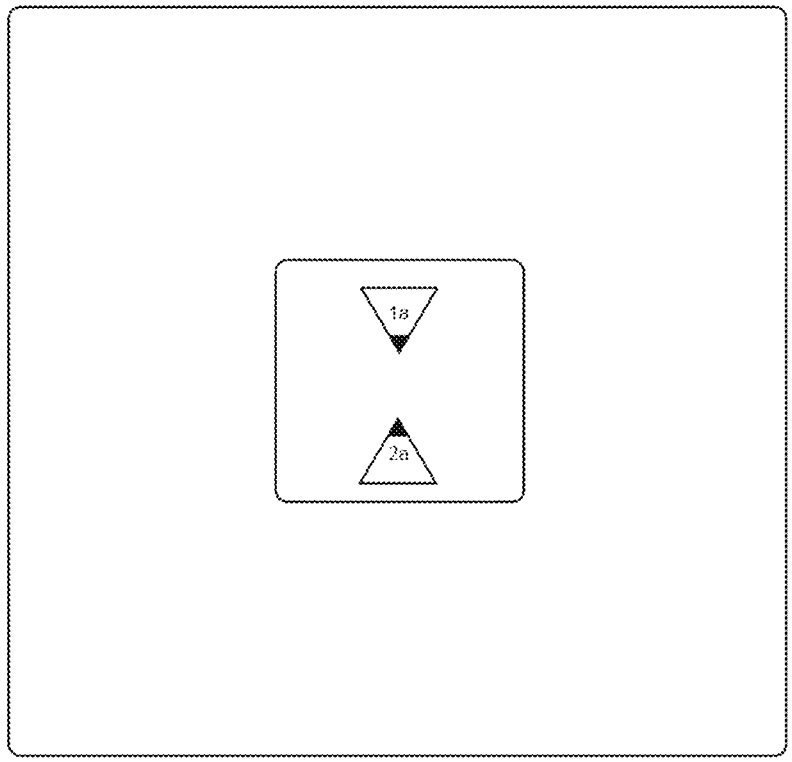
FIG. 50 is a schematic of a camera array system featuring a cluster of two upward-facing cameras.

FIG. 50 is similar to FIG. 19 in terms of positioning, however similar to the changes between FIG. 18 and FIG. 49, the upward facing cameras are not targeting a common point in space and do not have intersecting forward directions, but instead share a common point of intersection in their backwards directions.

Figure 51:
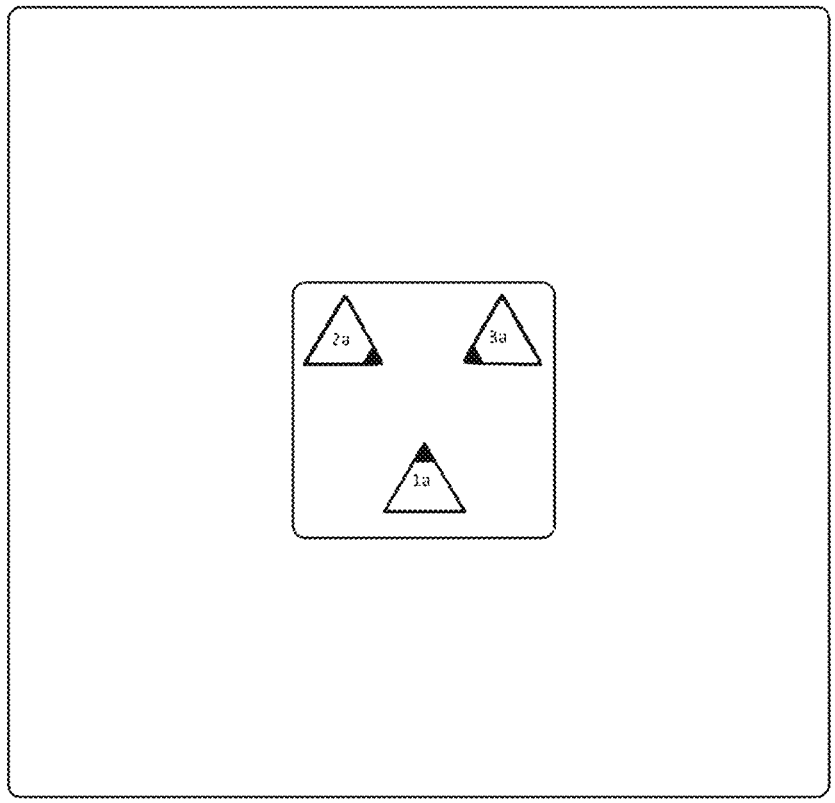
FIG. 51 is a schematic of a camera array system featuring a cluster of three upward-facing cameras.

FIG. 51 is similar to FIG. 20 in terms of positioning, however similar to the changes between FIG. 18 and FIG. 49, the upward facing cameras are not targeting a common point in space and do not have intersecting forward directions, but instead share a common point of intersection in their backwards directions.

Figure 52:
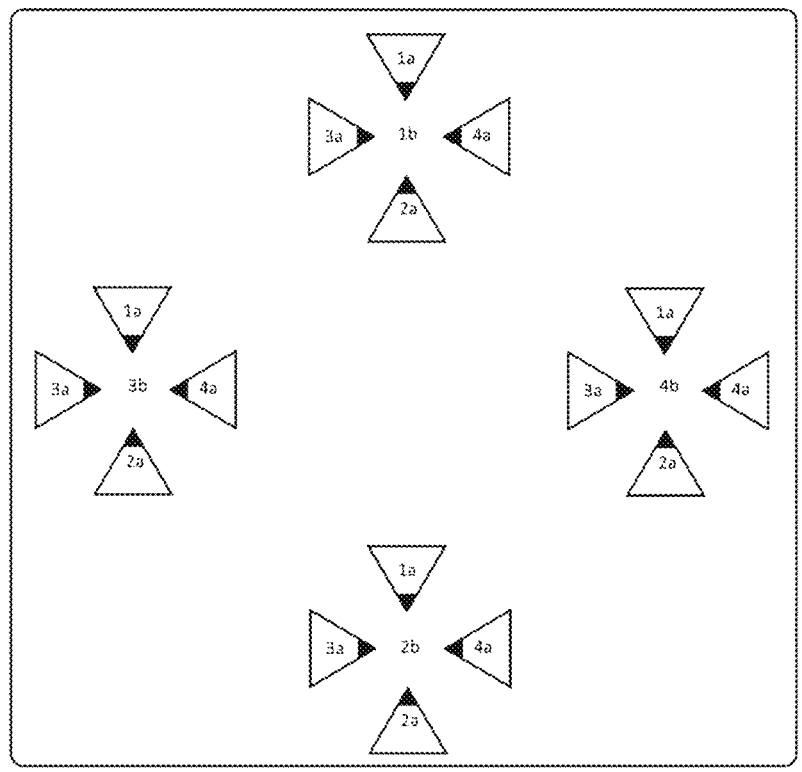
FIG. 52 is a schematic of a camera array system featuring four clusters of four upward-facing cameras.

FIG. 52 is similar to FIG. 21 in terms of positioning and parallel directions, however similar to the changes between FIG. 18 and FIG. 49, the upward facing cameras are not targeting a common point in space and do not have intersecting forward directions, but instead share a common point of intersection in their backwards directions. Intersecting backward directions occur between, first, camera 1a of cluster 1b and camera 2a of cluster 2b, and second, camera 3a of cluster 3b and camera 4a of cluster 4b. Parallel directions occur amongst, first, cameras 1a of each cluster, second, cameras 2a of each cluster, third, cameras 3a of each cluster, and fourth cameras 4a of each cluster. The combination of intersecting backward directions and parallel directions enable superior stitching of footage. In general, and throughout, cameras must have the same angle upward from the plate in order for parallel directions to be possible.

Figure 53:
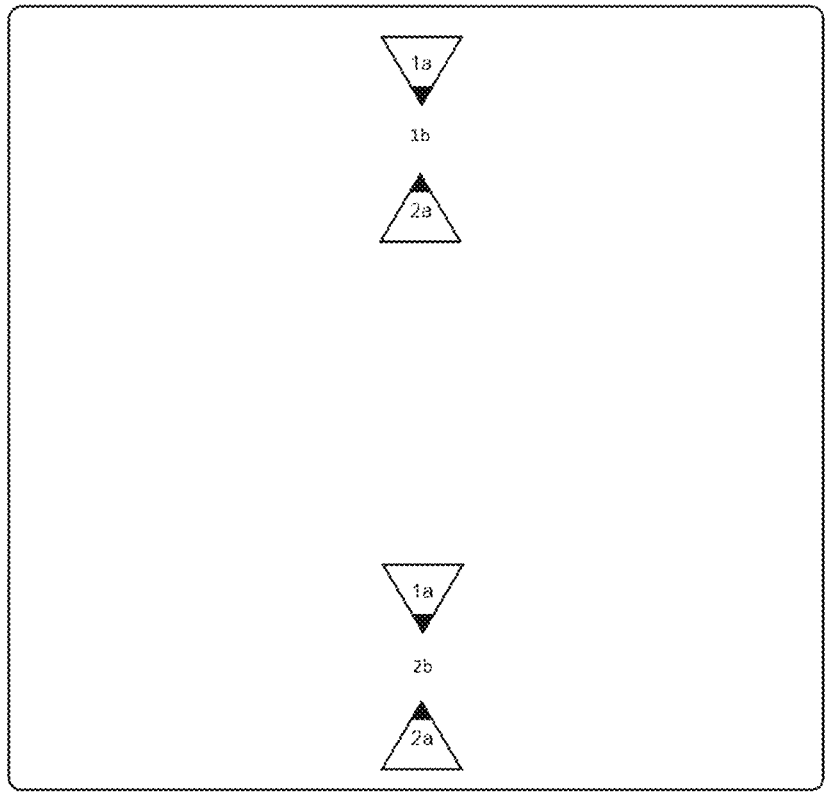
FIG. 53 is a schematic of a camera array system featuring two clusters of two upward-facing cameras.

FIG. 53 is similar to FIG. 22 in terms of positioning and parallel directions, however similar to the changes between FIG. 18 and FIG. 49, the upward facing cameras are not targeting a common point in space and do not have intersecting forward directions, but instead share a common point of intersection in their backwards directions. Intersecting backward directions occur between camera 1a of cluster 1b and camera 2a of cluster 2b. Parallel directions occur amongst, first, camera 1a of cluster 1b and camera 1a of cluster 2b, and second, camera 2a of cluster 1b and camera 2a of cluster 2b.

Figure 54:
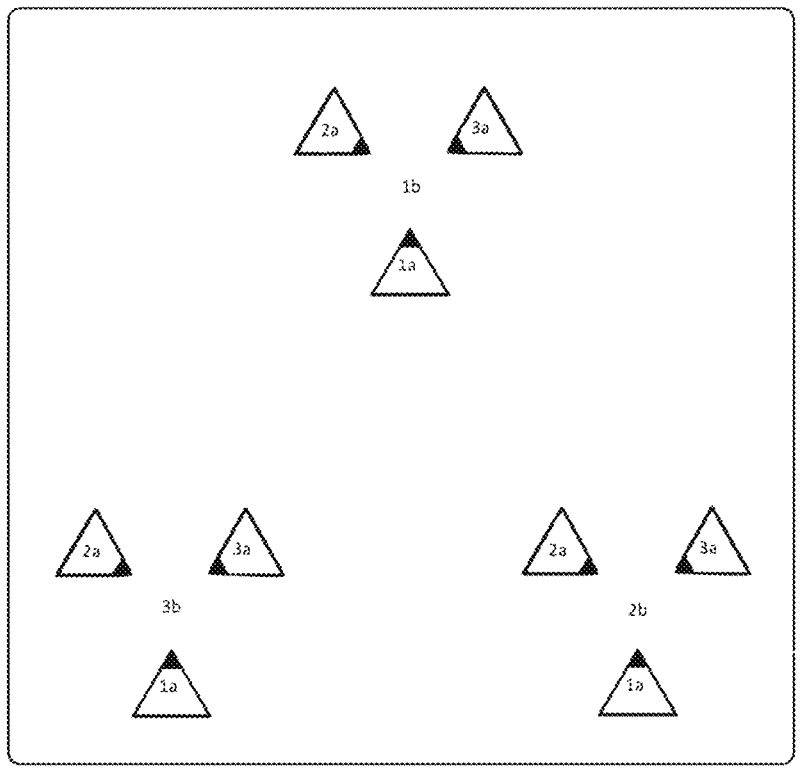
FIG. 54 is a schematic of a camera array system featuring three clusters of three upward-facing cameras.

FIG. 54 is similar to FIG. 23 in terms of positioning and parallel directions, however similar to the changes between FIG. 18 and FIG. 49, the upward facing cameras are not targeting a common point in space and do not have intersecting forward directions, but instead share a common point of intersection in their backwards directions. Intersecting backward directions occur between each of the cameras within each cluster. Parallel directions occur amongst, first, cameras 1a of each cluster, second, cameras 2a of each cluster, and third, cameras 3a of each cluster.

Figure 55:
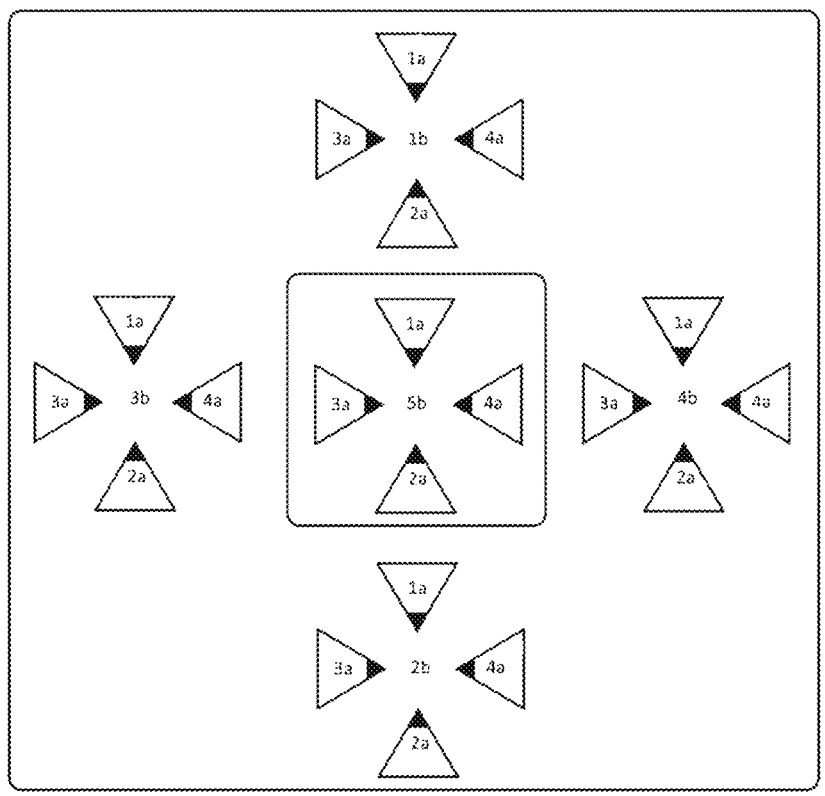
FIG. 55 is a schematic of a camera array system featuring five clusters of four upward-facing cameras.

FIG. 55 is similar to FIG. 24 in terms of positioning and parallel directions, however similar to the changes between FIG. 18 and FIG. 49, the upward facing cameras are not targeting a common point in space and do not have intersecting forward directions, but instead share a common point of intersection in their backwards directions. The camera array system is like the camera array system of FIG. 52 but features an additional fifth cluster (5b). Amongst the cameras of cluster 5b, camera 1a can be included in the first parallel direction referenced for FIG. 52, camera 2a can be included in the second parallel direction, camera 3a can be included in the third parallel direction, and camera 4a can be included in the fourth parallel direction. Additional intersecting backward directions may occur between cameras 1a, 2a, 3a, and 4a of cluster 5b with, respectively, camera 2a of cluster 2b, camera 1a of cluster 1b, camera 4a of cluster 4b, and camera 3a of cluster 3b.

Figure 56:
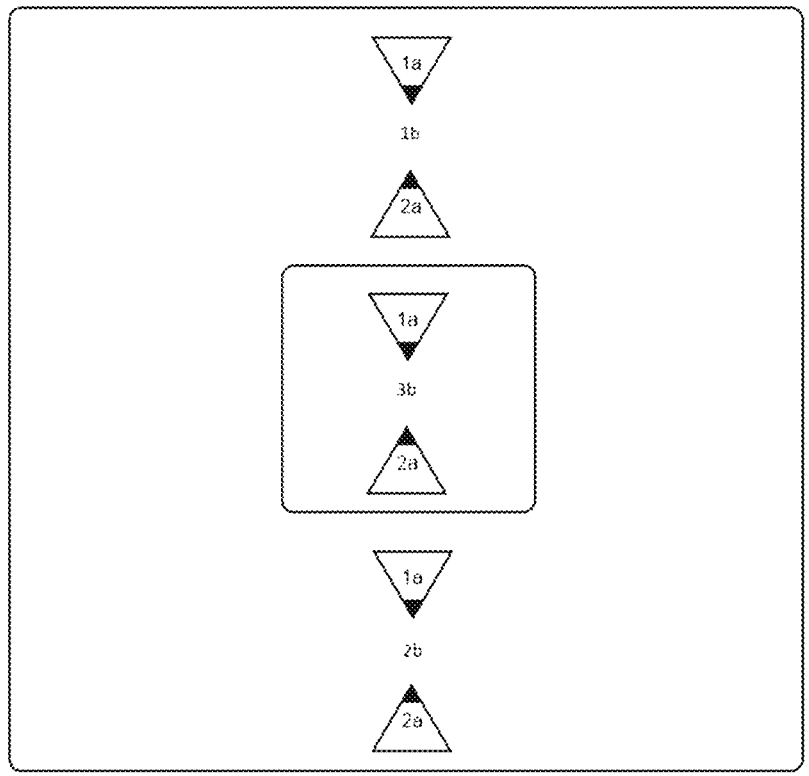
FIG. 56 is a schematic of a camera array system featuring three clusters of two upward-facing cameras.

FIG. 56 is similar to FIG. 25 in terms of positioning and parallel directions, however similar to the changes between FIG. 18 and FIG. 49, the upward facing cameras are not targeting a common point in space and do not have intersecting forward directions, but instead share a common point of intersection in their backwards directions. This camera array system may feature the two clusters of the type shown in FIG. 53, with an additional third cluster (3b) disposed between the two clusters. Amongst the cameras of cluster 3b, camera 1a can be included in the first parallel direction and camera 2a can be included in the second parallel direction. Additional intersecting backward directions may occur between cameras 1a and 2a of cluster 3b with, respectively, camera 2a of cluster 2b and camera 1a of cluster 1b.

Figure 57:
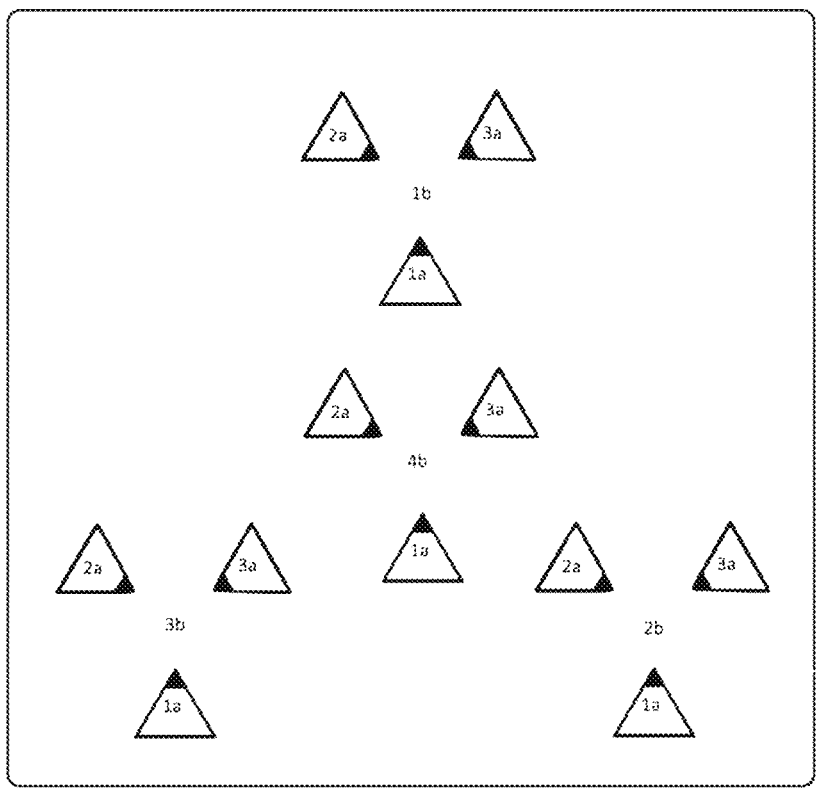
FIG. 57 is a schematic of a camera array system featuring four clusters of three upward-facing cameras.

FIG. 57 is similar to FIG. 26 in terms of positioning and parallel directions, however similar to the changes between FIG. 18 and FIG. 49, the upward facing cameras are not targeting a common point in space and do not have intersecting forward directions, but instead share a common point of intersection in their backwards directions. This camera array system may feature the three clusters of the type shown in FIG. 54, with an additional fourth cluster (4b) disposed in the approximate center of the three clusters. Parallel directions include, first, the 1a cameras of each cluster, second the 2a cameras of each cluster, and third, the 3a cameras of each cluster. All of the cameras in the 4b cluster have intersecting backward directions.

Figure 58:
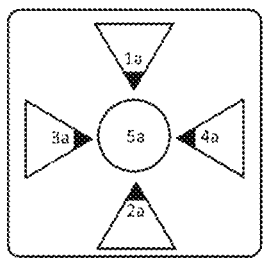
FIG. 58 is a schematic of a camera array system featuring a cluster of five upward-facing cameras.

FIG. 58 is similar to FIG. 27 in terms of positioning, however similar to the changes between FIG. 18 and FIG. 49, the upward facing cameras are not targeting a common point in space and do not have intersecting forward directions, but instead share a common point of intersection in their backwards directions. This camera array system may feature the four cameras of the type shown in FIG. 49, with an additional camera 5a. Camera 5a is angled approximately 90 degrees from the plate, and therefore its backward direction intersects those of cameras 1a, 2a, 3a, and 4a.

Figure 59:
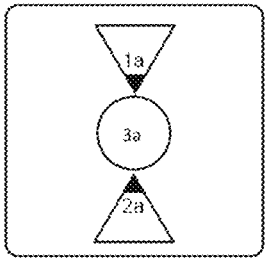
FIG. 59 is a schematic of a camera array system featuring a cluster of three upward-facing cameras.

FIG. 59 is similar to FIG. 28 in terms of positioning, however similar to the changes between FIG. 18 and FIG. 49, the upward facing cameras are not targeting a common point in space and do not have intersecting forward directions, but instead share a common point of intersection in their backwards directions. This camera array system may feature the two-camera cluster of the type shown in FIG. 50, with an additional camera 3a. Camera 3a is angled approximately 90 degrees from the plate, and therefore its backward direction intersects those of cameras 1*a* and 2*a*.

Figure 60:
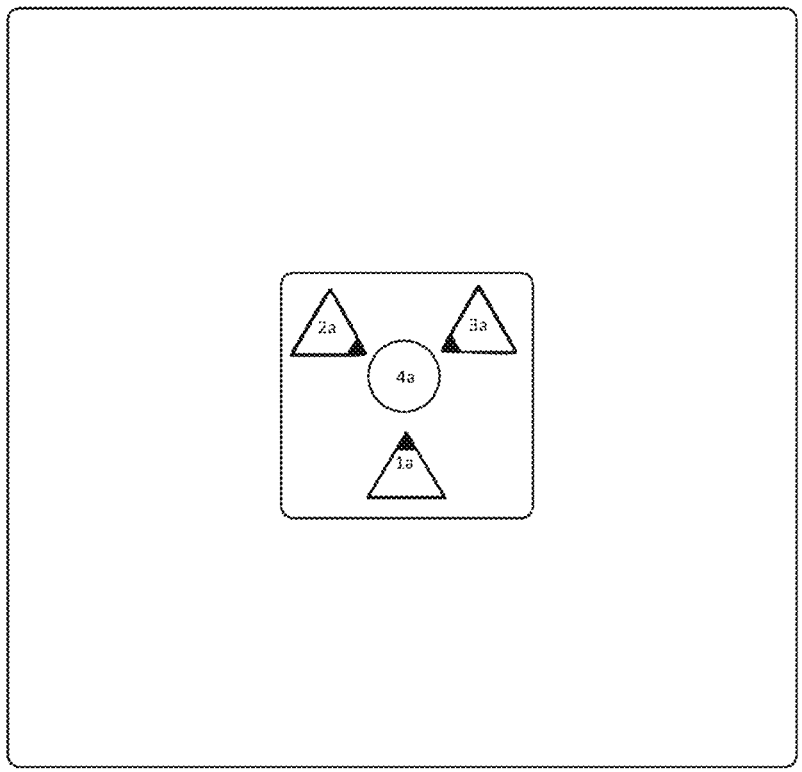
FIG. 60 is a schematic of a camera array system featuring a cluster of four upward-facing cameras.

FIG. 60 is similar to FIG. 29 in terms of positioning, however similar to the changes between FIG. 18 and FIG. 49, the upward facing cameras are not targeting a common point in space and do not have intersecting forward directions, but instead share a common point of intersection in their backwards directions. This camera array system may feature the three-camera cluster of the type shown in FIG. 51, with an additional camera 4*a*. Camera 4*a* is angled approximately 90 degrees from the plate, and therefore its backward direction intersects those of cameras 1*a*, 2*a*, and 3*a*.

Figure 61:
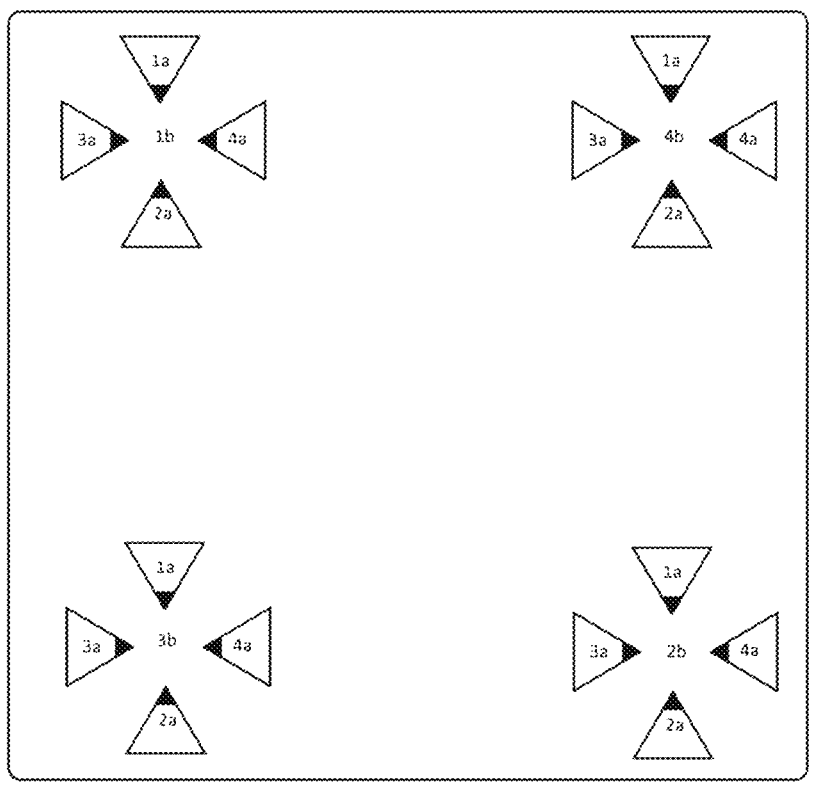
FIG. 61 is a schematic of a camera array system featuring four clusters of four upward-facing cameras.

FIG. 61 is similar to FIG. 30 in terms of positioning and parallel directions, however similar to the changes between FIG. 18 and FIG. 49, the upward facing cameras are not targeting a common point in space and do not have intersecting forward directions, but instead share a common point of intersection in their backwards directions. This camera array system may feature a modified version of the four-camera cluster of the type shown in FIG. 52. This configuration provides for the same parallel view engagements amongst the cameras; however, the intersecting backward directions are different: first, camera 1*a* of cluster 1*b* with camera 2*a* of cluster 3*b*, second, camera 1*a* of cluster 4*b* with camera 2*a* of cluster 2*b*, third, camera 3*a* of cluster 1*b* with camera 4*a* of cluster 4*b*, and fourth, camera 3*a* of cluster 3*b* with camera 4*a* of cluster 2*b*.

Figure 62:
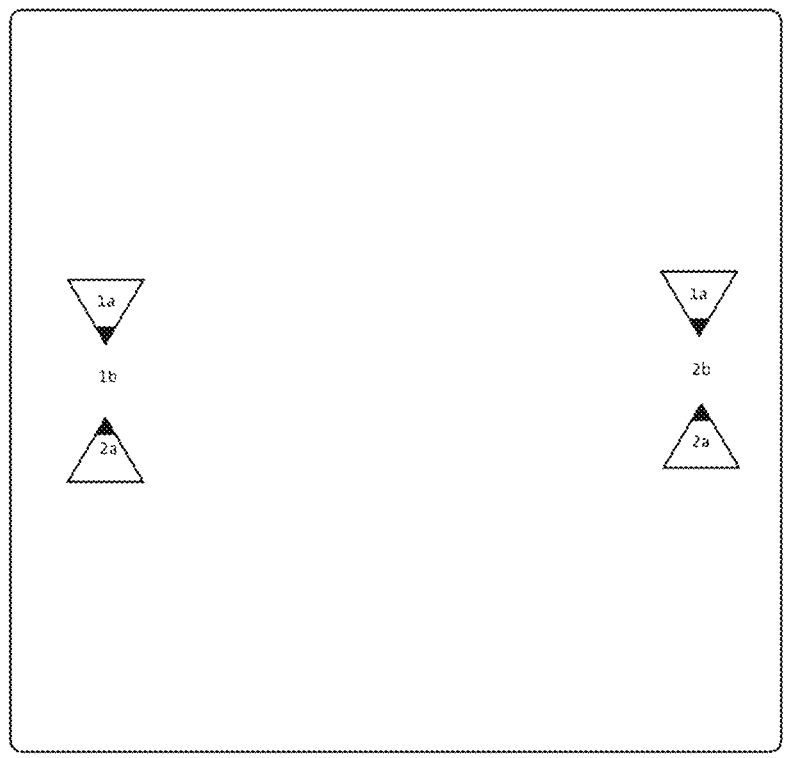
FIG. 62 is a schematic of a camera array system featuring two clusters of two upward-facing cameras.
Figure 63:
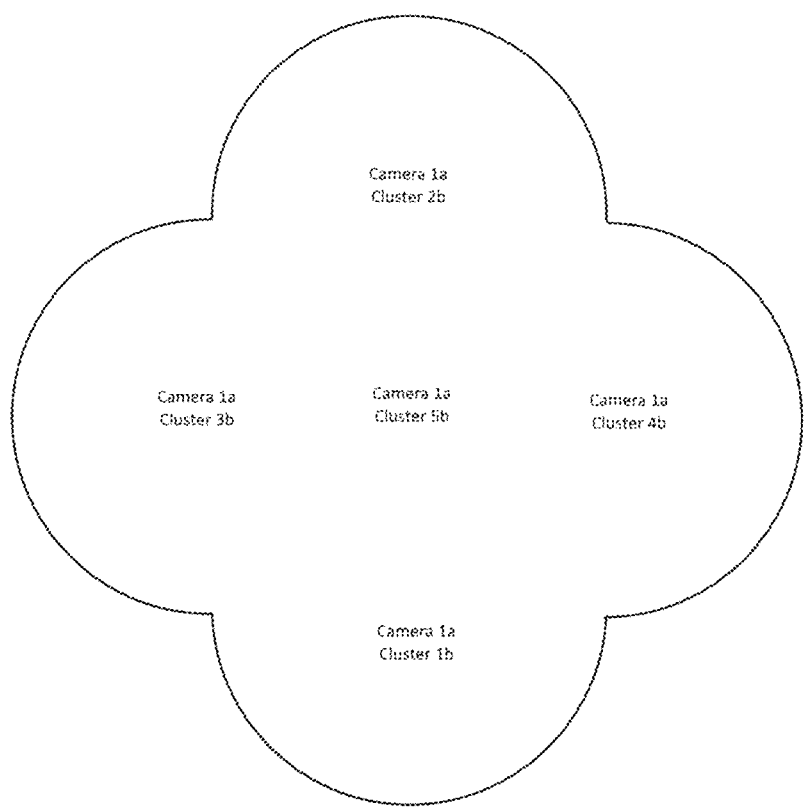
FIG. 63 is a schematic showing the relative positions of footage captured by the parallel views of the cameras in FIG. 55.
Figure 64:
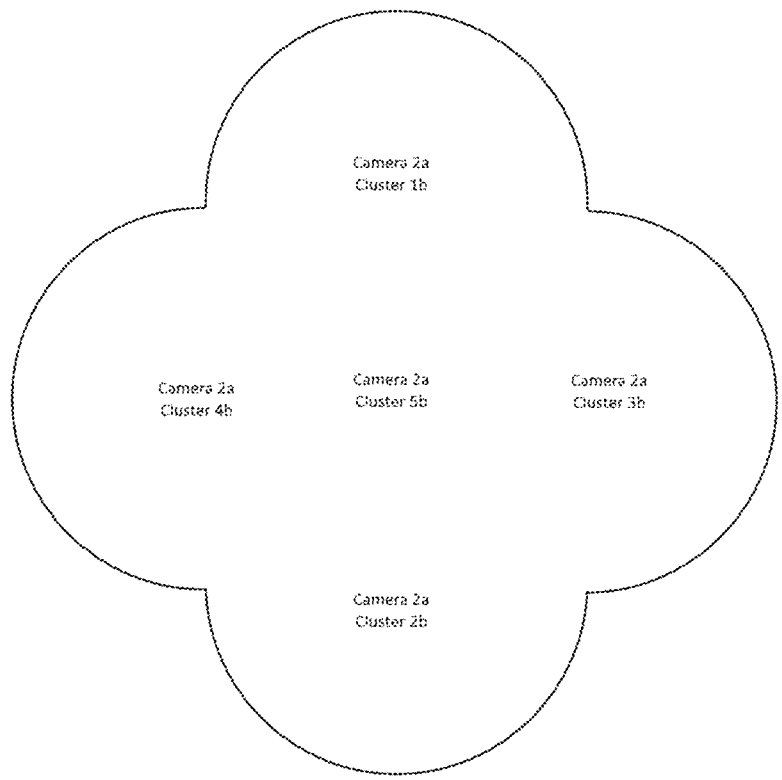
FIG. 64 is a schematic showing the relative positions of footage captured by the parallel views of the cameras in FIG. 55.
Figure 65:
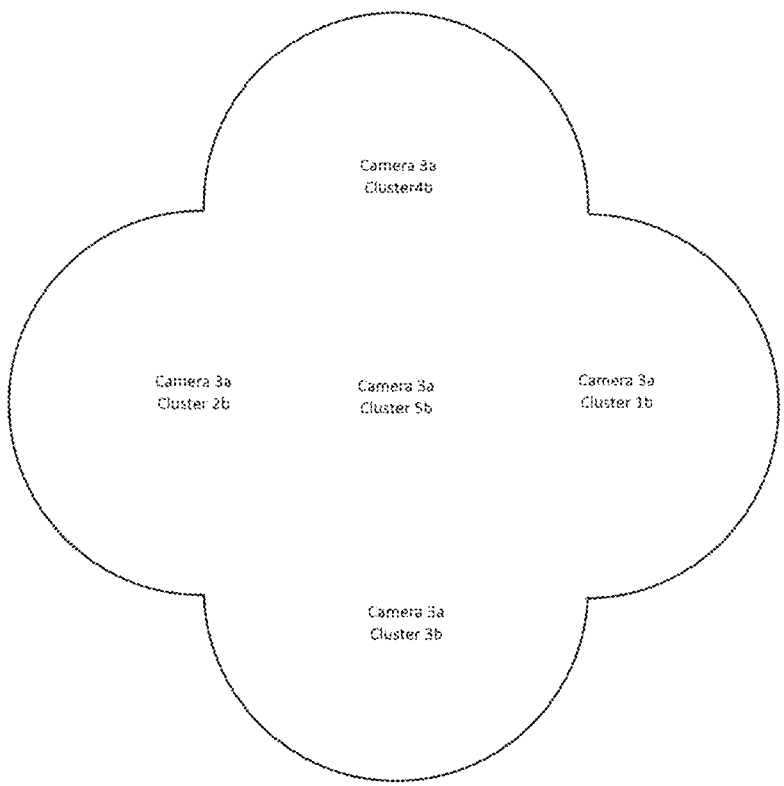
FIG. 65 is a schematic showing the relative positions of footage captured by the parallel views of the cameras in FIG. 55.
Figure 66:
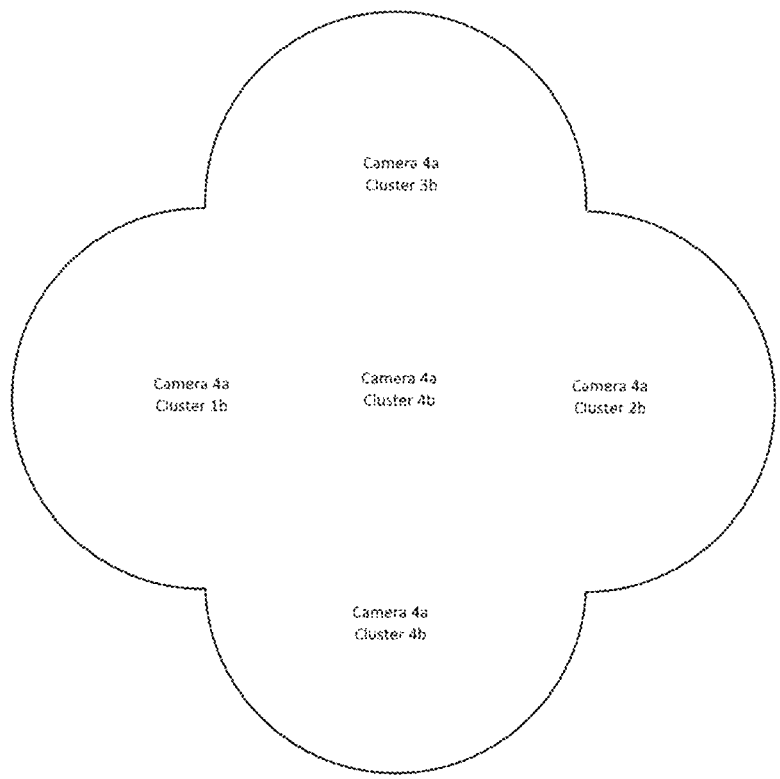
FIG. 66 is a schematic showing the relative positions of footage captured by the parallel views of the cameras in FIG. 55.

FIG. 62 is similar to FIG. 31 in terms of positioning and parallel directions, however similar to the changes between FIG. 18 and FIG. 49, the upward facing cameras are not targeting a common point in space and do not have intersecting forward directions, but instead share a common point of intersection in their backwards directions. This camera array system may feature a modified version of the two-camera cluster of the type shown in FIG. 53. This configuration provides for the same parallel view engagements amongst the cameras, but does not enable intersecting directions between clusters.

Figure 67:
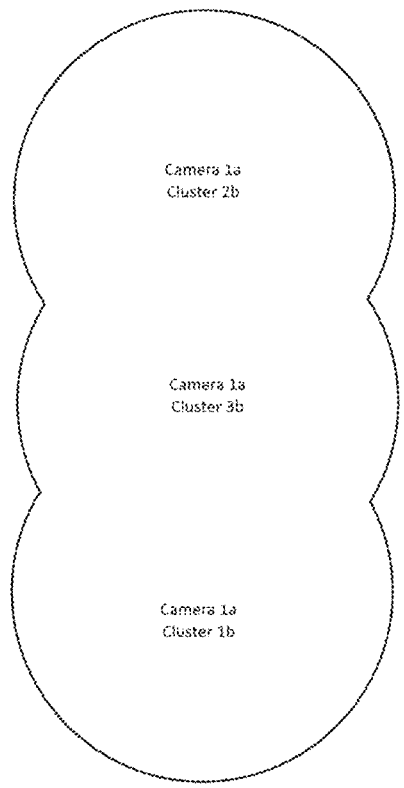
FIG. 67 is a schematic showing the relative positions of footage captured by the parallel views of the cameras in FIG. 56.
Figure 68:
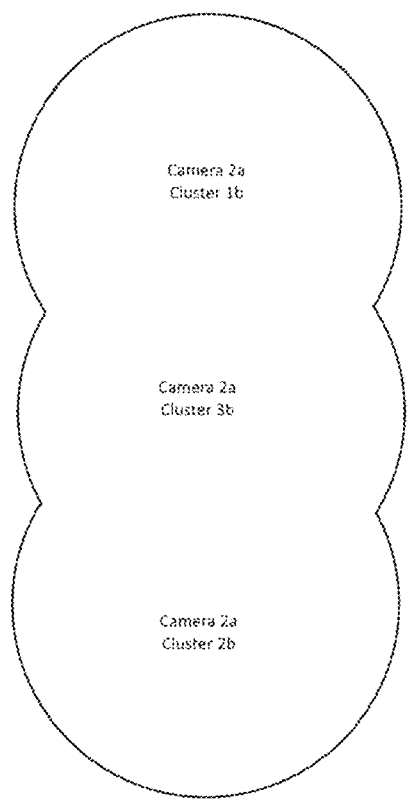
FIG. 68 is a schematic showing the relative positions of footage captured by the parallel views of the cameras in FIG. 56.

FIGS. 63-66 show the relative positions of the footage captured by the parallel views in FIG. 55. FIGS. 67-68 show the relative positions of the footage captured by the parallel views in FIG. 56. The relative positions of the footage captured by the parallel views in FIG. 54 are the same as those in FIG. 23, as shown in FIGS. 38-40.

Figure 69:
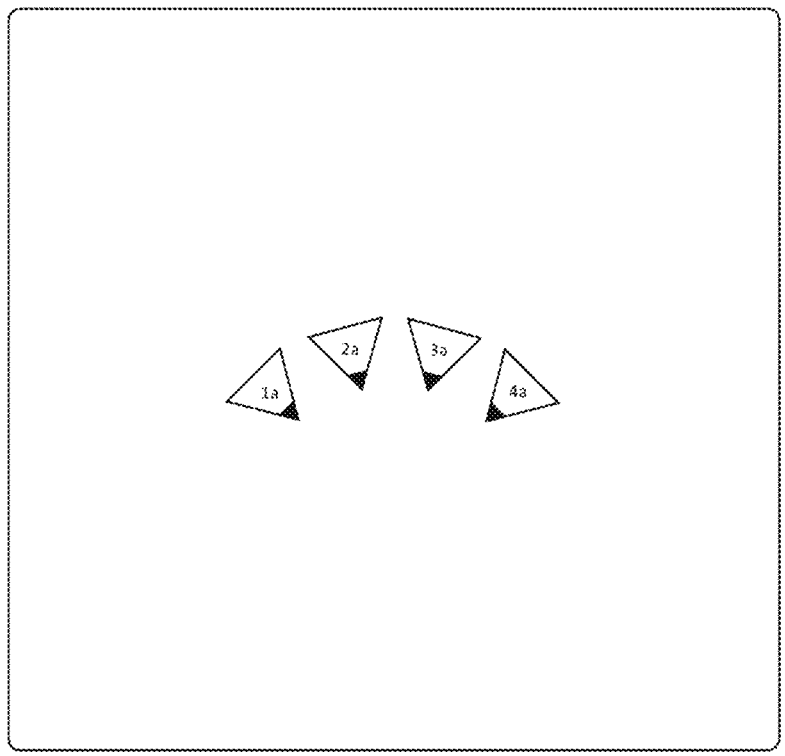
FIG. 69 is a schematic of a camera array system featuring a cluster of four upward-facing cameras.

FIG. 69 is similar to FIG. 41 in terms of positioning and parallel directions, however similar to the changes between FIG. 18 and FIG. 49, the upward facing cameras are not targeting a common point in space and do not have intersecting forward directions, but instead share a common point of intersection in their backwards directions. The cameras are spaced approximately equidistantly around a center point without fully surrounding the point. Here, each camera is positioned between 0 and 60 degrees from its neighboring camera.

Figure 70:
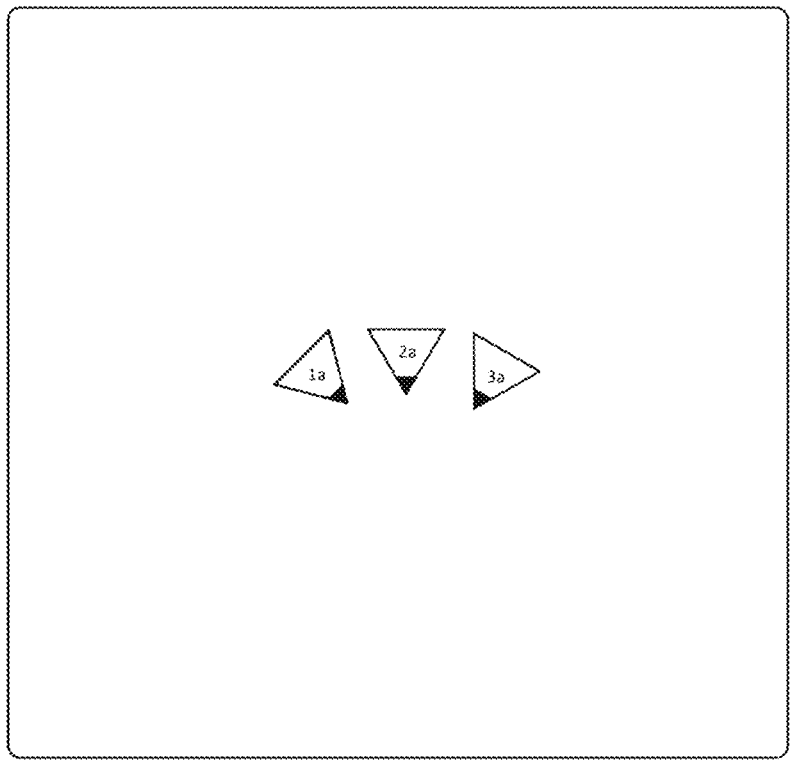
FIG. 70 is a schematic of a camera array system featuring a cluster of three upward-facing cameras.

FIG. 70 is similar to FIG. 42 in terms of positioning and parallel directions, however similar to the changes between FIG. 18 and FIG. 49, the upward facing cameras are not targeting a common point in space and do not have intersecting forward directions, but instead share a common point of intersection in their backwards directions. The cameras are spaced approximately equidistantly around a center point without fully surrounding the point. Here, each camera is positioned between 0 and 180 degrees from its neighboring camera.

Figure 71:
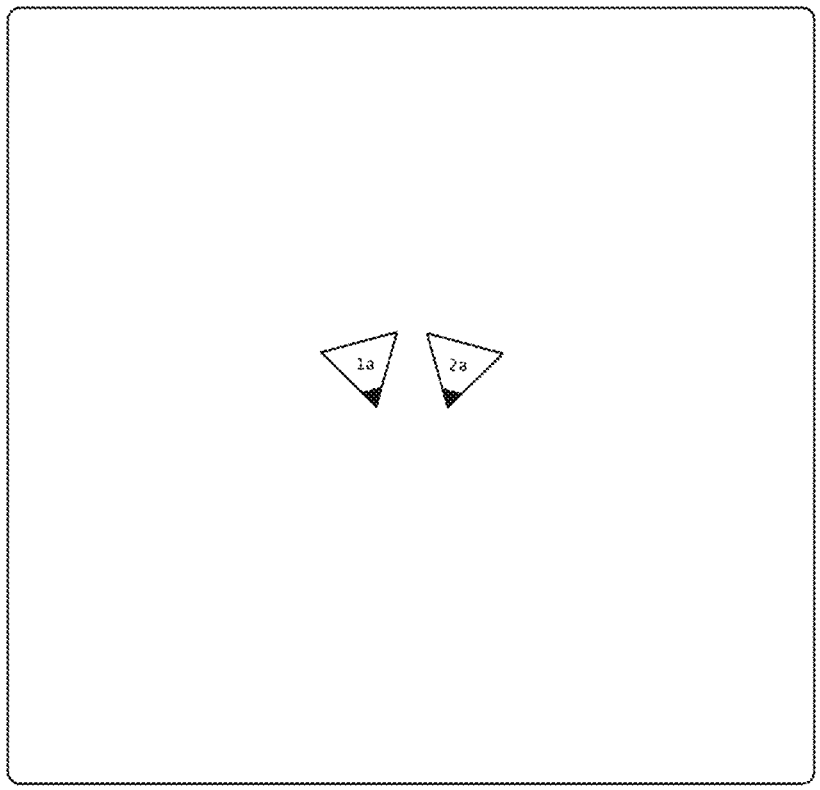
FIG. 71 is a schematic of a camera array system featuring a cluster of two upward-facing cameras.

FIG. 71 is similar to FIG. 43 in terms of positioning and parallel directions, however similar to the changes between FIG. 18 and FIG. 49, the upward facing cameras are not targeting a common point in space and do not have intersecting forward directions, but instead share a common point of intersection in their backwards directions. The cameras are spaced approximately equidistantly around a center point without fully surrounding the point. Here, each camera is positioned between 0 and 90 degrees from its neighboring camera.

Figure 72:
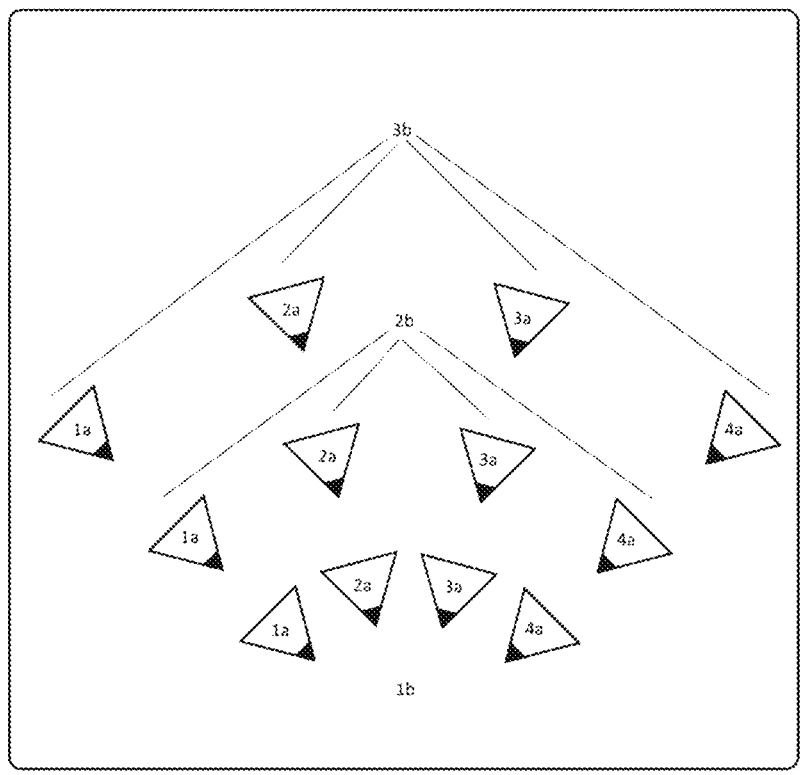
FIG. 72 is a schematic of a camera array system featuring three tiers of upward-facing cameras.

FIG. 72 is similar to FIG. 44 in terms of positioning and parallel directions, however similar to the changes between FIG. 18 and FIG. 49, the upward facing cameras are not targeting a common point in space and do not have intersecting forward directions, but instead share a common point of intersection in their backwards directions. The clusters here are arranged in tiers, with each additional tier being placed behind the preceding tier. Consequently, there is greater distance between each camera within a cluster in each succeeding tier. In one variation, cameras 1*a*, cameras 2*a*, cameras 3*a*, and cameras 4*a* have first, second, third, and fourth parallel views across clusters such that, for example, camera 1*a* in cluster 1*b*, camera 1*a* in cluster 2*b*, and camera 1*a* in cluster 3*b* have parallel views. In this variation, the cameras of all clusters have a common upward angle above the plate. In another variation, however, cameras within a cluster may have a common upward angle above the plate, but different angles may arise across clusters. All cameras may have a common point of intersection in their backwards directions. This is possible if clusters in succeeding tiers have lower upward angles above the plate than clusters in preceding tiers. For example, the cameras in cluster 1*b* may have an upward angle of 75 degrees while cameras in cluster 2*b*, which are positioned behind the cameras in cluster 1*b*, may have an upward angle of 60 degrees, and cameras in cluster 3*b* may have an upward angle of 45 degrees.

Figure 73:
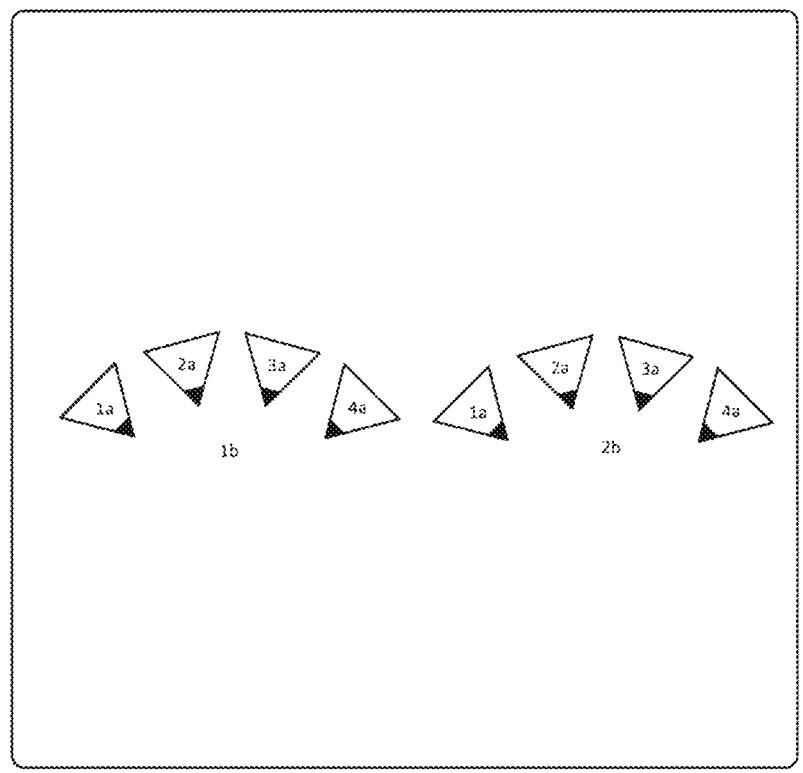
FIG. 73 is a schematic of a camera array system featuring two clusters of four upward-facing cameras.

FIG. 73 is similar to FIG. 45 in terms of positioning and parallel directions, however similar to the changes between FIG. 18 and FIG. 49, the upward facing cameras are not targeting a common point in space and do not have intersecting forward directions, but instead share a common point of intersection in their backwards directions.

Figure 74:
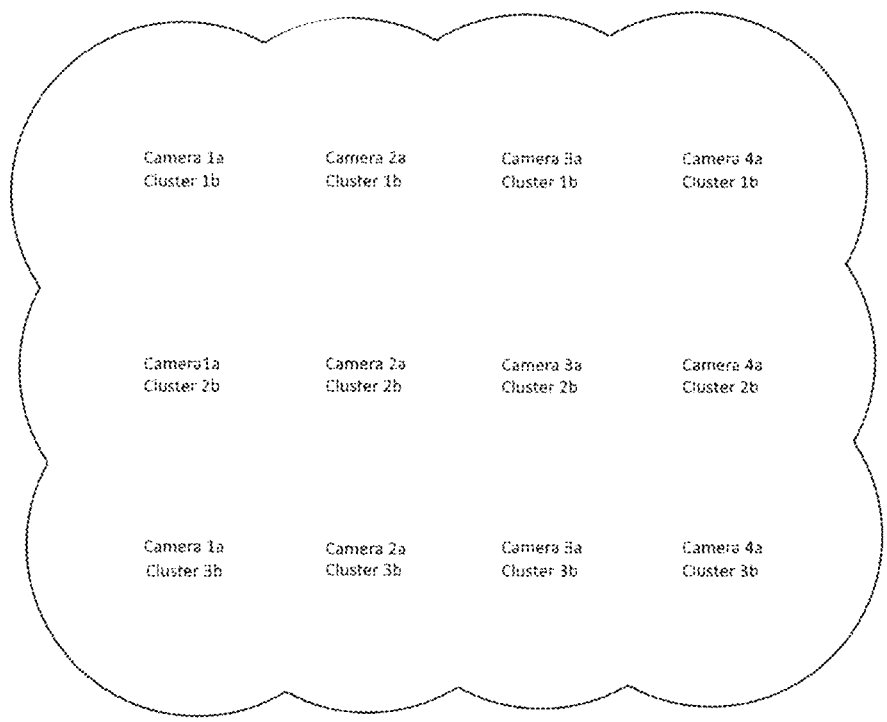
FIG. 74 is a schematic showing the relative position of the footage captures by the views of the camera array system in FIG. 72.

FIG. 74 shows the relative position of the footage captures by the views in FIG. 72.

Figure 75:
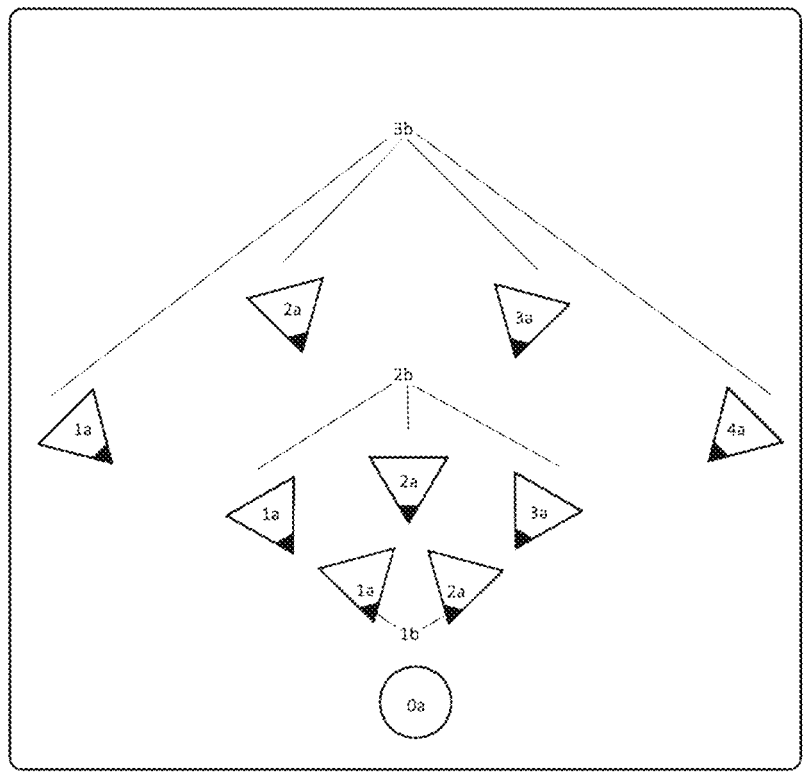
FIG. 75 is a schematic of a camera array system featuring three tiers of upward-facing cameras.

FIG. 75 is similar to FIG. 47 in terms of positioning and parallel directions, however similar to the changes between FIG. 18 and FIG. 49, the upward facing cameras are not targeting a common point in space and do not have intersecting forward directions, but instead share a common point of intersection in their backwards directions. In a preferred embodiment, each succeeding tier contains more cameras than the preceding tier. At the center may be a "zero tier" cluster (0*a*) of a single camera. In one variation, this single camera is directed 90 degrees from the plate.

Figure 76:
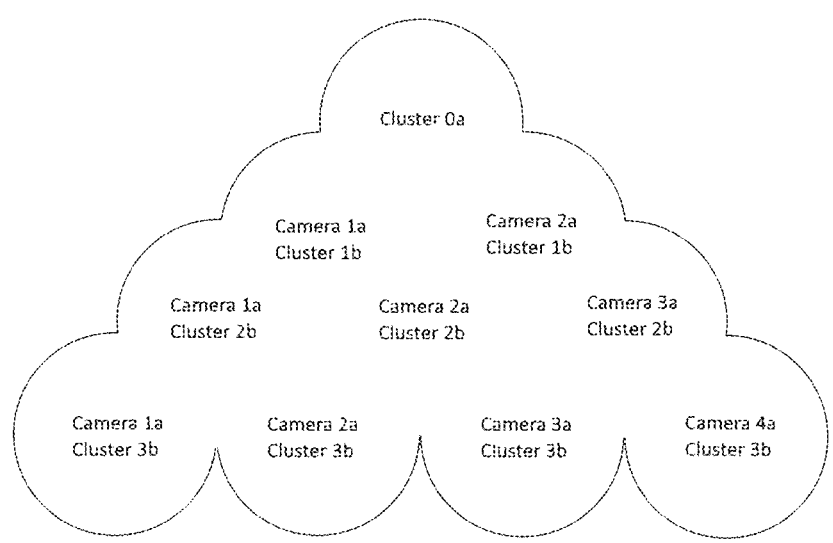
FIG. 76 is a schematic showing the relative positions of footage captured by the parallel views of the cameras in FIG. 75.
Figure 77:
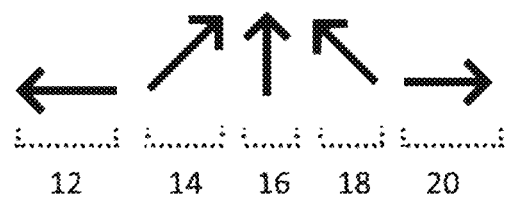
FIG. 77 shows an exemplary camera array with the intermediate left camera set targeting to the right of the central camera set and the intermediate right camera set targeting to the left of the central camera set.
Figure 78:
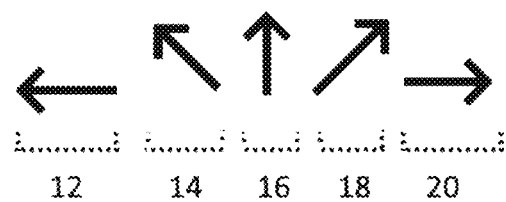
FIG. 78 shows an exemplary camera array with the intermediate left camera set targeting to the left of the central camera set and the intermediate right camera set targeting to the right of the central camera set.
Figure 79:
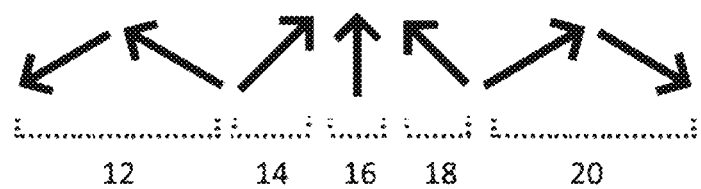
FIG. 79 shows an exemplary camera array with two cameras in each of the left and right side sets.
Figure 80:
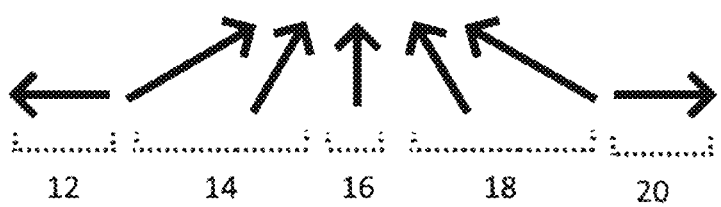
FIG. 80 shows an exemplary camera array with two cameras in each of the intermediate camera sets.
Figure 81:
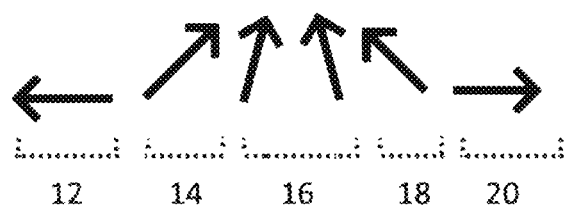
FIG. 81 shows an exemplary camera array with two cameras in the central camera set.
Figure 82:
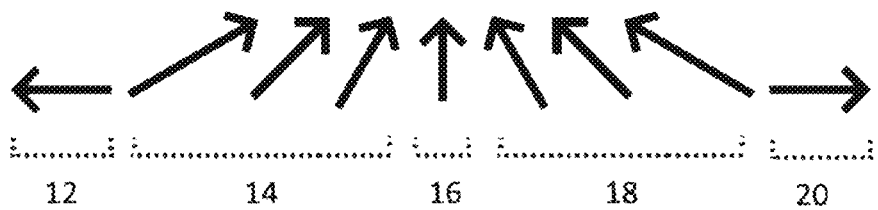
FIG. 82 shows an exemplary camera array with three cameras in each of the intermediate camera sets.
Figure 83:
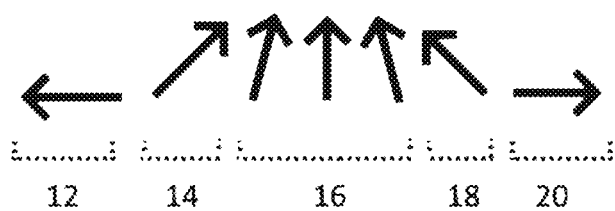
FIG. 83 shows an exemplary camera array with three cameras the central camera set.
Figure 84:
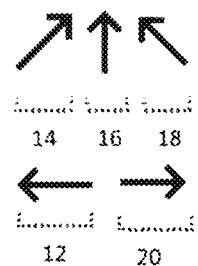
FIGS. 84-88 show exemplary modifications to the camera arrays in FIGS. 77-83.
Figure 85:
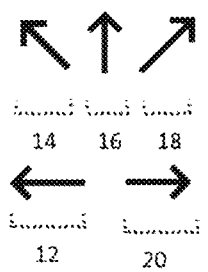
Figure 86:
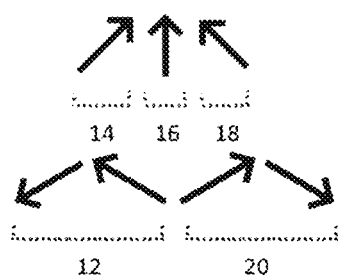
Figure 87:
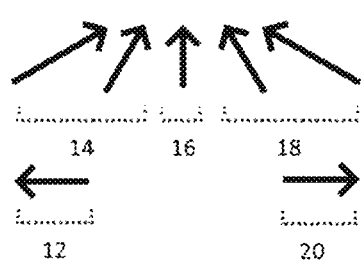
Figure 88:
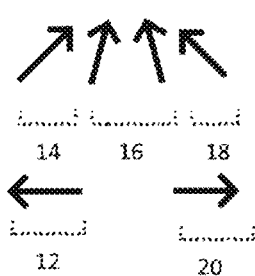

FIG. 76 is similar to FIG. 48 in terms of positioning and parallel directions, however similar to the changes between FIG. 18 and FIG. 49, the upward facing cameras are not targeting a common point in space and do not have intersecting forward directions, but instead share a common point of intersection in their backwards directions.

Split Rig Disclosure

Disclosed is a camera array system comprising a plurality of outward-facing cameras mounted on a plate structure. The disclosed system is unique when compared with other known systems and solutions in that it provides camera configurations that result in images at substantially overlapping angles in every direction. A key feature of the nodal formations is the intersecting of the angles of view, which provide not only more complete coverage of the objects which are closest to a given nodal formation, but also ensure an overlap of coverage, specifically a panoramic overlap, with the footage captured by adjacent nodal formations. The system can provide image data, quality and stability that is necessary for utilization in modern visual effects and software environments.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Camera Array may, however, be embodied in many different forms and should not be construed as being limited to the embodiments set forth herein; rather, these embodiments are provided by way of illustration only and so that this disclosure will be thorough, complete and fully convey understanding to those skilled in the art.

In a first embodiment, as shown in FIGS. 77-88, a camera array comprises a set of left side cameras 12, a set of left intermediate cameras 14, a set of central cameras 16, a set of right intermediate cameras 18, and a set of right side cameras 20. The camera array captures footage ranging from 0 degree to 180 degrees in a horizontal plane, with the left side cameras targeting a view at an average of 0 degrees, the right side cameras targeting a view at an average of 180 degrees, and the central cameras targeting a view at an average of 90 degrees. The intermediate cameras target views at an average of 45 degrees and 135 degrees, but in a preferred version of this embodiment, the left side cameras target the view at 135 degrees and the right side cameras target the view at 45 degrees—thus, the order of views, in the series are: 0 degrees, 135 degrees, 90 degrees, 45 degrees, and 180 degrees. This arrangement enables footage to be stitched together so as to mitigate or eliminate common stitching problems that would result in a less innovative order of views for a series of cameras—i.e., 0, 45, 90, 135, and 180 degrees.

The number of cameras in a set may be 1, 2, 3, or more cameras. The number may be consistent across the sets, or they may be different for each set—although some symmetry may be desirable such that the number of cameras in the left side set equals the number of cameras in the right side set, the number of cameras in the left intermediate set equals the number of cameras in the right intermediate set, etc. In one version, the target angle of each camera within a camera set may differ but their combined angles are ideally 0 degrees, 135 degrees, 90 degrees, 45 degrees, and 180 degrees for the left side camera, left intermediate camera, central camera, right intermediate camera, and right side camera, respectively.

In one version, the sets of cameras may be approximately positioned on a single plane, such that the distance of each camera to the vehicular mounting plate is approximately equal. The sets of cameras may be positioned on an approximate axis, spanning from one side of the vehicular mountain plate to the other, such that distance from each camera to the back edge of the vehicular mounting plate is approximately equal.

In another version, the sets may be staggered such that the central cameras, the intermediate cameras, and/or the side cameras are positioned on different side-to-side axes. As an example, in their distance from the back edge, the cameras may be ordered as follows: central cameras, intermediate cameras, and side cameras. As another example, the ordering may be reversed: side cameras, intermediate cameras, central cameras. In yet another version, the sets may be staggered such that the cameras are on different planes above the vehicular mounting plate. As an example, in their distance from the mounting plate, the cameras may be ordered as follows: central cameras, intermediate cameras, and side cameras. As another example, the ordering may be reversed: side cameras, intermediate cameras, central cameras. In yet another example, the cameras may be staggered such that they are positioned both on different side-to-side axes as well as different planes above the vehicular mounting plate. In a further example, the cameras may be stacked one on top of another, such that the central and/or intermediate cameras may be stacked on top of or below the side cameras.

In another variation, one or more of the camera sets may be omitted. For example, the camera array may include the central and intermediate cameras but omit the side cameras. The camera array may include the central and side cameras but omit the intermediate cameras. The camera array may include the intermediate and side cameras but omit the central cameras.

In one version, the camera sets may be fixedly, though adjustably connected to the vehicular mounting plate. In another version, the camera sets are controlled to rotate or otherwise swivel via an external controller.

In a first embodiment, a backward-facing camera array may be positioned on a vehicular mounting plate, particularly facing the reverse direction of the vehicular mounting plate.

In a second embodiment, a forward-facing camera array may be positioned on the vehicular mounting plate, particularly facing the forward direction of the vehicular mounting plate.

In a third embodiment, an apex camera array may be positioned on the vehicular mounting plate, particularly facing the forward direction of the vehicular mounting plate, upward at an approximately 90 degree angle from the vehicular mounting plate, or at an angle between 0 and 90 degrees from the vehicular mounting plate.

The first, second, and/or third embodiment of backward-facing, forward facing, and apex camera arrays may be combined.

The forward-facing camera array and the apex camera array may each have any of the features described with respect to the backward-facing camera array. The features may be consistent across the forward-facing, backward-facing, or apex camera arrays, or they may differ.

In one version, the apex camera array has only a single camera and the front-facing camera array lacks the side camera sets.

Figure 89:
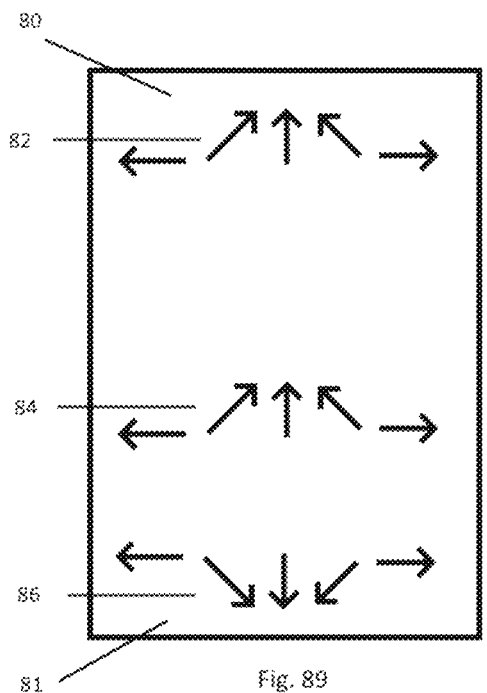
FIG. 89 shows an exemplary forward facing, backward facing, and apex camera arrays.
Figure 90:
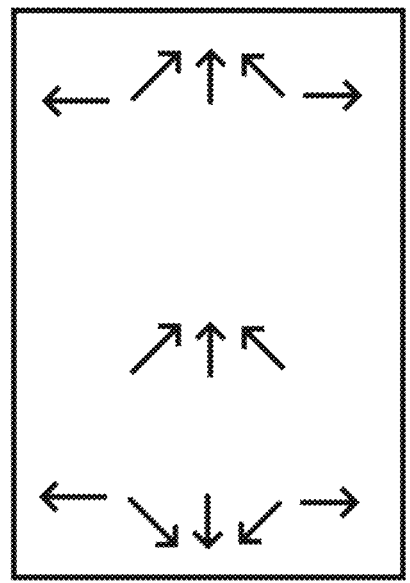
FIG. 90 shows exemplary camera arrays in which the apex camera array lacks side camera sets.
Figure 91:
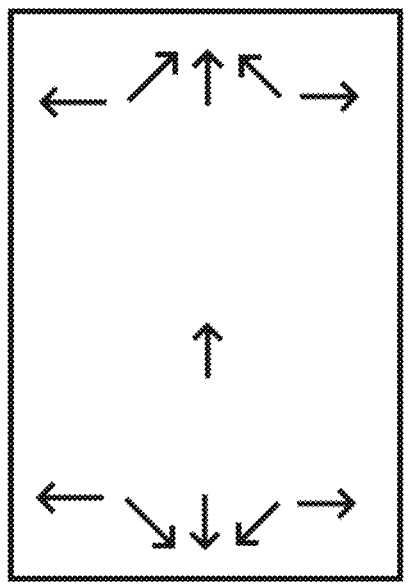
FIG. 91 shows exemplary camera arrays in which the apex camera array lacks side and intermediate camera sets.
Figure 92:
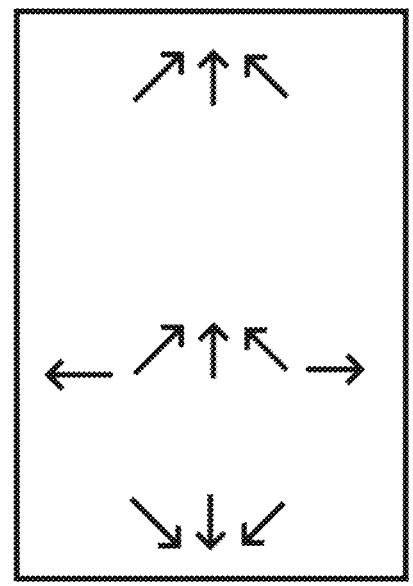
FIG. 92 shows exemplary camera arrays in which the backward facing camera arrays lack side camera sets.
Figure 93:
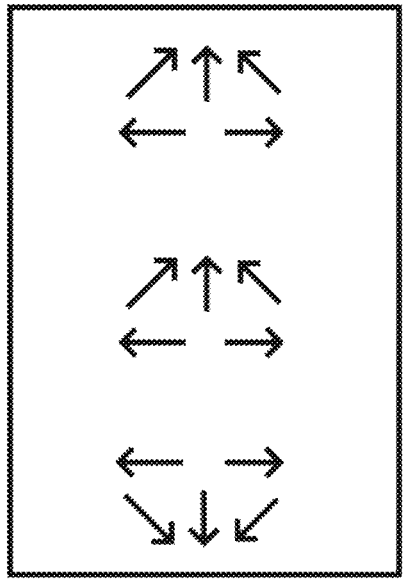
FIGS. 93-96 show exemplary modifications to the camera arrays in FIGS. 89-92.
Figure 94:
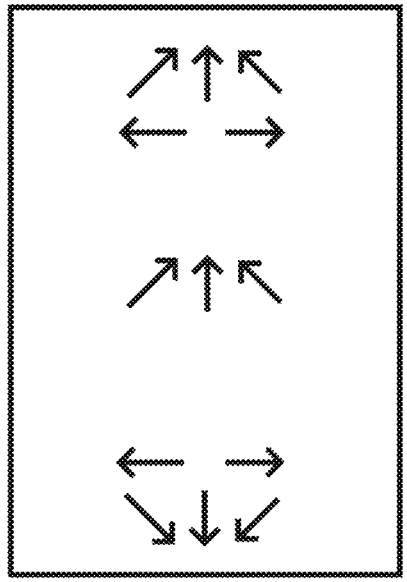
Figure 95:
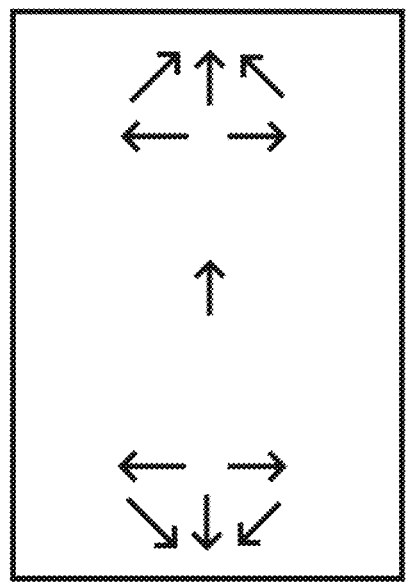
Figure 96:
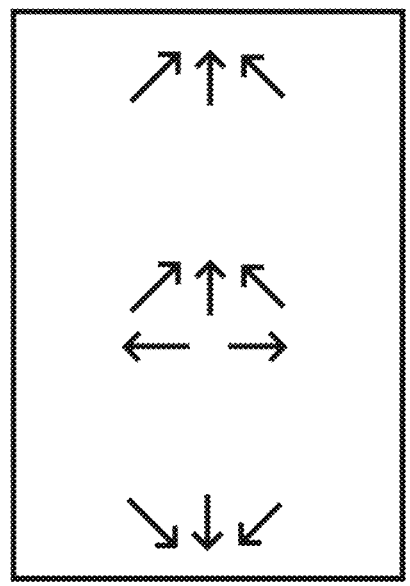
Figure 97:
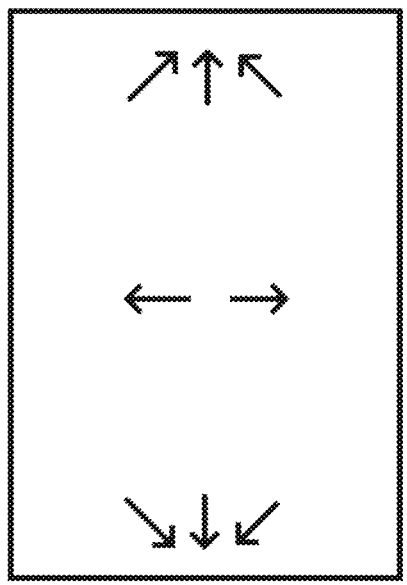
FIG. 97 shows an exemplary system, in which side camera sets are omitted from each of the forward and backward-facing camera arrays, but a partial camera array consisting of only side cameras is disposed on the vehicular mounting plate between the forward and backward-facing camera arrays. This figure may also be understood as a forward-facing camera array with the side camera sets omitted, the apex camera array either omitted or not shown, and a backward-facing camera array comprising central, intermediate, and side camera sets, with the side camera sets disposed behind the central and intermediate camera sets.

As shown in FIGS. 89, the forward-facing camera array 82 may be positioned on the vehicular mounting plate closer to the front 80 of the vehicular mounting plate, the backward-facing camera 86 array may be positioned on the vehicular mounting plate closer to the back 81 of the vehicular mounting plate, and the apex camera array 84 may be positioned between the forward-facing and the backward-facing camera arrays.

In one version, each camera in a camera array may be independently connected to a common trigger box and viewing monitor. In another version, the connections may be made such that each camera in a camera set connects to a controller local to the camera set, which in turn connects, along with the controllers local to the other camera sets, to the common trigger box and viewing monitor. In yet a third version, the connections may be made such that each camera in a camera array connects to a controller local to the camera array, which in turn connects, along with the controllers local to the other camera arrays, to the common trigger box and viewing monitor.

In one embodiment, the footage captured by the cameras may be stitched together during a production/post-production/editing stage. In one version, a given span of stitched footage may comprise footage obtained from multiple cameras within a given camera set. In another version, a given span of stitched footage may comprise footage obtained from multiple cameras within a given camera array. In yet another version, a given span of stitched footage may comprise footage from cameras in parallel camera sets across arrays—for example, side camera sets of the side camera sets closest to a given side of the vehicular mounting plate. In yet another version, a given span of stitched footage may comprise footage from some but not all cameras in a first camera set and some but not all cameras in a second camera set. In yet another version, a given span of stitched footage may comprise footage from some but not all cameras in a first camera array and some but not all cameras in a second camera array.

In one embodiment, camera sets may have fields of view and optical axes which pass orthogonally through centers of the fields of view. The field of view is an extent of the world visible at any moment by the camera, and the optical axis comprises a line passing from a center of the camera lens through the very center of the field of view. An optical axis may be referred to, colloquially, as the camera's "direction". However, the optical axis extends both forwards, as would be consistent with the "direction", as well as backwards, passing through the lens and extending behind the lens. Thus, an optical axis may comprise both a forward direction as well as a backward direction 405, with the forward direction and the backward direction both occupying the same optical axis but facing opposite ends of the optical axis.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments.

It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skilled in the art relying upon the complete disclosure present at the time of filing.

In one embodiment, as shown in FIGS. 84-88 and 93-96, the set of left side cameras 12 and the set of right side cameras 20 are placed behind the sets of intermediate and front-facing cameras. By positioning the sets closer to a central point in the array, it becomes easier to stitch together the resultant footage. Additionally, positioning the sets of side cameras closer to a central line of the vehicle, the problem of overly abrupt entry of other vehicles or objects into the footage is ameliorated. This amelioration is due, quite simply, to the additional distance being places between the sets of side cameras and those other vehicles or objects.

In one embodiment, if there are multiple cameras with a set of side cameras, the set is divided so that each of those cameras are placed in a row, with the row consisting of a set of intermediate cameras, a first subset of side cameras, and a second subset of side cameras. In one variation, a side camera directed to the side and forward is placed in front of a side camera directed to the side and backward, thereby resulting in an intersection of their optical axes behind their field of view. In another variation, a side camera directed to the side and forward is placed behind a side camera directed to the side and backward, thereby resulting in an intersection of their optical axes within their field of view.

Split Rig Configurations

Figure 98:
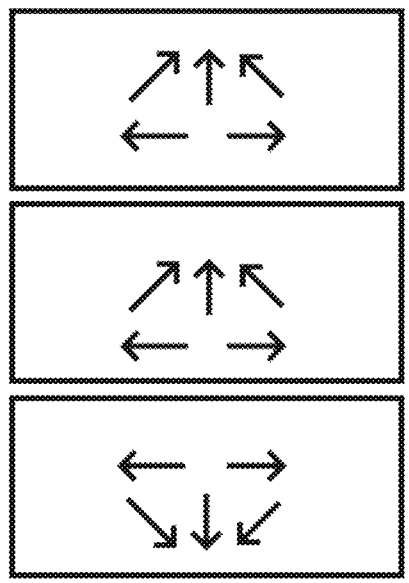
FIG. 98 shows an exemplary system with separate vehicular mounting plates for each of the forward-facing, apex, and backward-facing camera arrays.

In one embodiment, as shown in FIG. 98, the backward-facing camera array, the forward-facing camera array, and the apex camera array are each engaged with separate and dedicated vehicular mounting plates, with the backward-facing camera array engaged to a backward vehicular mounting plate, the forward-facing camera array engaged to a forward vehicular mounting plate, and the apex camera array engaged to an apex vehicular mounting plate. The forward vehicular mounting plate, apex vehicular mounting plate, and backward vehicular mounting plate are arranged such that the forward vehicular mounting plate is mounted to a vehicle at the front of the vehicle relative to the other vehicular mounting plates, the backward vehicular mounting plate is mounted to the vehicle at the back of the vehicle relative to the other vehicular mounting plates, and the apex mounting plate is mounted to the vehicle between the other vehicular mounting plates.

In one variation, the forward, apex, and backward vehicular mounting plates are mounted such that the plates occupy a common plane. In another variation, the plates are staggered such that the one or more of the plates occupy a first plane, one or more of the plates occupy a second plane, and one or more of the plates occupy a third plane. In one variation, the height of a plate, relative to the vehicle, is controlled via a mechanical or structural means, such as telescopic mounting legs. In another variation, the height of a plate is fixed.

In one variation, the separate and dedicated vehicular mounting plates may be interconnected such that one or more of the plates are mounted indirectly to the vehicle via one or more of the other plates and not directly to the vehicle.

Figure 99:
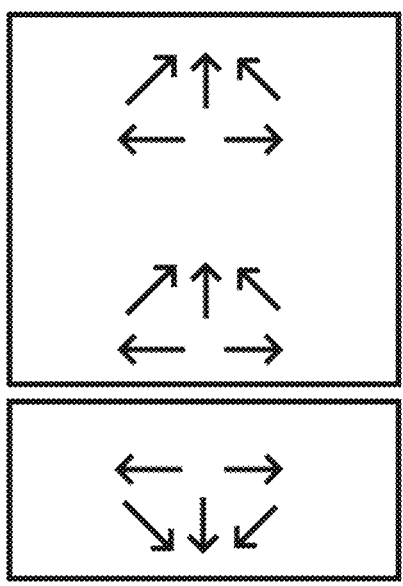
FIG. 99 shows an exemplary system with a common vehicular mounting plate for the forward-facing and apex camera arrays and a separate vehicular mounting plate for the backward-facing camera array.
Figure 100:
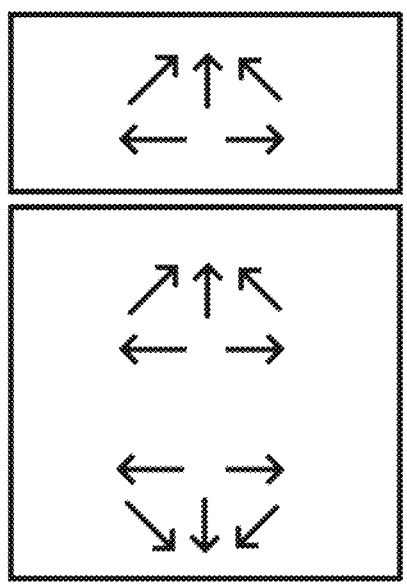
FIG. 100 shows an exemplary system with a common vehicular mounting plate for the backward-facing and apex camera arrays and a separate vehicular mounting plate for the forward-facing camera array.
Figure 101:
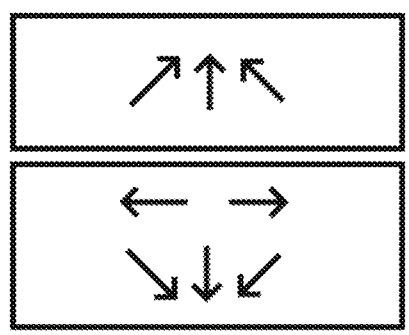
FIG. 101 shows an exemplary system with a forward-facing and backward facing camera array, each with their dedicated vehicular mounting plate, with the forward-facing array omitting the set of side cameras.
Figure 102:
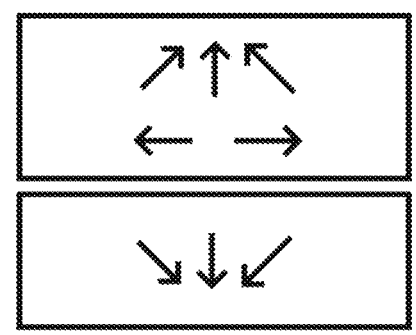
FIG. 102 shows an exemplary system with a forward-facing and backward-facing camera array, each with their dedicated vehicular mounting plate, with the backward-facing array omitting the set of side cameras.
Figure 107:
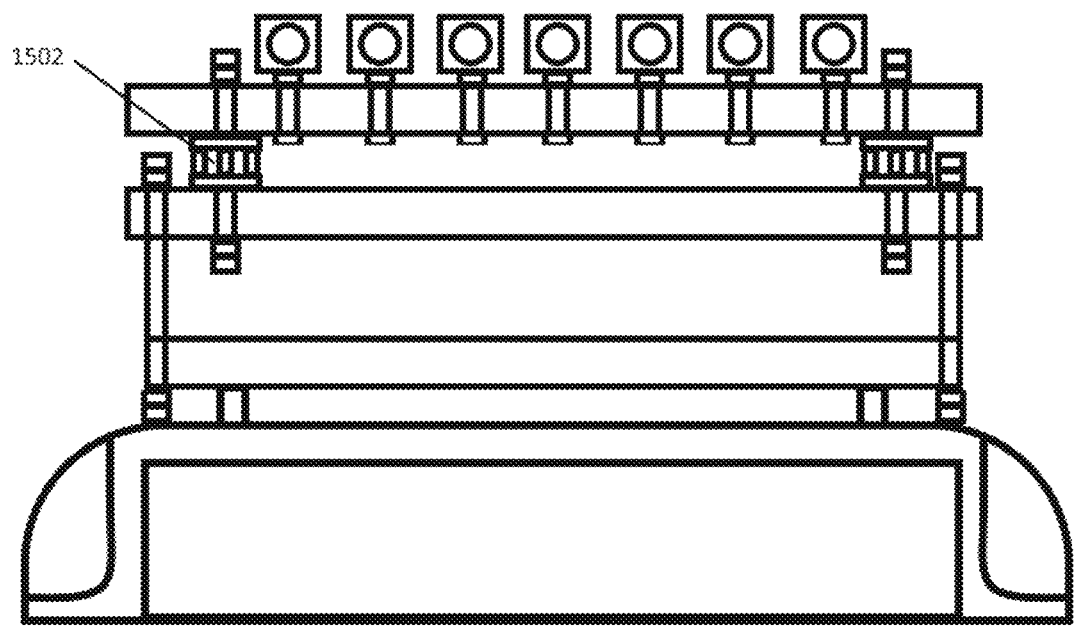
FIG. 107 shows an exemplary floating plate design with multi-prong stabilizers.

In one variation, as shown in FIG. 99, in a so-called split-rig configuration, the forward-facing camera array occupies a common vehicular mounting plate with the apex camera array. In a variation of the split-rig configuration, as shown in FIG. 100, the backward-facing camera array occupies a common vehicular mounting plate with the apex camera array. In a third variation of the split-rig configuration, as shown in FIGS. 101-102, one of the camera arrays, such as the apex camera array, along with its accompanying vehicular mounting plate, are omitted.

In one variation, a given vehicular mounting plate may be rotated relative to the vehicle and/or the other plates via a mechanical or structural means, such as a Lazy-Susan type configuration coupled to a mechanism for at least temporarily locking the plate in a given rotational orientation.

In one variation, each vehicular mounting plate may be coupled to a unique and dedicated set of one or more controllers and/or trigger boxes and/or viewing monitors.

In one embodiment, a second forward-facing, apex, and/or backward-facing camera array is utilized. Each duplicate camera array may have its own dedicated vehicular mounting plate, or may share a vehicular mounting plate with another camera array. In a similar embodiment, the cameras in the apex camera array face a direction above the ground equivalent to zero degrees.

In one embodiment, a partial camera array is utilized. In a partial camera array, the central and/or intermediate sets of cameras are omitting, with only a set of side cameras remaining.

In one embodiment, a plurality of vehicular mounting plates may be stacked vertically. In one version of this embodiment, the forward-facing and backward-facing camera arrays occupy a common vehicular mounting plate, or are disposed on separate and dedicated vehicular mounting plates, with the dedicated vehicular mounting plates occupying approximately a common plane. Further in this version, the dedicated vehicular mounting plate for the apex camera array is disposed above the forward and backward-facing vehicular mounting plates. In this manner, the apex camera array does not interfere with the forward and backward-facing camera arrays.

Stabilization Technology

Disclosed is a stabilization technology to be used in mounting cameras and camera arrays to mounting plates including vehicular mounting plates. As shown in FIGS. 103-107, the stabilization technology includes a configuration of an upper mounting plate 1202 and a lower mounting plate 1204. The embodiments, configurations, and variations described below constitute a new "Floating Plate" design.

In one embodiment, one or more camera arrays 1201 are mounted to an upper mounting plate 1202. The upper mounting plate in turn is mounted to the lower mounting plate 1204. The lower mounting plate, in turn, is mounted to a vehicle 1200. The lower mounting plate may be mounted to a vehicle via a roof rack 1205 or related attachment structure. Another mounting mechanism includes suction cups, which attach to the roof of the vehicle. These suction cups may secure the lower and/or upper mounting plate directly or via intermediaries, such as rods.

In one embodiment, the lower mounting plate mounts to a vehicle via a first set of connectors 1208 and the upper mounting plate mounts to the lower mounting plate via a second set of connectors 1206. In one version, the center of the first and second set of connectors share a common vertical axis. A vertical axis corresponds to an axis that is approximately orthogonal to the mounting plates and ideally passes through each of them.

In one embodiment, the upper mounting plate 1202 is mounted to the vehicular roof rack 1205. This mounting may be achieved via the set of connectors 1206.

In another version, the point on the upper mounting plate to which the first set of connectors connect shares a common vertical axis with the point on the lower mounting plate to which the second set of connectors connect. In one variation, each connector connects the upper mounting plate directly to the vehicular roof rack.

In another version, the first and second set of connectors do not share a common vertical axis and have distinct axes 1207, 1209. In yet another version, the points on the upper and lower mounting plates do not share a common vertical axis.

In one version, the second set of connectors are closer to a center of the second mounting plate than are first set of connectors, which may substantially surround the second set of connectors. In another version, the first set of connectors are closer to a center of the second mounting plate than are the second set of connectors, which may substantially surround the first set of connectors.

The first set of connectors and/or the second set of connectors may comprise screw and nut/bolt components, with the screws passing through the points (i.e., holes) in the mounting plates. In order to further secure the connectors, keep the screw from loosening, and distribute the load from the nut or bolt over a larger area, a series of washers may be used.

In one embodiment, the first set of connectors and/or the second set of connectors may comprise one or more stabilizers 1300. In a stabilizer, a fixed top 1302 and fixed base (also called a "bottom") 1304 are flexibly connected via intermediaries 1306, with the top connected to the upper mounting plate and the base connected to the lower mounting plate. These intermediaries, such as tension springs, screw, nut, and nut-case connections, elastomeric, viscoelastic, or fluid-filled elastic pouches, discs, pads, rings, washers, sheets, spheres, compressed spheres, flanges, or half-spheres, provide support but also laterally distribute or absorb any mechanical energy (e.g., vibrations or "shock") received from one end so that the energy is diminished before it is applied to the other end, thereby dampening vibration. Connectors configured to absorb or laterally distribute mechanical energy as described herein may be referred to as "donuts" 1502.

In one embodiment, a vibration damper may be used as a stabilizer. A vibration damper may consist of a top and base made of a rigid material, such as a metal, and an elastomeric or viscoelastic intermediary, such as a disc, pad, ring, washer, sheet, sphere, compressed sphere, cylinders, flange, or half-sphere made of rubber, polyurethane, or similar material. The top, base, and intermediary may have a central channel for enabling a screw to pass through to provide an attachment to the upper and lower mounting plates. The top and base may be centrally threaded in order to permit the tightening or expansion of the intermediary as well as to secure the vibration damper to the upper and/or lower mounting plates.

In one version, the pad or disc may be a hollow elastomeric or viscoelastic disc with a hollow construction, and thereby configured to contain a fluid capable of further absorbing mechanical energy. This fluid may be air, water, or a designated viscous fluid.

If multiple stabilizers are used, the intermediaries may be modified so as to increase or decrease the relative distance between the top and the base, and thereby increase or decrease the relative distance between corresponding points of the upper and lower mounting plates. This allows the operator to conduct any fine leveling adjustments needed after the initial mounting of the system is complete. One example of a stabilizer is a leveling screw.

In one version, the stabilizers are multi-prong stabilizers 1400, such that the top and base of each stabilizer comprise one or more prongs 1402, 1404, 1406, 1408, with an intermediary 1403, 1405, 1407, 1409 disposed between each top and base pair of prongs. This configuration enables distribution and absorption of energy not only within a given intermediary, but also amongst the several intermediaries and from one intermediary to another within a stabilizer. Each prong may individually be connected to an upper and/or lower mounting plate. One example of a multi-prong stabilizer is a three-prong "tri-wheel" leveling screw.

In one embodiment, stabilizers, as described above, may also be utilized in mounting a camera, a camera set, or camera array to a camera plate, camera set plate, or camera array plate, and in mounting a camera plate, camera set plate, or camera array plate to the upper mounting plate. The stabilizers may be similarly utilized in mounting the lower mounting plate to the vehicle.

In one embodiment, a mounting plate is sandwiched between an upper set of stabilizers and a lower set of stabilizers, with the upper and lower set of stabilizers connected via a bolt which pass through the mounting plate.

In another embodiment, the upper mounting plate is connected to an upper and/or lower set of stabilizers, and the upper and/or lower set of stabilizers are connected by means such as threading to a set of rods. These rods in turn may be attached to a vehicle via any of the attachment means described above, including suction cups.

In one embodiment, the camera array stabilizer system comprises a mounting plate, stabilizer units, and vehicular attachment parts. The mounting plate, as has been described, is configured to provide an interface onto which the camera array may be mounted. The mounting of the camera array may include the mounting of additional mounting plates with their own camera array. Thus, a first set of mounting plates may be mounted onto a second set of mounting plates. The second set of mounting plates are in turn mounted onto the vehicle. To reduce vibrations and to smooth the movement of the mounting plates (and the camera arrays) as they move with the vehicle through space, the stabilizer units may operate as the recipients and diffusers of the vibrations; accordingly, they connect and manage the connection between the mounting plate(s) and the vehicular attachment parts. In one variation, to further reduce vibrations, a plurality of mounting plates may be engaged with a plurality of stabilizer units, with the stabilizer units and mounting plates stacked alternatingly. In a plurality of stacked mounting plates, mounting plates may vary in size and shape. Generally, larger or same-sized mounting plates will be positioned beneath smaller or same-sized mounting plates. Generally, smaller mounting plates will be positioned at an approximate center of larger mounting plates. Some mounting plates will be merely peripheral plates—that is, occupying a position at the periphery of another mounting plate, with no central material or occupancy.

The stabilizer units are preferably disposed along peripheral portions of the mounting plates, but can be disposed at a central portion, or in between the central portion and the peripheral portions as well. The stabilizer units may comprise upper stabilizers, lower stabilizers, a bolt, and a rod.

The rod is the portion of a stabilizer unit that is configured to engage with the vehicular attachment parts. The attachment means may include welding, a threaded engagement, or any other manner of fixing, preferably in a way that enables disassembly. The rods may be threadably engaged to the bolt in order for the bolt and rod to tighten vis-à-vis each other, with lip of a given bolt more or less matching the upper lip or profile of a rod in order to provide a balancing material force. The upper and lower stabilizers, with the mounting plate between them, may accordingly be compressed between the bolt and the rod, with this compression being adjustably controlled by tightening or otherwise reducing the distance and increasing the material force between the lip of the bolt and the lip of the rod. The rod and/or bolt may have portions shaped to facilitate the reducing of distance between them. For example, in the case of a threaded engagement, the rotation of the rod and bolt may be facilitated by the inclusion of indents configured to engage with a wrench.

The upper and lower stabilizers may be identical, with the mere exception that the upper stabilizer is disposed above a mounting plate while a lower stabilizer is disposed below a mounting plate. In this way, the vibration reduction effect is doubled. In one variation, additional stabilizers beyond two for a given mounting plate may be incorporated. Generally, the inclusion of additional mounting plates, with each mounting plate having its own dedicated set of upper and lower stabilizers may be used to reduce vibrations.

Each stabilizer may have a top, an intermediary, and a bottom, with the top and bottom configured to encase the intermediary at least on one side each and to enable an even distribution of compression force against the intermediary. The top and bottom may be discs, or more specifically, washers, such that the bolt may pass through the center of the top, (the intermediary) and the bottom. The center may comprise a hole, and the holes of the top, intermediary, and bottom may upon being stacked together, form an inner channel.

The diameter of a top or bottom may range from 0.5-12". Generally, the top and bottom are each made of a material more rigid than the intermediary, in order to effectuate the even distribution of compression onto the same. In one variation, the top is merged with the head/lip of the bolt, such that the (threaded) protruding portion of the top extends through the intermediary and the bottom before passing through the hole in the mounting plate. In one variation, the integrated top bolt of the upper stabilizer passes through the mounting plate as well as the entirety of the lower stabilizer. In one variation, the bottom of the upper stabilizer is merged with the mounting plate. In another variation, the top of the lower stabilizer is merged with the mounting plate. In yet another variation, the bottom of the lower stabilizer is merged with the rod. In one version that combines these variations, the top of the upper stabilizer is merged with the bolt to form a top bolt, the bottom of the upper stabilizer and the top of the lower stabilizer are each merged with the mounting plate to form an integrated mounting plate, and the bottom of the lower stabilizer is merged with rod to form a bottom rod; thus, the bolt portion of the top bolt passes through the intermediary of the upper stabilizer, the integrated mounting plate, and the intermediary of the lower stabilizer, to engage with the bottom rod. Tightening the engagement between the top bolt and the bottom rod thereby applies an even compression against the upper intermediary and the lower intermediary, the both of which provide vibration dampening upon the integrated mounting plate.

The mounting plate may be substantially shaped so as to accommodate reasonable variations of camera arrays, and may therefore be circular, square, or rectangular. In one variation, the plurality of mounting plates is not merely, if at all, stacked vertically, but also positioned adjacently, to accommodate a plurality of camera arrays intended for various positions along various plane(s) disposed above a vehicle. Thus, some mounting plates within a given camera array system may be substantially square while others in the same system have varying lengths and widths—so much so, that some mounting plates may resemble a rail. The mounting plates may also be less common or non-standard shapes, such as a horse-shoe shape or circumferential semi-circle. For biaxially symmetrical shapes of mounting plates, a set of four stabilizer units may be sufficient to account for vibration occurring from each cardinal direction. For non-biaxially symmetrical shapes of mounting plates, more or fewer stabilizer units may be utilized to account for differences of vibration intensity between the cardinal directions. In one variation, the stabilizer units may vary in properties, such that the intermediaries of one sub-set of stabilizer units are thicker, wider, or more numerous than in other sub-sets of stabilizer units.

The mounting plate may also be substantially shaped so as to facilitate engagement with the vehicle. While vehicle roofs are generally rectilinear, those of a boat such as a yacht are not, and motorcycles and mopeds lack roofs entirely.

The vehicular attachment parts are configured to enable the mounting plate to be mounted to the vehicle. In particular, the vehicular attachment parts engage with the rods—which in certain variations, may be the bottoms of the lower stabilizers. The rods may be welded to or otherwise permanently attached to the vehicular attachment parts, or else removably attachable to the same. Vehicular attachment parts may engage with flat surfaces of the vehicle (roofs) or with dedicated mounting devices, such as racks that are often integrated into vehicle roofs. Diverse vehicular attachment parts may also be combined in order to exploit the attachment properties advantages of each. Thus, for example, a relative "front" of the vehicle may be engaged with a vehicular attachment part of a first type, and the relative "back" of the vehicle may be engaged with a vehicular attachment part of a second type.

The vehicular attachment parts may include a mechanism for permanent attachment to a vehicle, such as the inclusion of various metal parts welded to the roof or even the chassis of the vehicle, or for removable attachment, such as suction cups or so-called "tight-fitting", as may be achieved through clamps. The vehicular attachment parts may also combine permanent and removable attachment mechanisms, such that the removable attachment mechanisms engage with the permanent attachment mechanisms.

An important vehicular attachment part mechanism includes a gyro-stabilized system. Gyro stabilized systems are utilized in various contexts, including in ships and aircrafts, and for stabilizing military defense equipment, scientific instruments, antennae and satellite dishes, and surveying and mapping instruments.

The gyro-stabilized system may comprise a gyroscope, which measures the orientation based on principles of angular momentum. The gyroscope may be mechanical, or optical, utilizing lasers or lights to detect changes in orientation. The gyro-stabilized system may also include additional sensors, such as accelerometers, magnetometers, inclinometers, etc., to obtain additional measurements.

Figure 108:
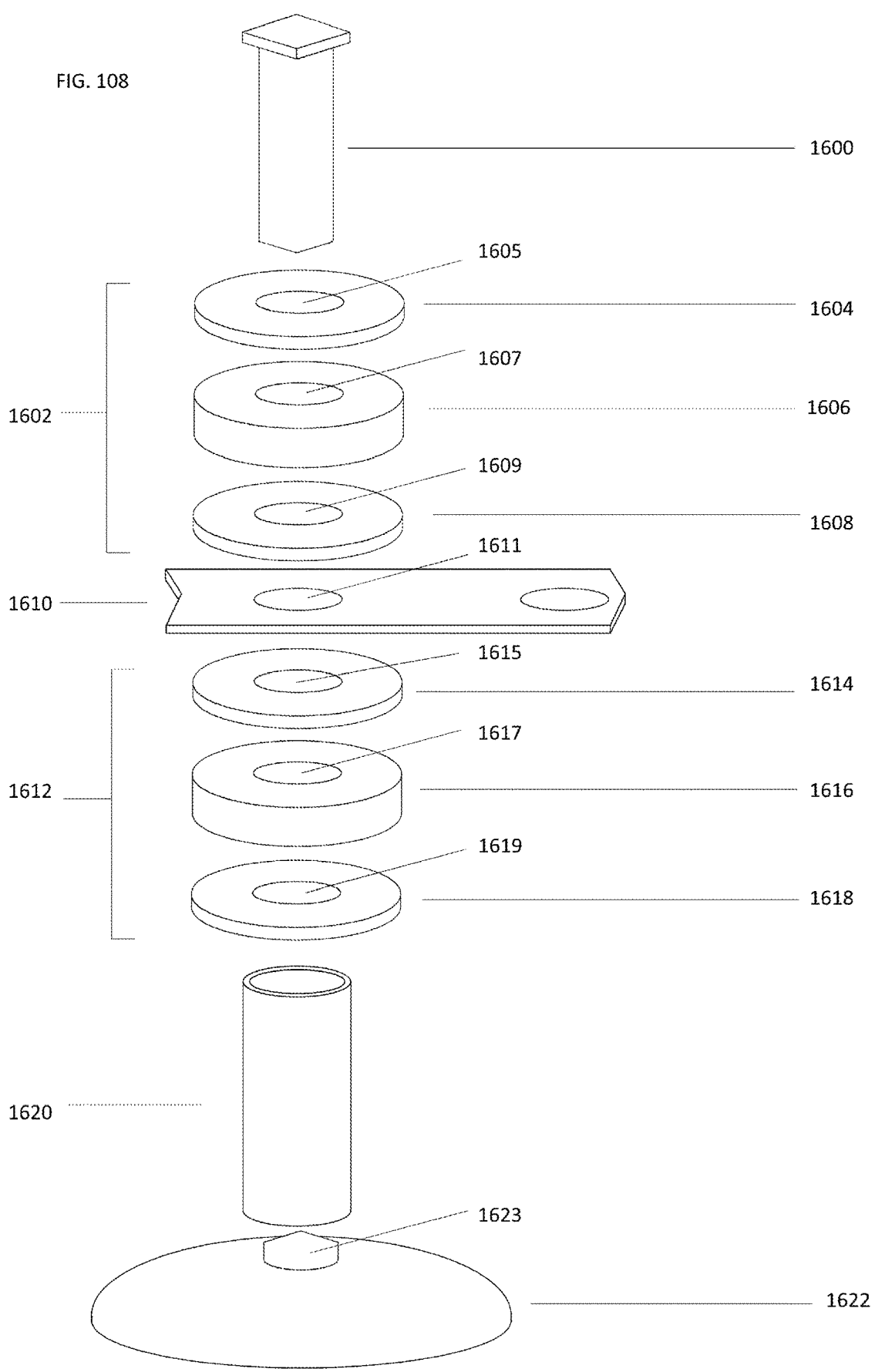
FIG. 108 shows an explosive view of an exemplary stabilizer system.
Figure 109:
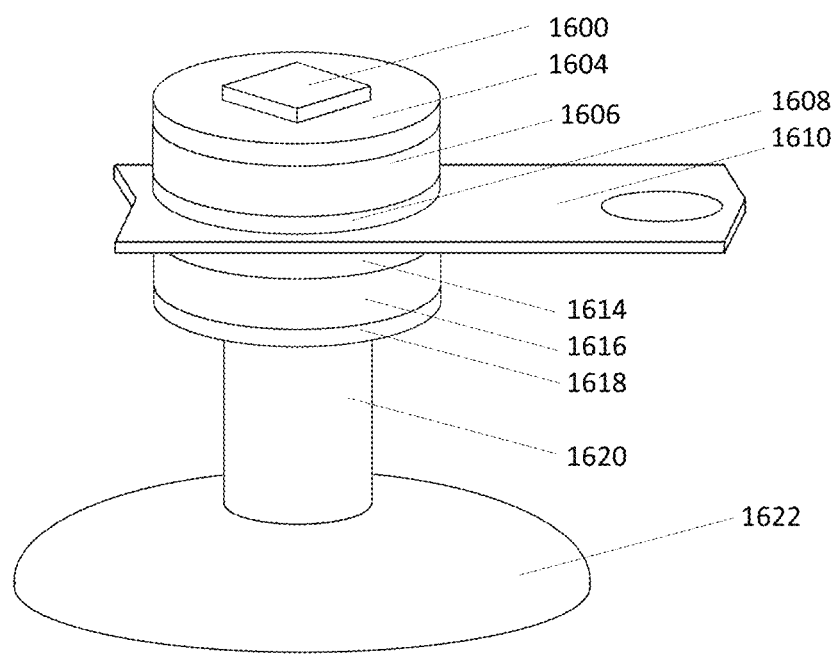
FIG. 109 shows an exemplary stabilizer system

The gyro-stabilized system may comprise motors for adjusting the position of the system in response to measurements received from the gyroscope or the other sensors. These adjustments are directed toward angular or linear position, velocity, and acceleration. The motors may apply the adjustments to various structural (i.e., mechanical) components that form the body of the system and connect it with the vehicle and the mounting plates. These structure components may include a frame, bearings, mounting clamps, brackets, bases, bearings, joints, dedicated dampers, and protective housings. Sensor data, including gyroscopic data, may be processed by a control unit that computes the necessary movements required of the motors to reorient the system's position. To power the control unit, the system may also comprise a power supply—this power supply may be integrated with that of the vehicle or the camera array system, or may be a dedicated power supply for the gyro-stabilized system alone. As shown in FIGS. 108-109, the bolt 1600 may pass through the upper stabilizer 1602, the mounting plate 1610, and the lower stabilizer 1612, and into the rod 1620; in particular, the bolt may pass through the top 1604, the intermediary 1606, and the bottom 1608 of the upper stabilizer, as well as the top 1614, intermediary 1616, and bottom 1618 of the lower stabilizer. The bolt shaft passes through the inner channels 1605, 1607, 1609, 1615, 1617, 1619 of the stabilizers and the hole 1611 of the mounting plate. The rod, in turn, may directly or indirect connect with the vehicular attachment means 1622. The rod may be threadably attached at the threading site 1623 vehicular attachment means.

Figure 110:
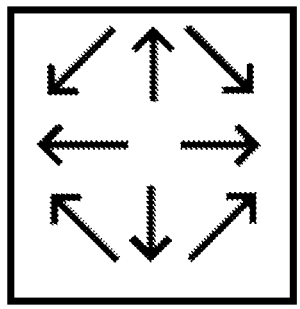
FIG. 110 shows an exemplary camera array system.
Figure 111:
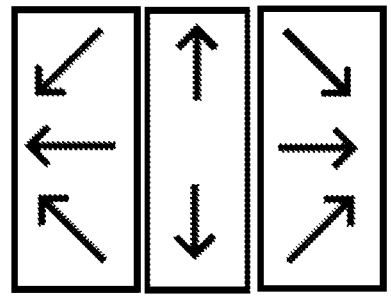
FIG. 111 shows an exemplary camera array system with separate mounting plates for each of the left and right side facing camera arrays and the front and back facing camera arrays.

In one embodiment, as shown in FIG. 110, the camera arrays consist of a left facing camera array, a right facing camera array, a forward-facing camera array, and a backward facing camera array. The left and right facing camera arrays may each comprise a front side facing camera, a middle side facing camera, and a back side facing camera, with the fields of view of the front, middle, and back facing cameras intersecting. Specifically, the forward directions of the front, middle and back side facing cameras within a given side facing camera array may intersect. The angle of intersection between the forward directions of the front and middle side facing cameras within a given side facing camera array may be preferably approximately 45 degrees, but depending on the desired distance of intersection, from between 0 and 90 degrees. The angle of intersection between the middle and back side facing cameras may be similar. In one variation, these camera arrays may occupy a single common plate In another variation, as shown in FIG. 111, the left side facing camera array may occupy a first plate set, the front and back facing camera array may occupy a second plate set, and the right side facing camera array may occupy a third plate set. In one version, the second plate set consists of separate plates for each of the front and back facing camera arrays.

Figure 112:
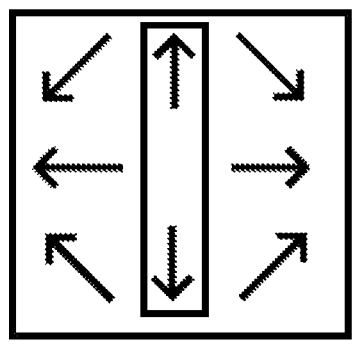
FIG. 112 shows an exemplary camera array system with separate mounting plates for the side facing camera arrays and for the front and back facing camera arrays.

In yet another version, as shown in FIG. 112, the left and right side facing camera arrays may together occupy a single plate, while the front and back facing camera arrays occupy a separate plate set, possibly mounted on the single plate.

Figure 113:
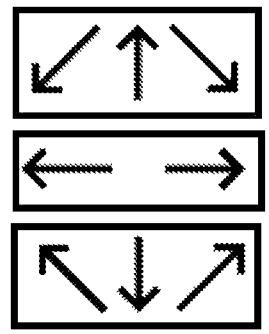
FIG. 113 shows an exemplary camera array system with a first mounting plate for the front facing camera array and the front side facing cameras, a second mounting plate for the left and right side facing cameras, and the back side facing cameras and the back facing camera array.

In yet another version, as shown in FIG. 113, The front side facing cameras may both occupy a first plate in common with the front facing camera array, the middle side facing cameras may occupy a second plate, and the back side facing cameras may both occupy a third plate in common with the back facing camera array.

In one embodiment, as shown in FIG. 98, the backward-facing camera array, the forward-facing camera array, and the apex camera array are each engaged with separate and dedicated vehicular mounting plates, with the backward-facing camera array engaged to a backward vehicular mounting plate, the forward-facing camera array engaged to a forward vehicular mounting plate, and the apex camera array engaged to an apex vehicular mounting plate. The forward vehicular mounting plate, apex vehicular mounting plate, and backward vehicular mounting plate are arranged such that the forward vehicular mounting plate is mounted to a vehicle at the front of the vehicle relative to the other vehicular mounting plates, the backward vehicular mounting plate is mounted to the vehicle at the back of the vehicle relative to the other vehicular mounting plates, and the apex mounting plate is mounted to the vehicle between the other vehicular mounting plates.

The invention claimed is:
1. A camera array stabilizer system for a plurality of cameras comprising a mounting plate, stabilizer units, and at least two vehicular attachment parts:
   a. with the mounting plate being configured for mounting the plurality of cameras to a vehicle;
      i. with the mounting plates having perimeter channels;
      ii. with the perimeter channels being holes disposed on approximate perimeters of the mounting plates;
   b. with each stabilizer unit configured to attach to the mounting plate at a given perimeter channel;

c. with each stabilizer unit comprising an upper stabilizer, a lower stabilizer, a bolt, and a rod;
   i. with each upper stabilizer having an upper top, an upper intermediary, and an upper bottom;
   ii. with each lower stabilizer having a lower top, a lower intermediary, and a lower bottom;
   iii. with the upper and lower tops, the upper and lower intermediaries, and the upper and lower bottoms each having a central inner channel;
   iv. with the bolt and rod having a threaded engagement;
   v. with the bolt passing through, in order, central inner channels of the upper top, the upper intermediary, the upper bottom, a given perimeter channel of the mounting plates, and the central inner channels of the lower top, the lower intermediary, and the lower bottom;
   vi. with the bolt applying a compression force upon the upper stabilizer, the mounting plate, and the lower stabilizer against the rod;
   vii. with the compression force adjusted by threadably rotating the bolt vis-à-vis the rod;
   viii. with the intermediaries being at least one of: tension springs, viscoelastic material, fluid-filled pouches, discs, pads, rings, washers, or flanges;
d. with each stabilizer unit attached to a given vehicular attachment part via the rod;
e. with the at least two vehicular attachment parts being attachable to the vehicle;
f. with the at least two vehicular attachment parts being suction cups or gyro-stabilized systems;
   i. with the gyro-stabilized systems each comprising one or more overslung gyro stabilized heads.

2. The camera array stabilizer system of claim 1, with the lower bottom and the upper top being welded to the mounting plate.

3. A camera array stabilizer system for a plurality of cameras comprising a mounting plate, and at least two stabilizer units;
   a. with the mounting plate being configured for mounting the plurality of cameras to a vehicle;
      i. with the mounting plates having plate channels;
      ii. with the plate channels being holes disposed on the mounting plates;
   b. with each of the at least two stabilizer units configured to engage to the mounting plate at a given channel;
   c. with each least two stabilizer units comprising an upper stabilizer, a lower stabilizer, and a bolt;
      i. with each upper and lower stabilizer having an intermediary;
      ii. with each upper and lower stabilizer having a central inner channel;
      iii. with the bolt configured to engage with a vehicular attachment part;
      iv. with the bolt passing through, in order, a given channel of the mounting plates, and the central inner channels of the upper and lower stabilizers;
      v. with the bolt applying a compression force upon the mounting plate or the upper or lower stabilizer against the vehicular attachment part;
      vi. with the compression force being adjustable by rotating the bolt vis-à-vis a portion of the vehicular attachment part;
      vii. with the intermediary being at least one of: a tension spring, a viscoelastic material, or a fluid-filled pouch;
      vii. with a majority of the at least two stabilizer units not sharing a vertical axis with any of the cameras in the plurality of cameras, with the vertical axis approximately being in linewidth a gravitational force.

4. The camera array stabilizer system of claim 3, with the vehicular attachment part being configured to attach to the vehicle.

5. The camera array stabilizer system of claim 4, with the vehicular attachment part being a suction cup or gyro-stabilized system.

6. The camera array stabilizer system of claim 5, with the gyro-stabilized system comprising one or more overslung gyro stabilized heads.

7. The camera array stabilizer system of claim 3, with the portion of the vehicular attachment part comprising a rod, with the rod having threading configured to engage with threading on the bolt.

8. The camera array stabilizer system of claim 3, with the lower stabilizer having a top, with the top being welded to the mounting plate.

9. The camera array stabilizer system of claim 3, with the plate channels being disposed on an approximate perimeter of the mounting plate.

10. A camera array stabilizer system for a plurality of cameras comprising stabilizer intermediary:
   a. with each stabilizer intermediary configured to engage to a mounting plate for mounting the plurality of cameras to a vehicle;
   b. with each stabilizer intermediary comprising an intermediary and a bolt;
      i. with the intermediary having an inner channel;
      ii. with the bolt passing through the mounting plates and the inner channel of the intermediary;
      iii. with the bolt applying a compression force upon the mounting plate and the intermediary against a vehicular attachment part attachable to the vehicle;
      iv. with the intermediary comprising at least two of: a tension spring, a viscoelastic material, or a fluid-filled pouch;
      v. with each stabilizer intermediary not sharing a vertical axis with any of the cameras in the plurality of cameras, with the vertical axis approximately being in line with a gravitational force.

11. The camera array stabilizer system of claim 10, with each stabilizer intermediary configured to fix to the mounting plate at a plate channel by the bolt passing through the plate channel and the inner channel.

12. The camera array stabilizer system of claim 11, with the plate channel being a hole disposed on an approximate periphery of the mounting plate.

13. The camera array stabilizer system of claim 10, with each stabilizer intermediary additionally comprising a top, with the top being welded to the mounting plate.

14. The camera array stabilizer system of claim 10, with the vehicular attachment part being suction cups.

15. The camera array stabilizer system of claim 10, with the vehicular attachment part being a gyro-stabilized system.

16. The camera array stabilizer system of claim 15, with the gyro-stabilized system comprising one or more overslung gyro stabilized heads.

17. The camera array stabilizer system of claim 10, with the vehicular attachment part comprising a rod, with the rod being configured to engage with the bolt to create the compression force.

18. The camera array stabilizer system of claim 17, with the rod and bolt each being threadably engaged.

19. The camera array stabilizer system of claim 18, with the compression force being adjustable by rotating the bolt vis-à-vis the rod.

20. The camera array stabilizer system of claim 10, with the compression force being adjustable by rotating the bolt vis-à-vis the vehicular attachment part.

* * * * *